United States Patent
Takayama et al.

[11] Patent Number: 6,081,389
[45] Date of Patent: Jun. 27, 2000

[54] ZOOM LENS OF RETROFOCUS TYPE

[75] Inventors: Hidemi Takayama, Kawasaki; Hiroki Nakayama, Sagamihara; Akihisa Horiuchi, Yokohama; Fumihito Wachi, Tokyo, all of Japan

[73] Assignee: Canon Kabushiki Kaisha, Tokyo, Japan

[21] Appl. No.: 09/123,442

[22] Filed: Jul. 28, 1998

[30] Foreign Application Priority Data

| Jul. 31, 1997 | [JP] | Japan | 9-220894 |
| Aug. 1, 1997 | [JP] | Japan | 9-221058 |
| Sep. 11, 1997 | [JP] | Japan | 9-264922 |
| Jun. 29, 1998 | [JP] | Japan | 10-198053 |

[51] Int. Cl.$^7$ .............................. G02B 15/14; G02B 5/18
[52] U.S. Cl. ........................... 359/680; 359/676; 359/570
[58] Field of Search ........................... 359/676, 680–682, 359/749–753, 566, 569, 570, 574, 575

[56] References Cited

U.S. PATENT DOCUMENTS

| 4,776,679 | 10/1988 | Kitagishi et al. | 350/427 |
| 4,802,747 | 2/1989 | Horiuchi | 350/427 |
| 4,810,070 | 3/1989 | Suda et al. | 350/413 |
| 4,842,386 | 6/1989 | Kitagishi et al. | 350/427 |
| 4,854,684 | 8/1989 | Horiuchi | 350/427 |
| 4,892,397 | 1/1990 | Horiuchi | 350/425 |
| 4,907,866 | 3/1990 | Kitagishi et al. | 350/426 |
| 4,934,796 | 6/1990 | Sugiura et al. | 350/427 |
| 4,988,174 | 1/1991 | Horiuchi et al. | 350/427 |
| 5,011,272 | 4/1991 | Nakayama et al. | 350/427 |
| 5,044,706 | 9/1991 | Chen | 359/357 |
| 5,050,972 | 9/1991 | Mukaiya et al. | 359/683 |
| 5,056,900 | 10/1991 | Mukaiya et al. | 359/676 |
| 5,078,481 | 1/1992 | Nakayama et al. | 359/680 |
| 5,087,988 | 2/1992 | Nakayama | 359/689 |
| 5,095,387 | 3/1992 | Horiuchi | 359/676 |
| 5,111,338 | 5/1992 | Nakayama | 359/686 |
| 5,113,287 | 5/1992 | Nakayama | 359/676 |
| 5,138,492 | 8/1992 | Hamano et al. | 359/684 |
| 5,179,473 | 1/1993 | Yano et al. | 359/691 |
| 5,225,937 | 7/1993 | Horiuchi | 359/688 |
| 5,268,790 | 12/1993 | Chen | 359/558 |
| 5,321,552 | 6/1994 | Horiuchi et al. | 359/654 |
| 5,353,157 | 10/1994 | Horiuchi | 359/676 |
| 5,493,441 | 2/1996 | Chipper | 359/354 |
| 5,583,699 | 12/1996 | Nakayama | 357/687 |
| 5,612,825 | 3/1997 | Horiuchi et al. | 359/687 |
| 5,638,216 | 6/1997 | Horiuchi et al. | 359/683 |
| 5,739,961 | 4/1998 | Nakayama et al. | 359/687 |
| 5,754,346 | 5/1998 | Nakayama et al. | 359/687 |
| 5,847,882 | 12/1998 | Nakayama | 359/684 |
| 5,875,059 | 2/1999 | Estelle | 359/682 |
| 5,875,060 | 2/1999 | Umeda | 359/691 |

FOREIGN PATENT DOCUMENTS

| 62-291613 | 12/1987 | Japan . |
| 1-191820 | 8/1989 | Japan . |
| 3-145613 | 6/1991 | Japan . |
| 3-203709 | 9/1991 | Japan . |
| 3-240011 | 10/1991 | Japan . |
| 4-213421 | 8/1992 | Japan . |
| 6-324262 | 11/1994 | Japan . |

OTHER PUBLICATIONS

Y. Matsui, "Lens Design Methods", Kyoritsu Shuppan Publishing Co. Ltd., Japan, p. 98 (1972).

Professor G. Michael Morris, "Diffractive Optics: From Basic Research to Practical Applications", in International Optical Design Conference 1998, Leo R. Gardner, Kevin P. Thompson, Editors, Proceedings of SPIE vol. 3482, 590–593 (Jun. 12, 1998).

*Primary Examiner*—Georgia Epps
*Assistant Examiner*—David N. Spector
*Attorney, Agent, or Firm*—Fitzpatrick, Cella, Harper & Scinto

[57] ABSTRACT

A zoom lens of the retrofocus type includes, in order from a longer-distance conjugate point side to a shorter-distance conjugate point side, a front lens unit of negative refractive power, and a rear lens unit of positive refractive power, wherein a separation between the front lens unit and the rear lens unit varies according to variation of magnification, and at least one of the front lens unit and the rear lens unit is provided with a diffractive optical element.

37 Claims, 45 Drawing Sheets

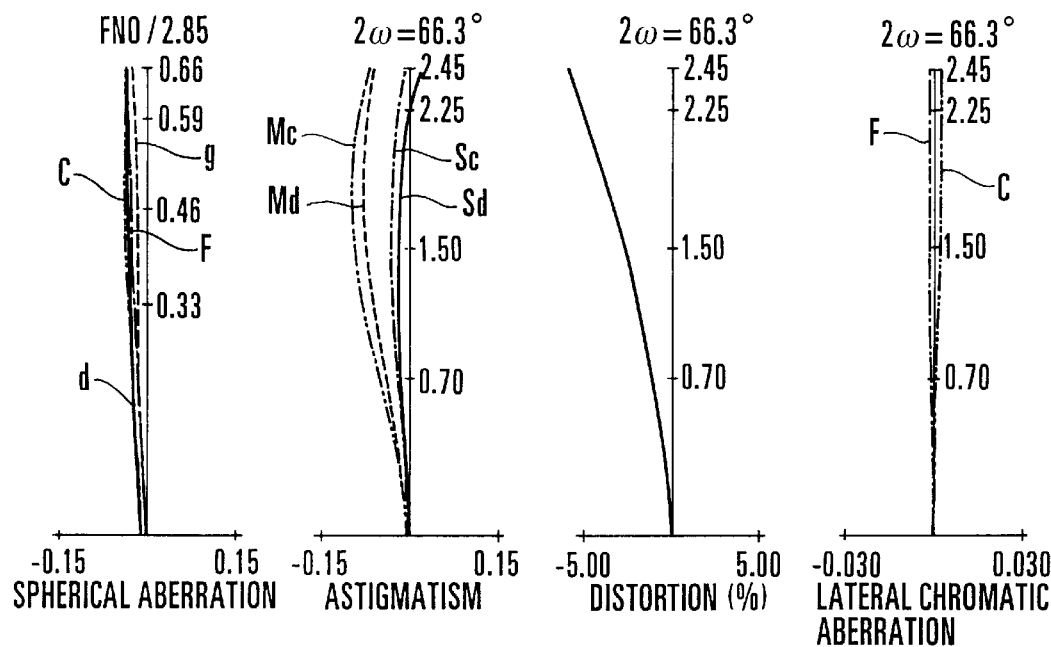
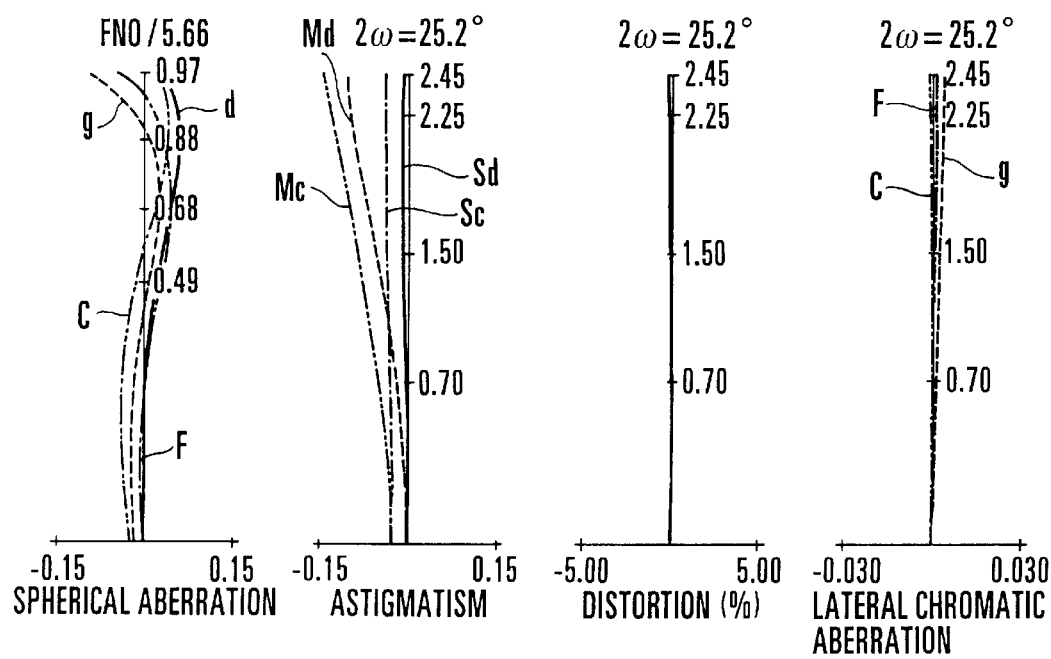

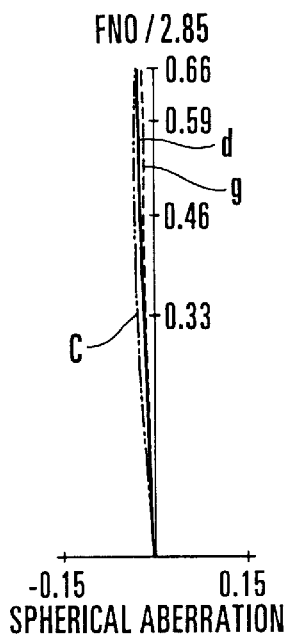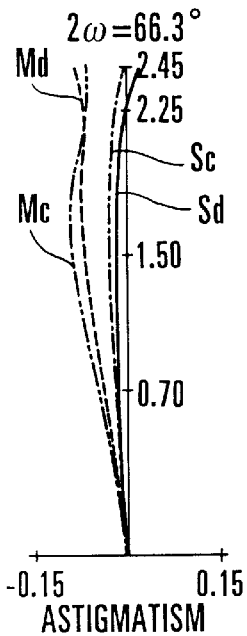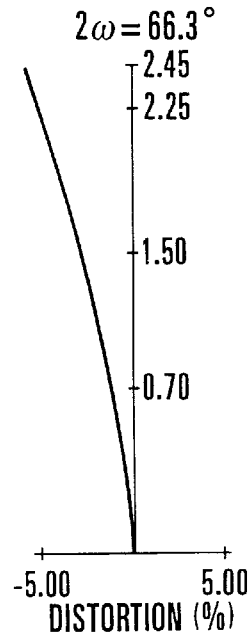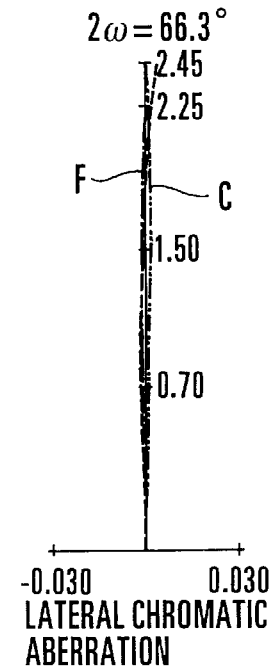
FIG.8A  FIG.8B  FIG.8C  FIG.8D
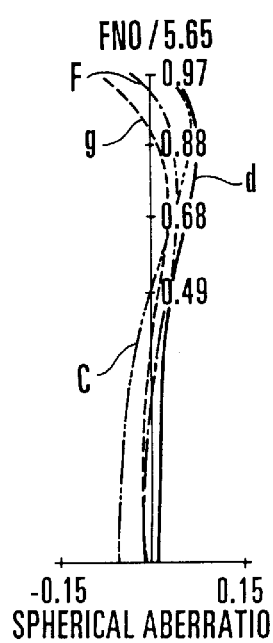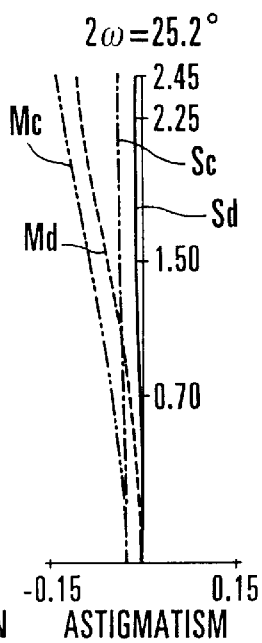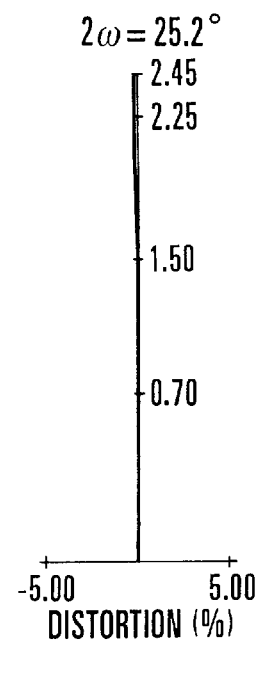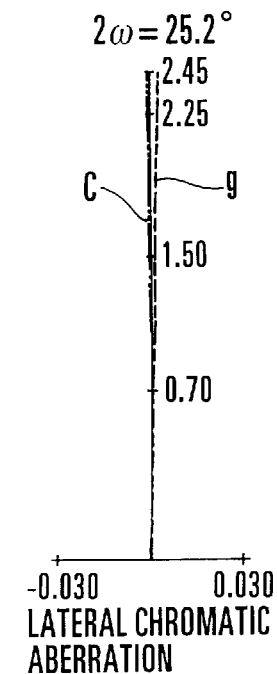
FIG.9A  FIG.9B  FIG.9C  FIG.9D

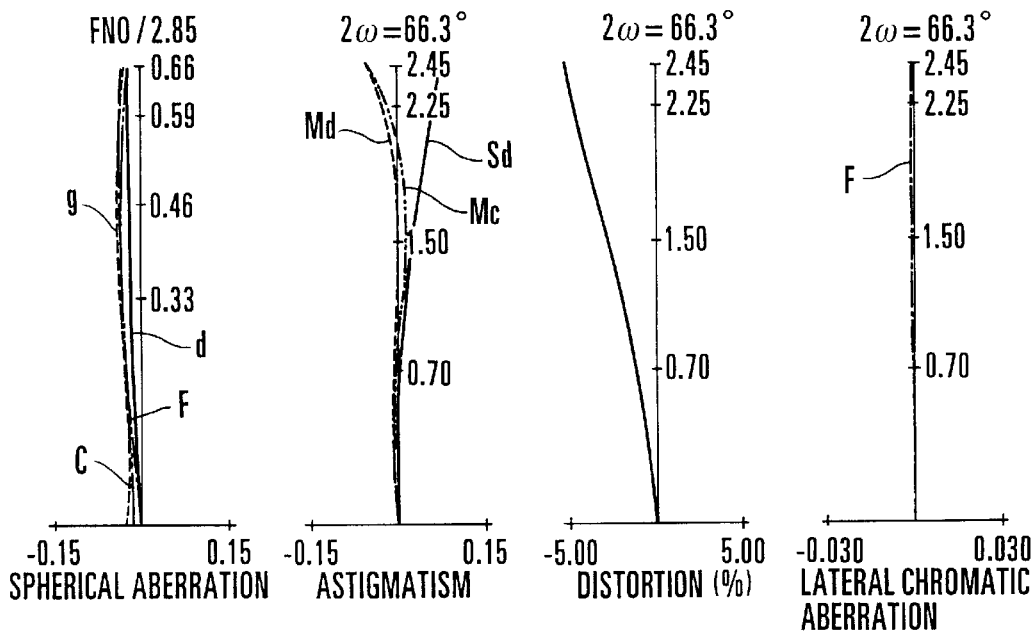
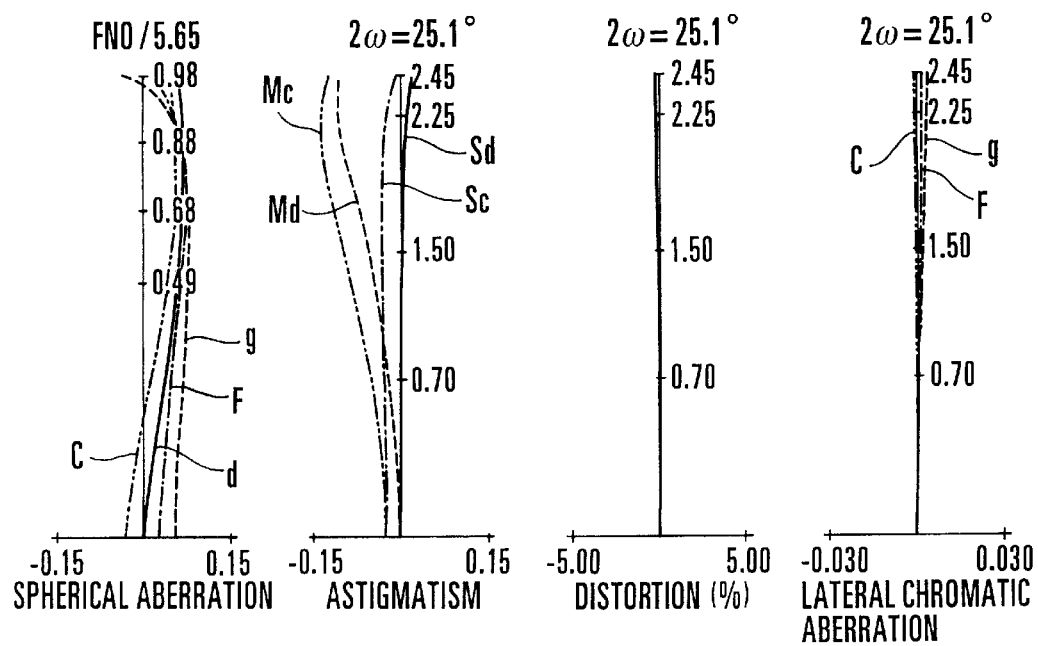

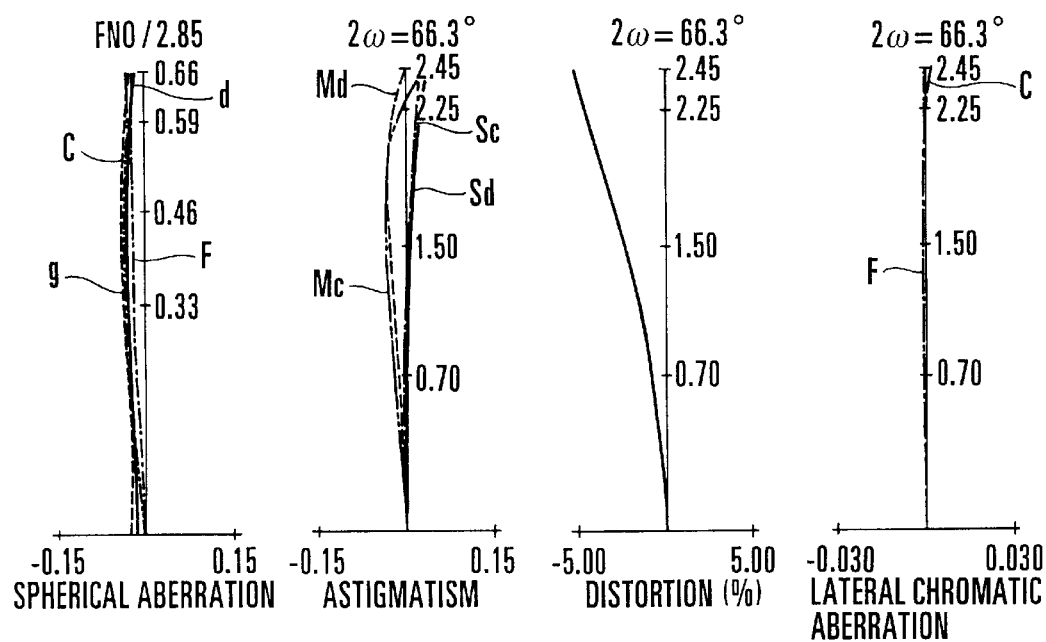
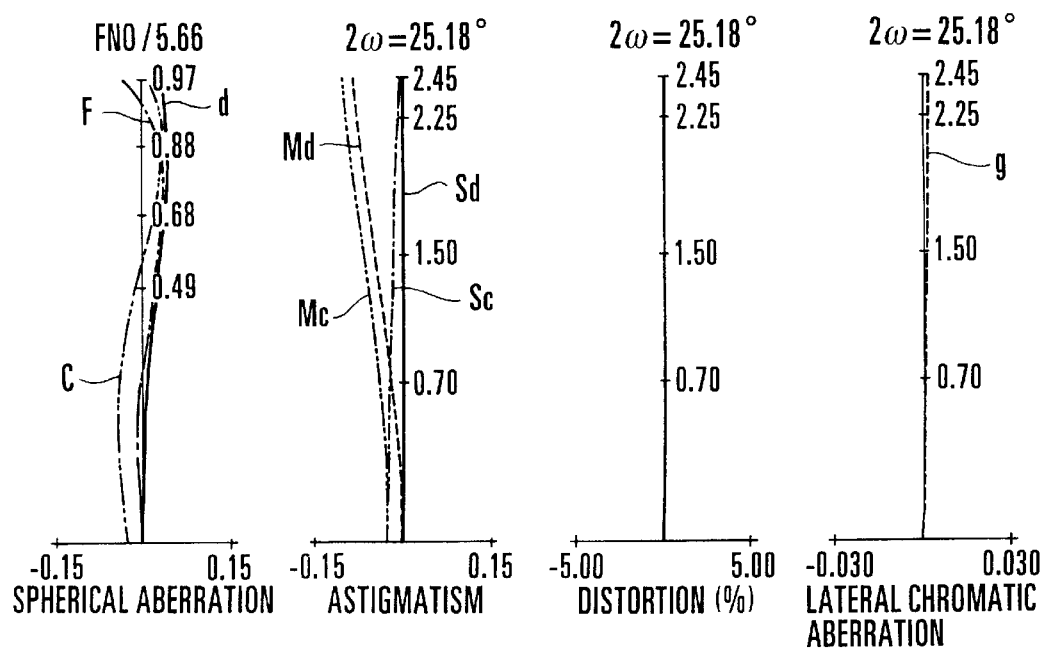

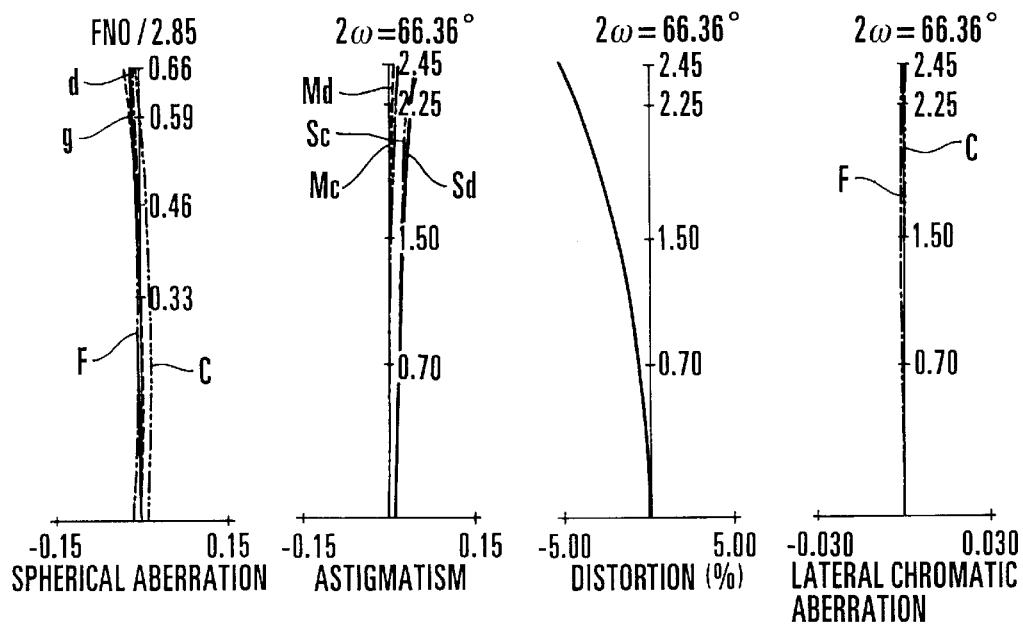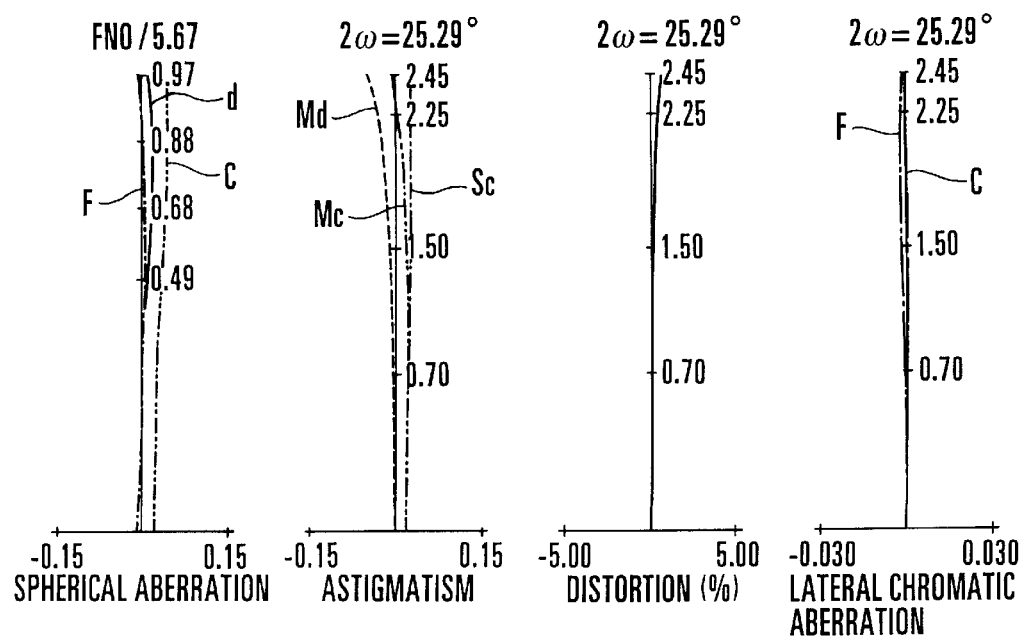

F I G. 22
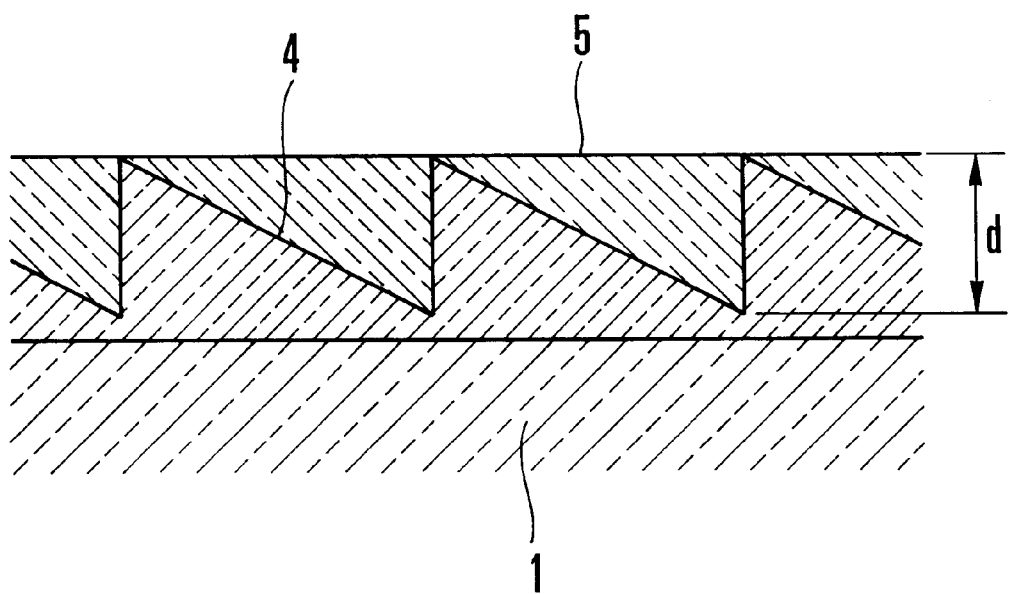

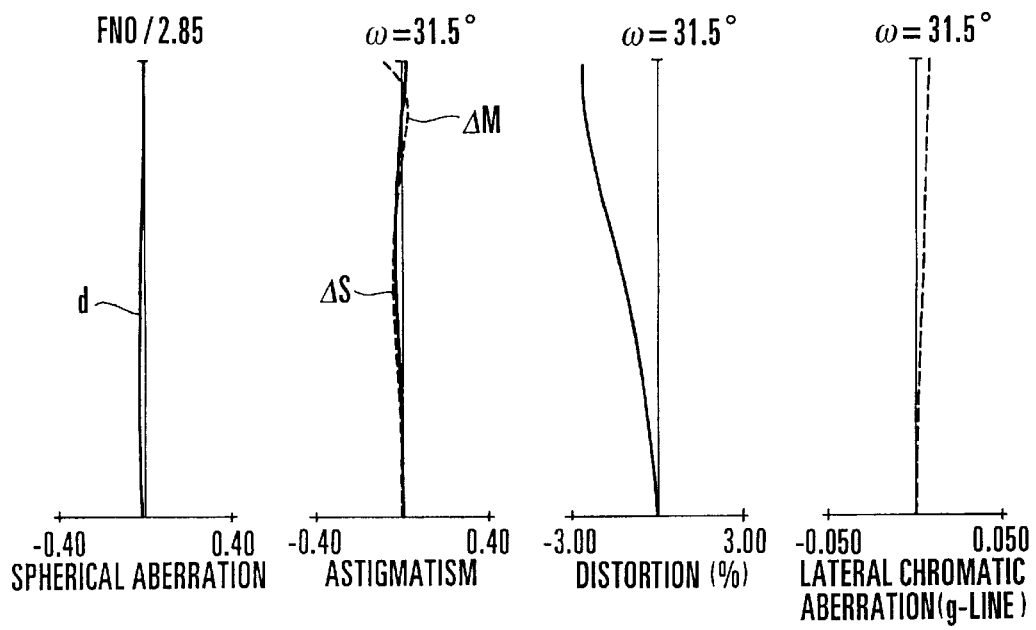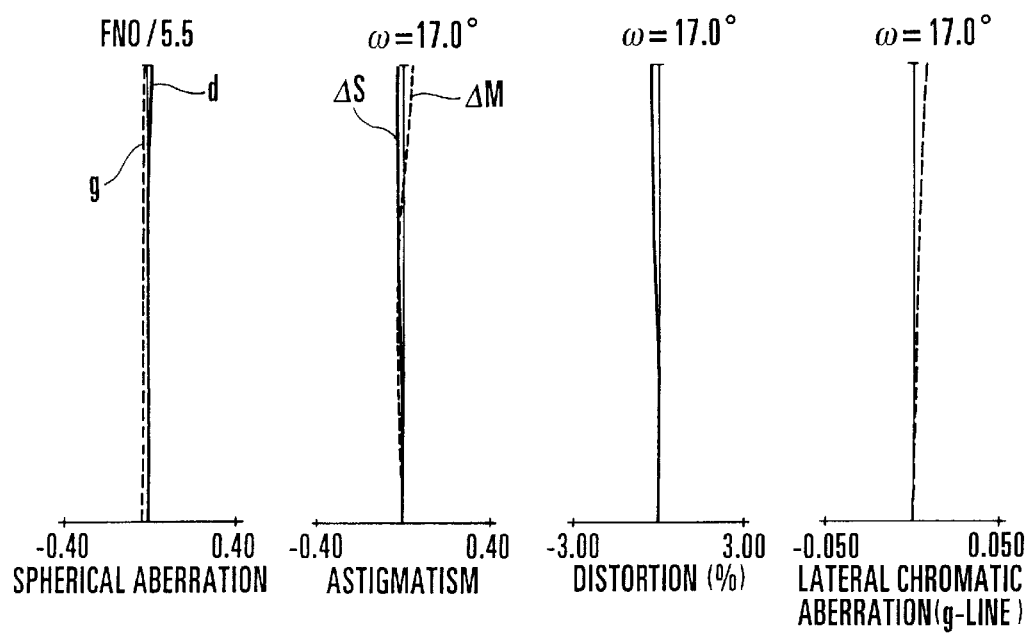

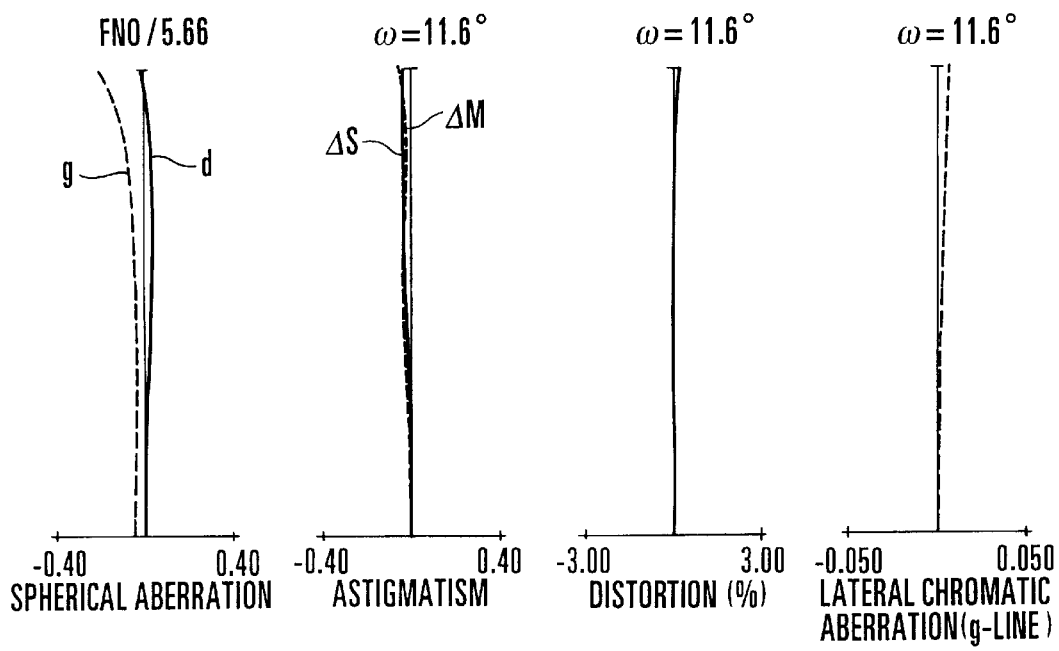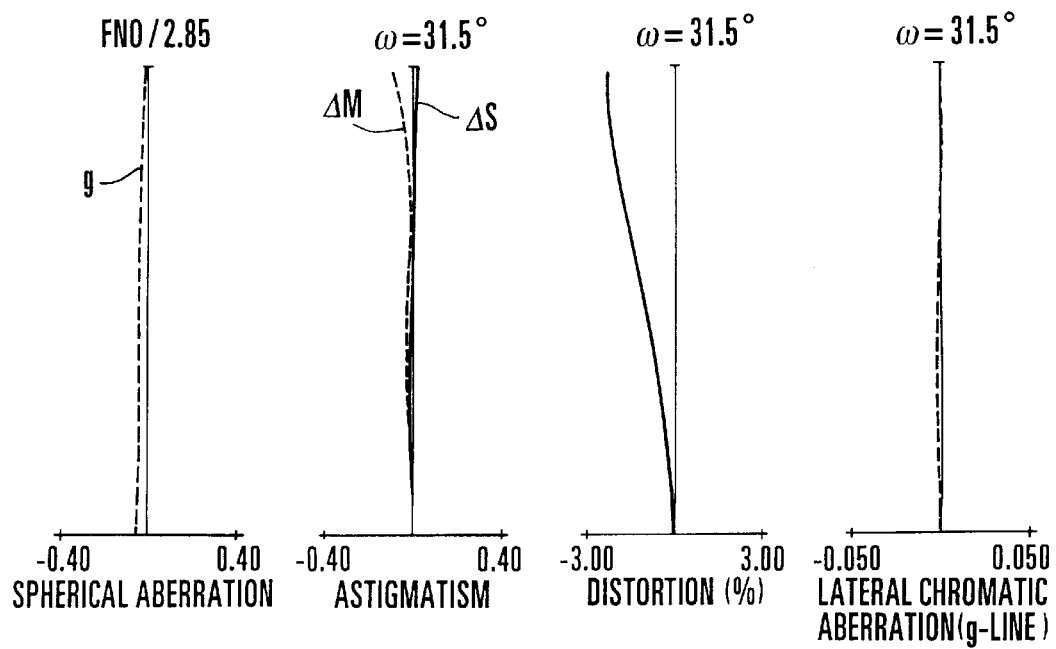

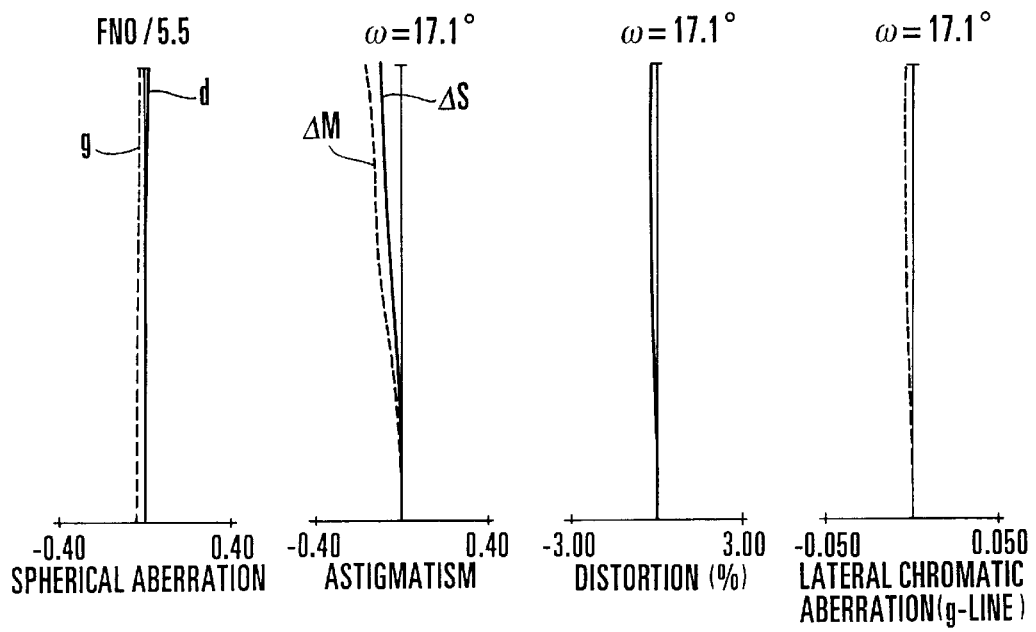
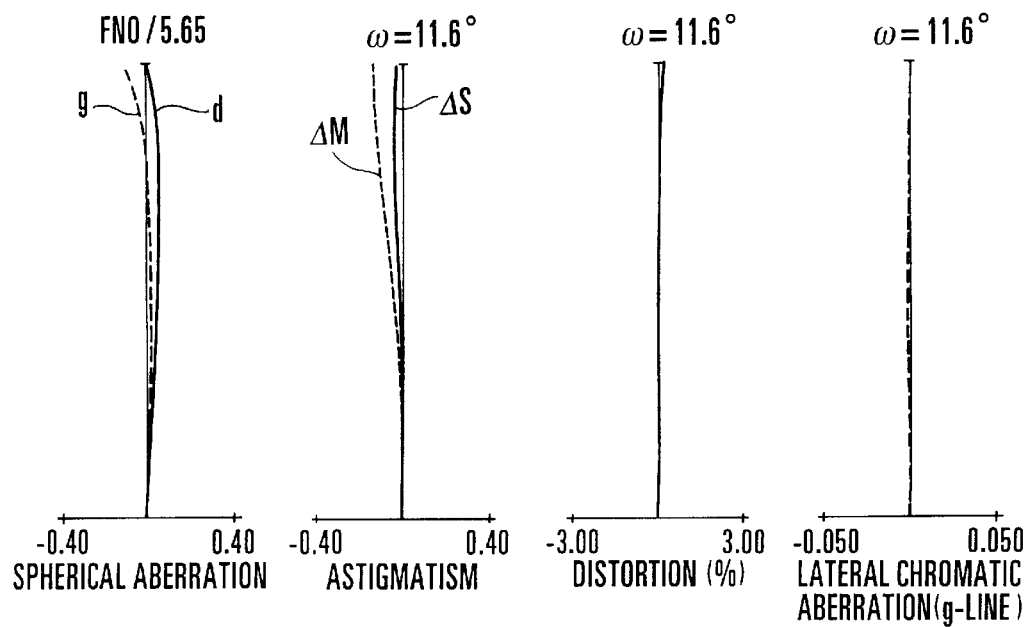

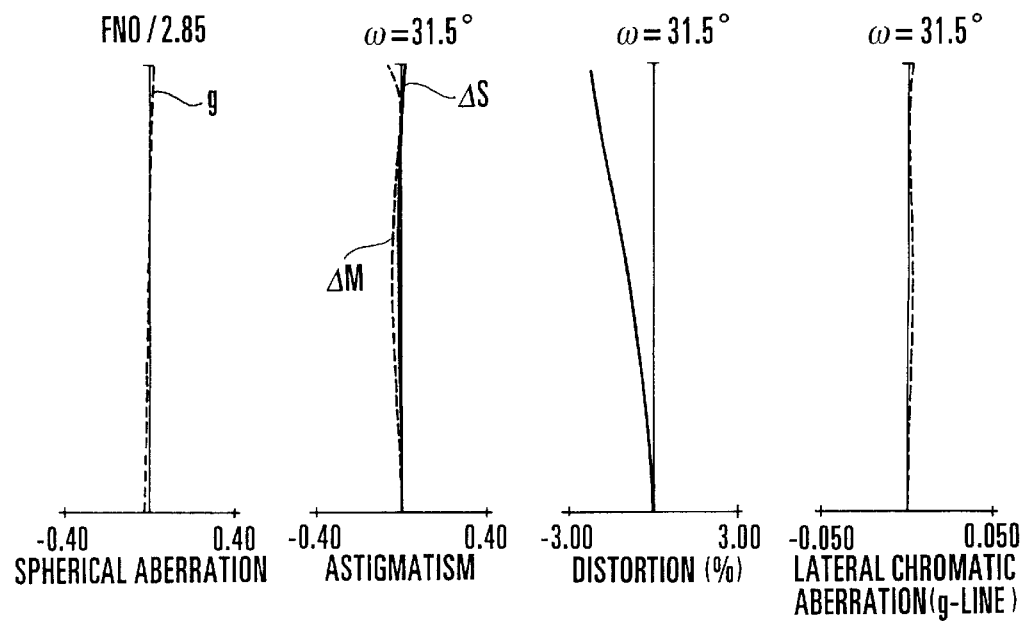
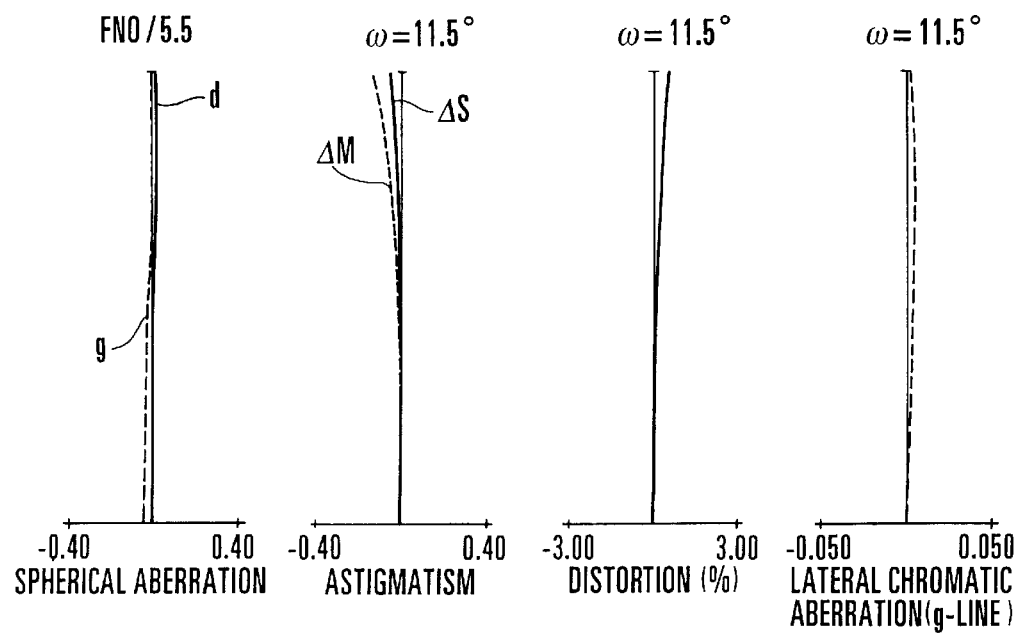

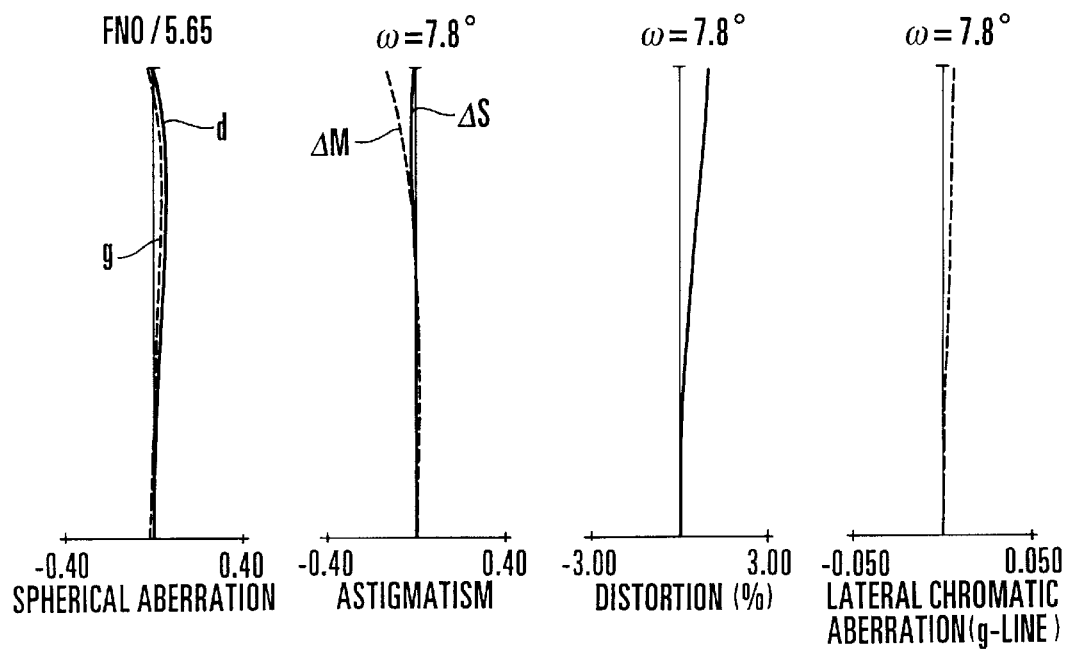
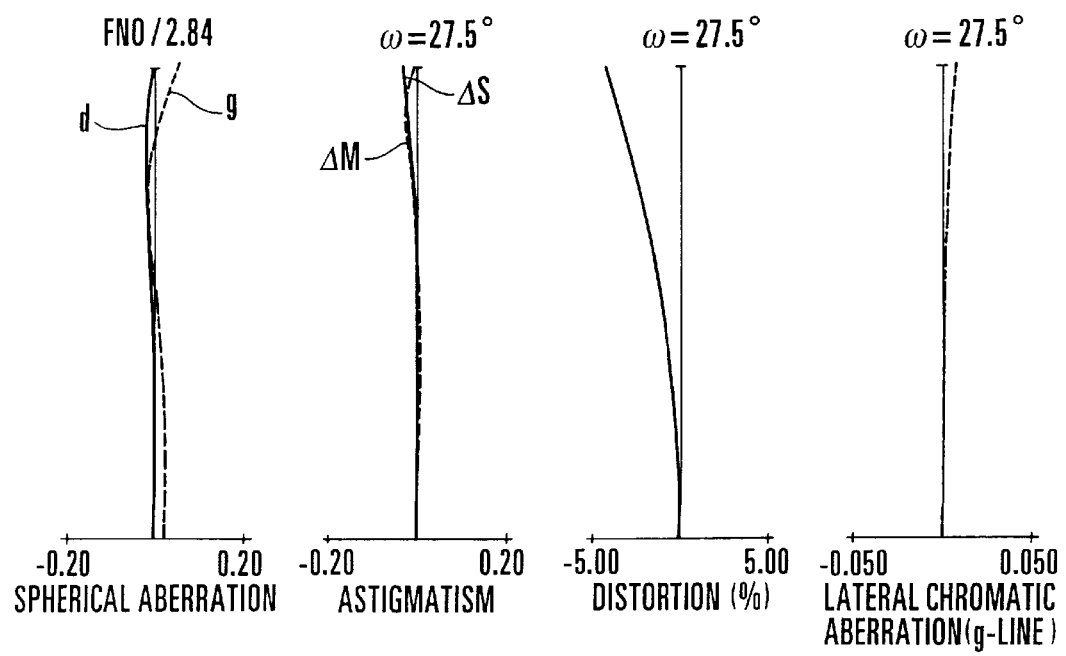

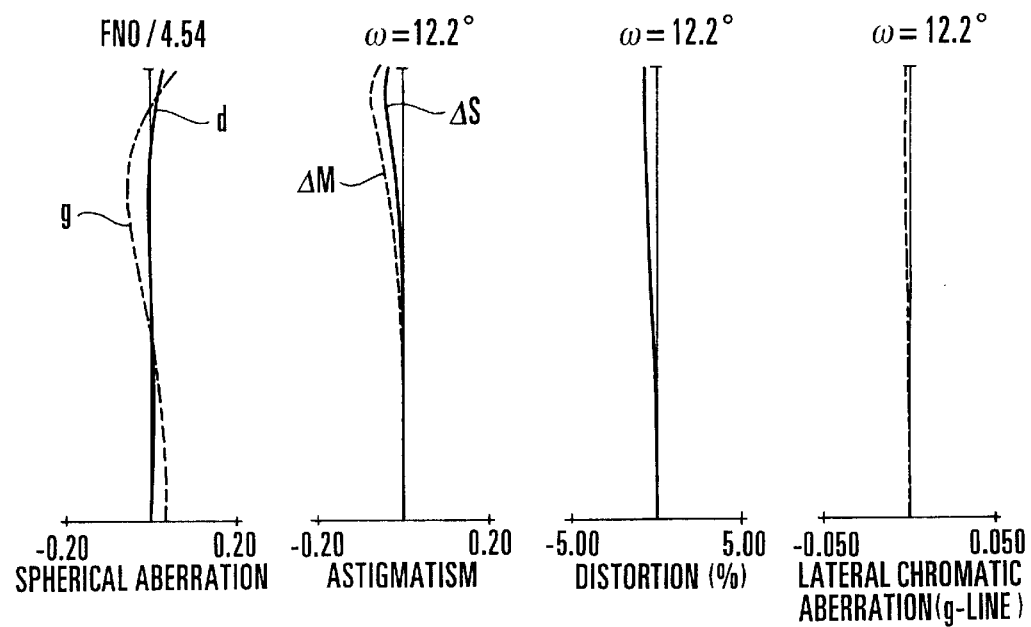
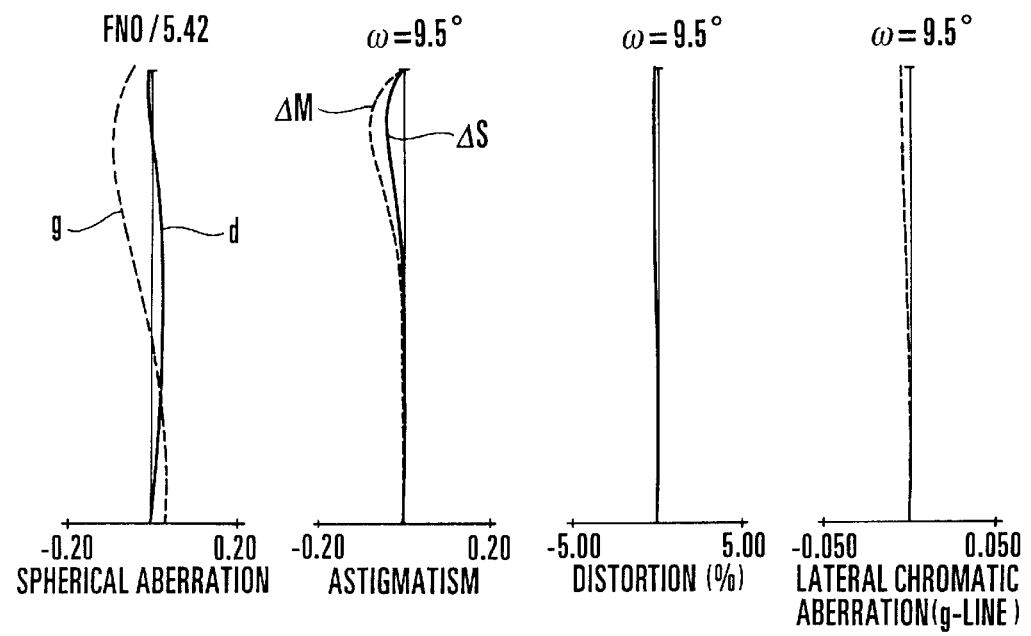

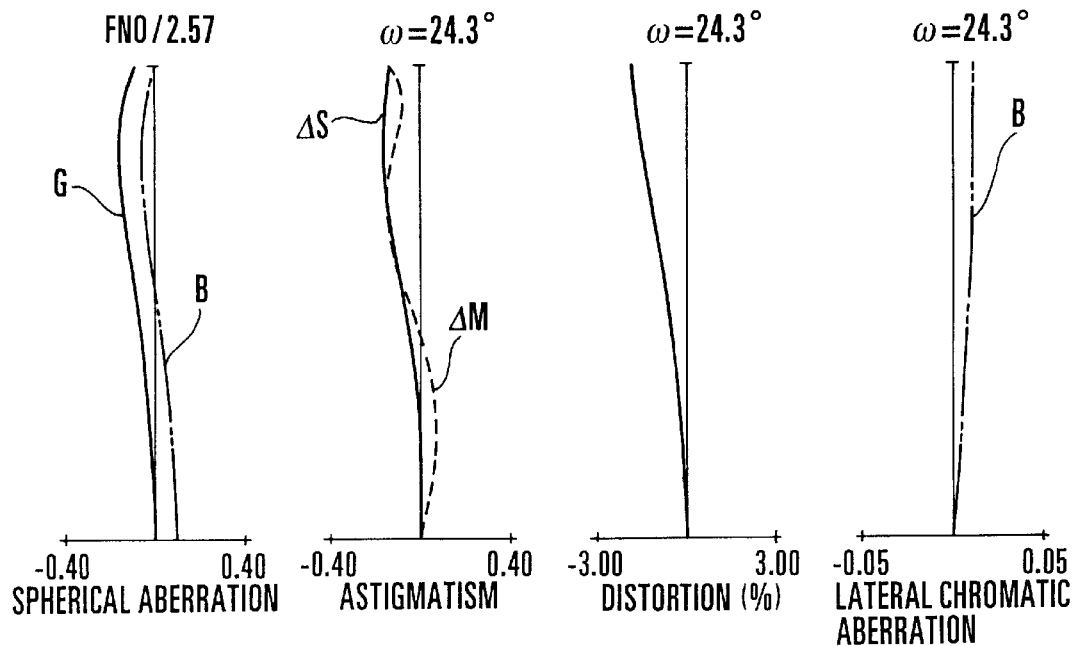
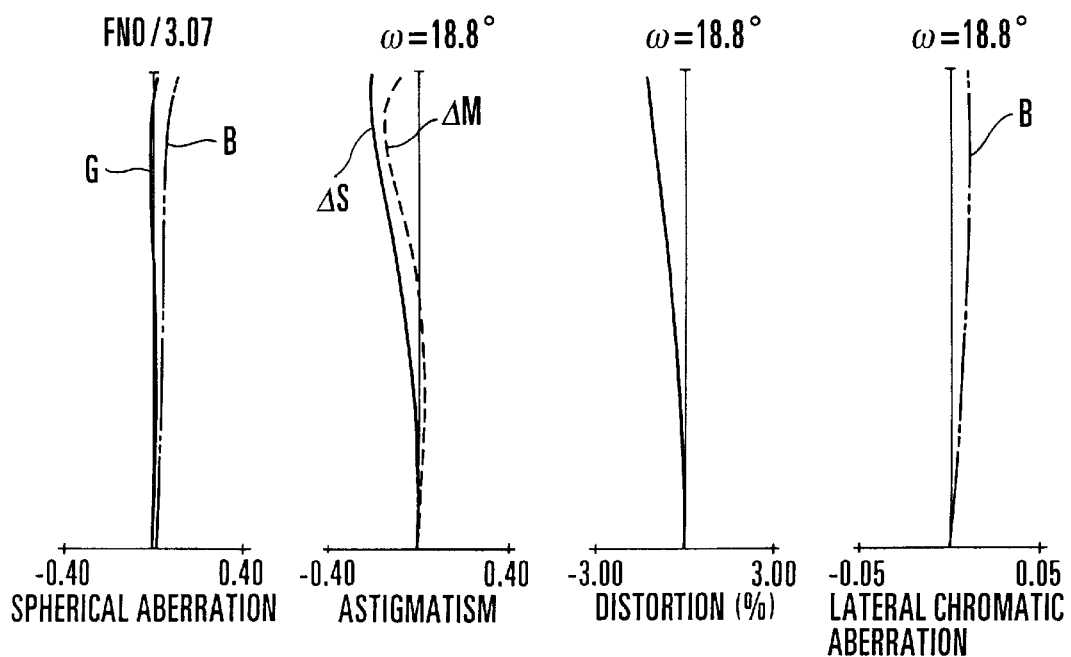

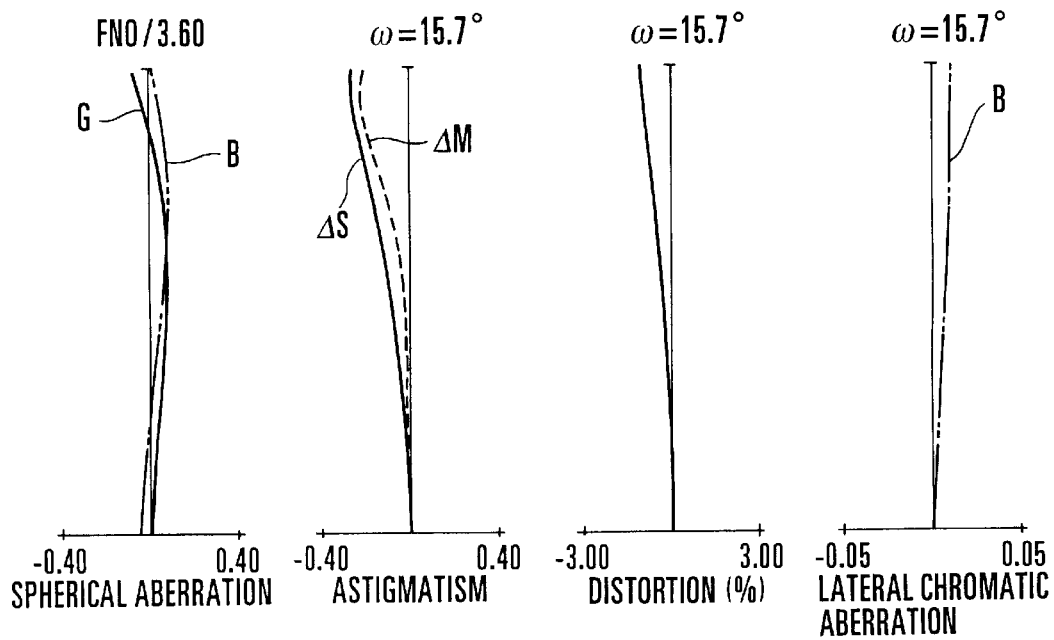
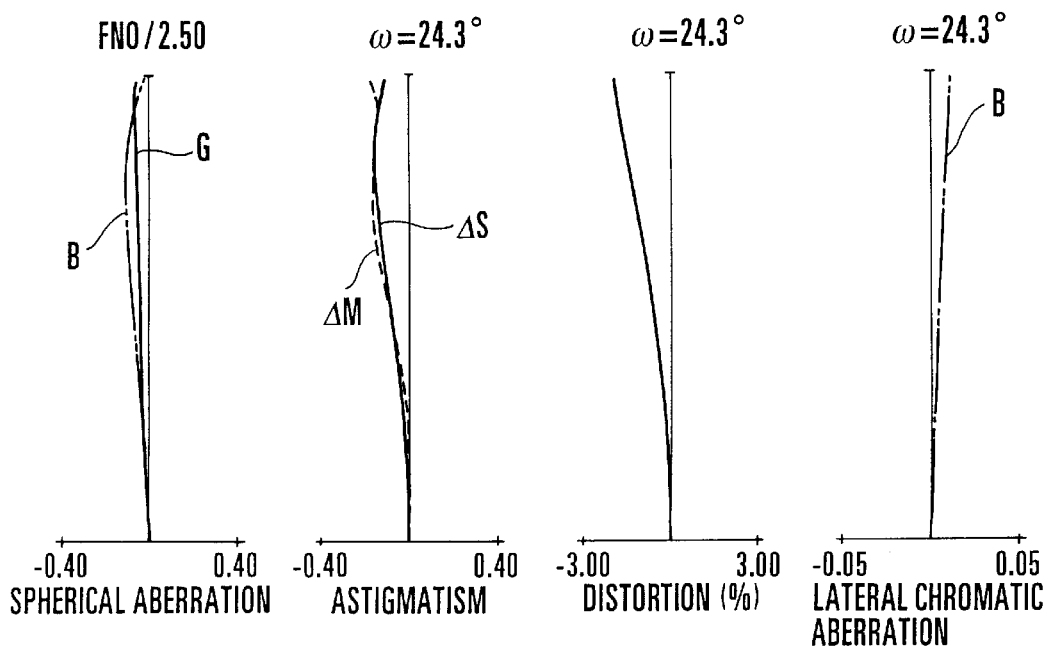

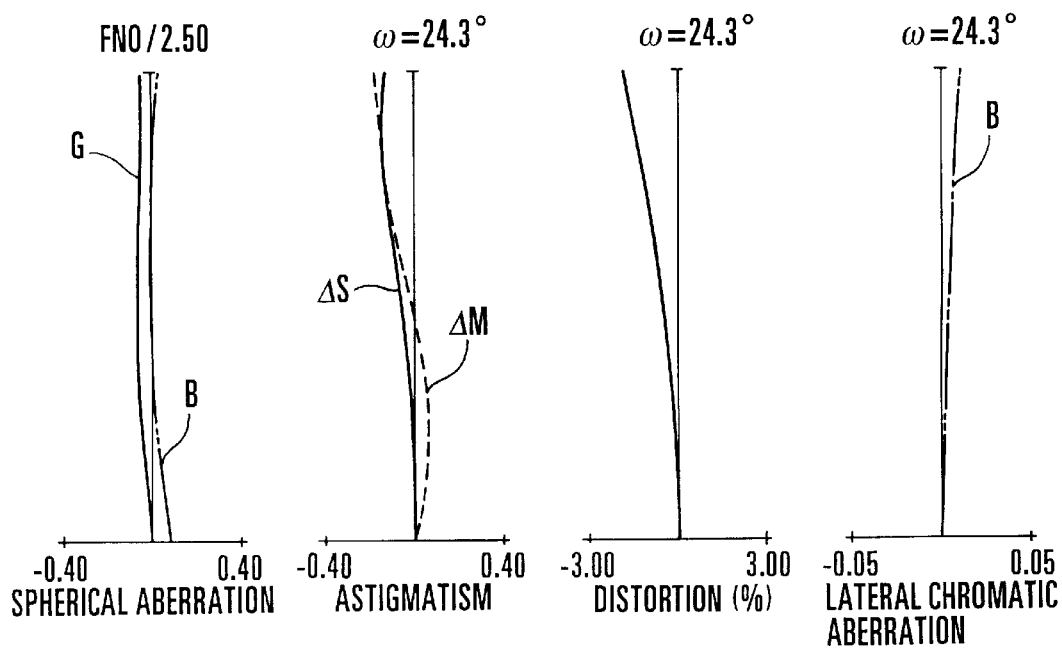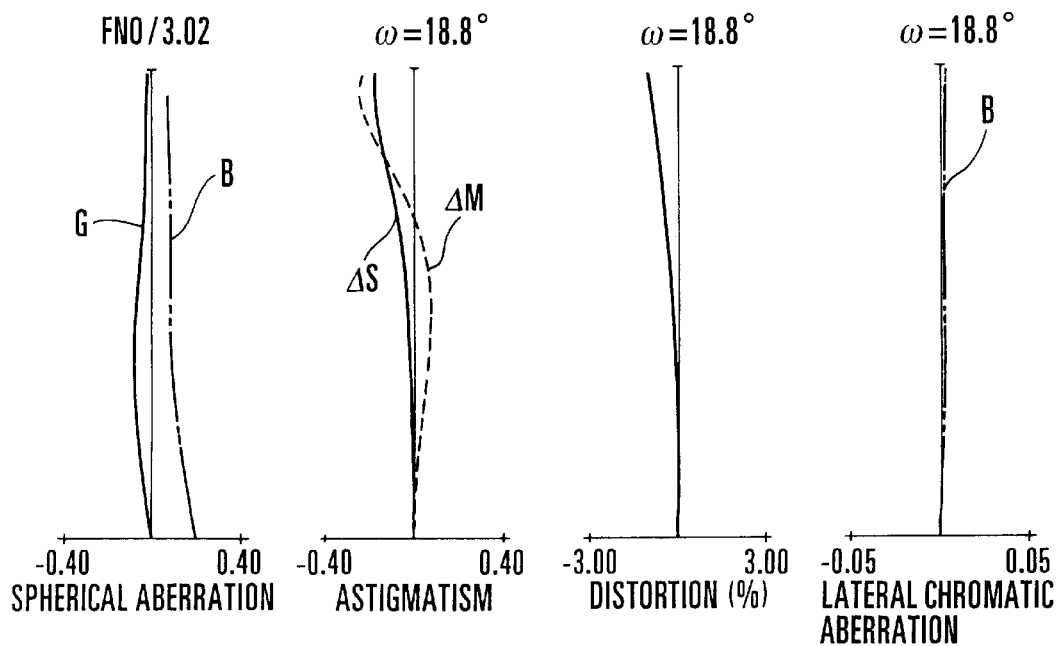

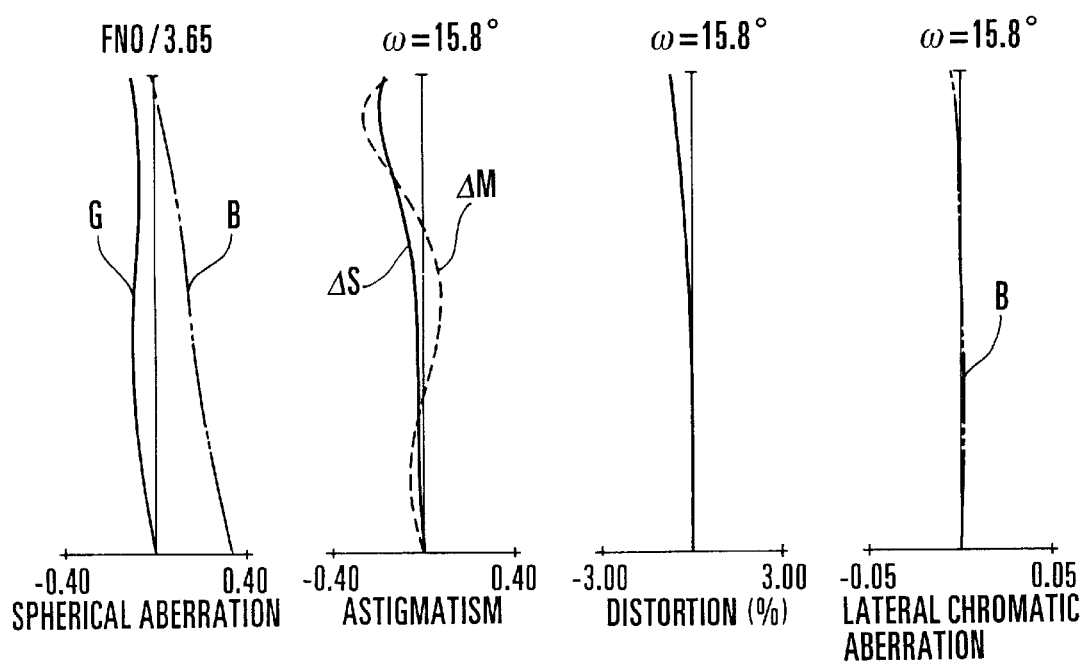

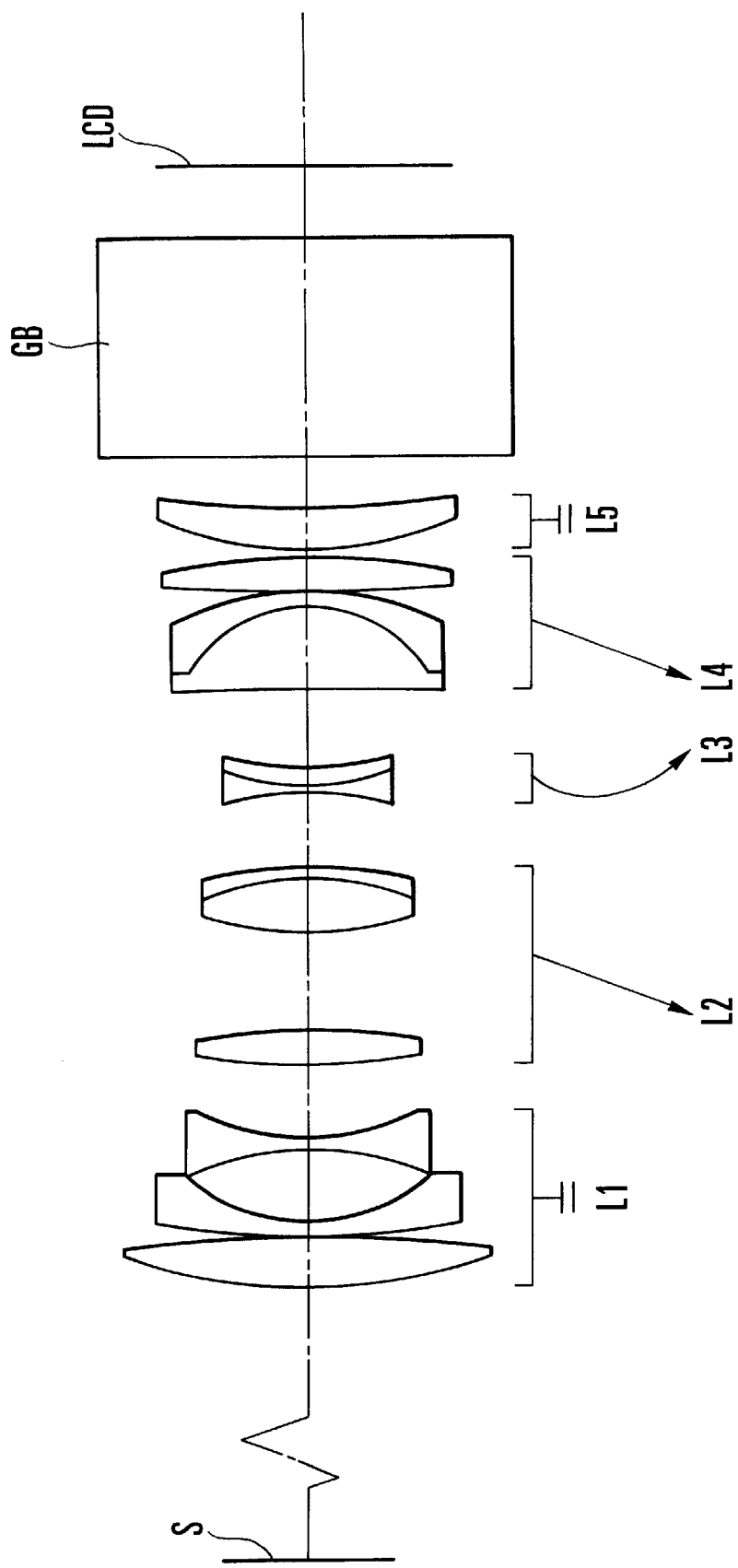
F I G. 57

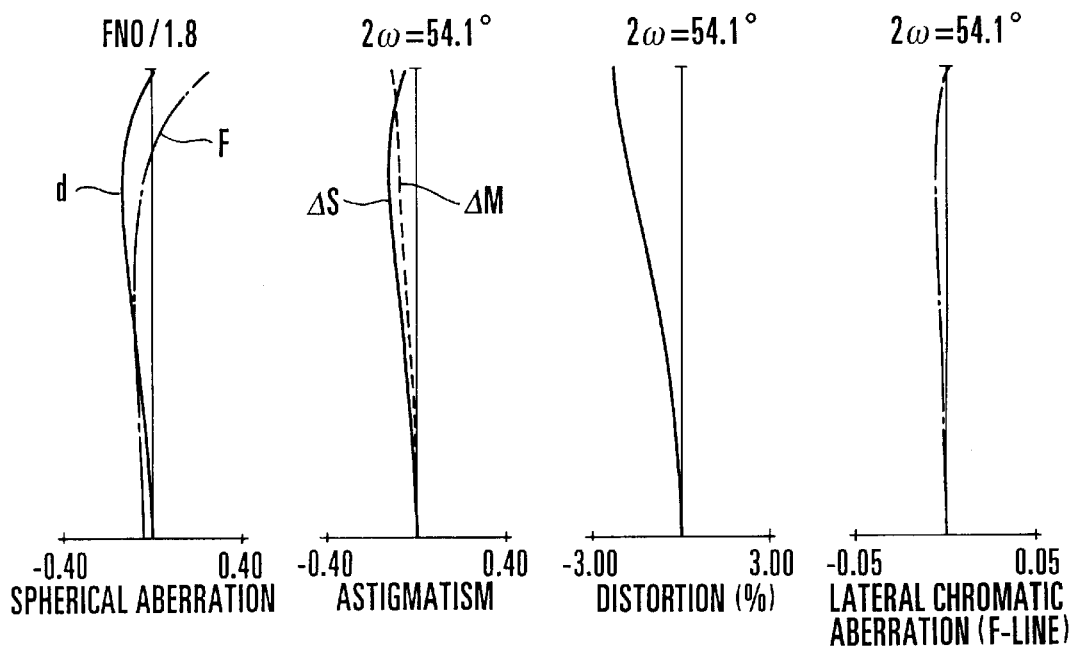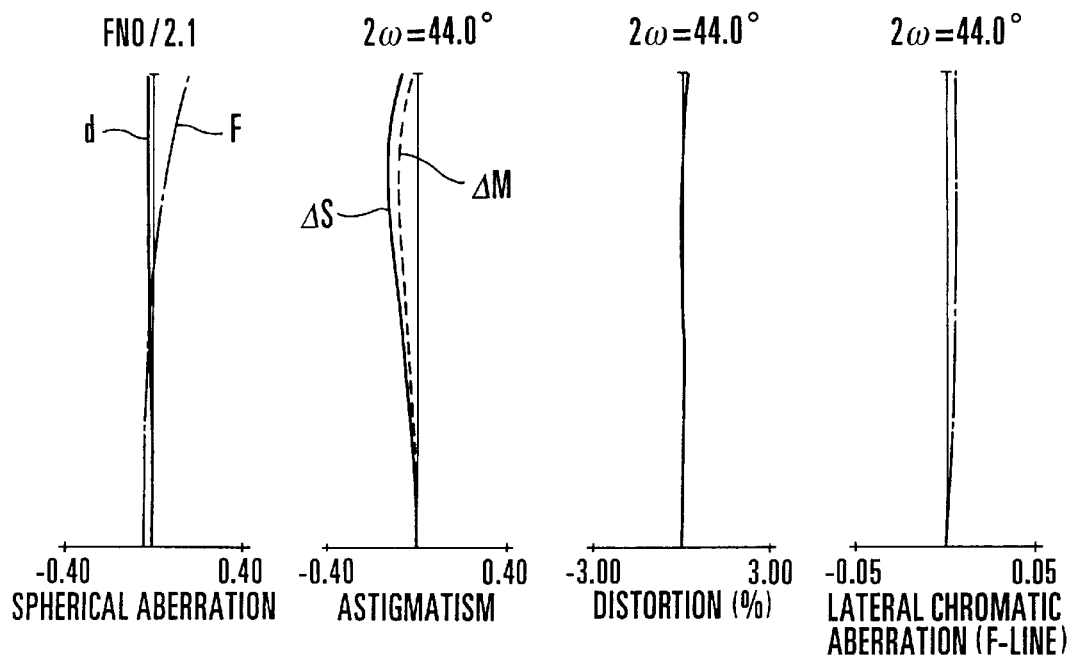

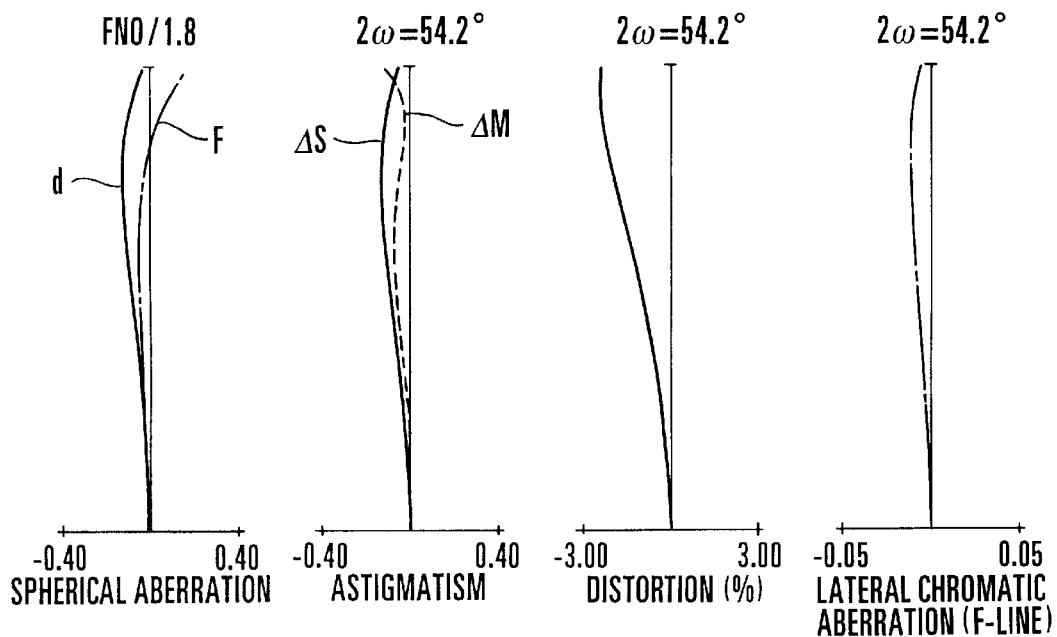
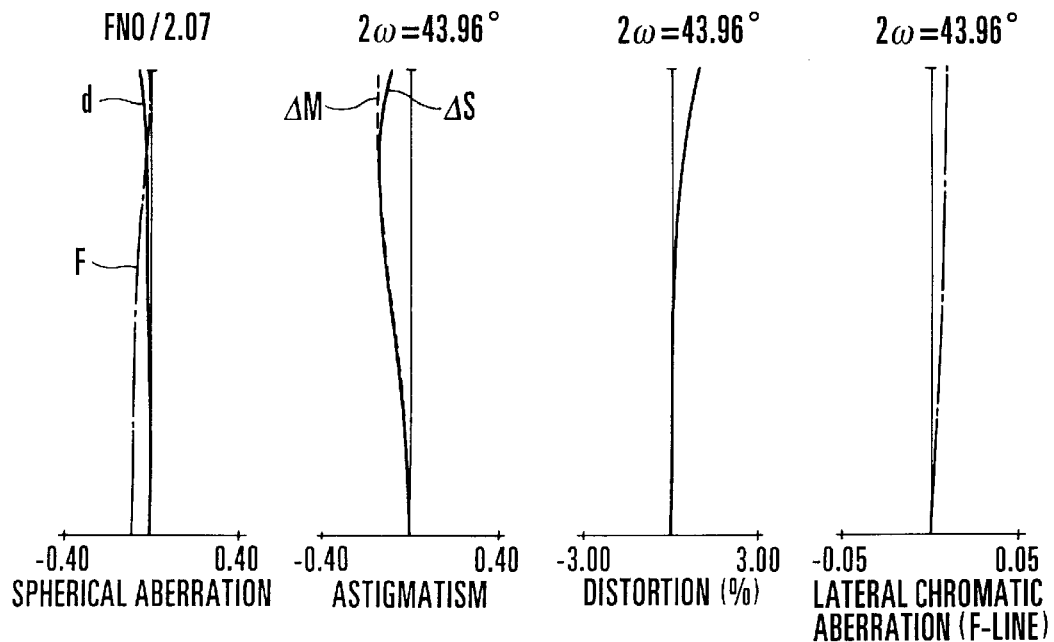

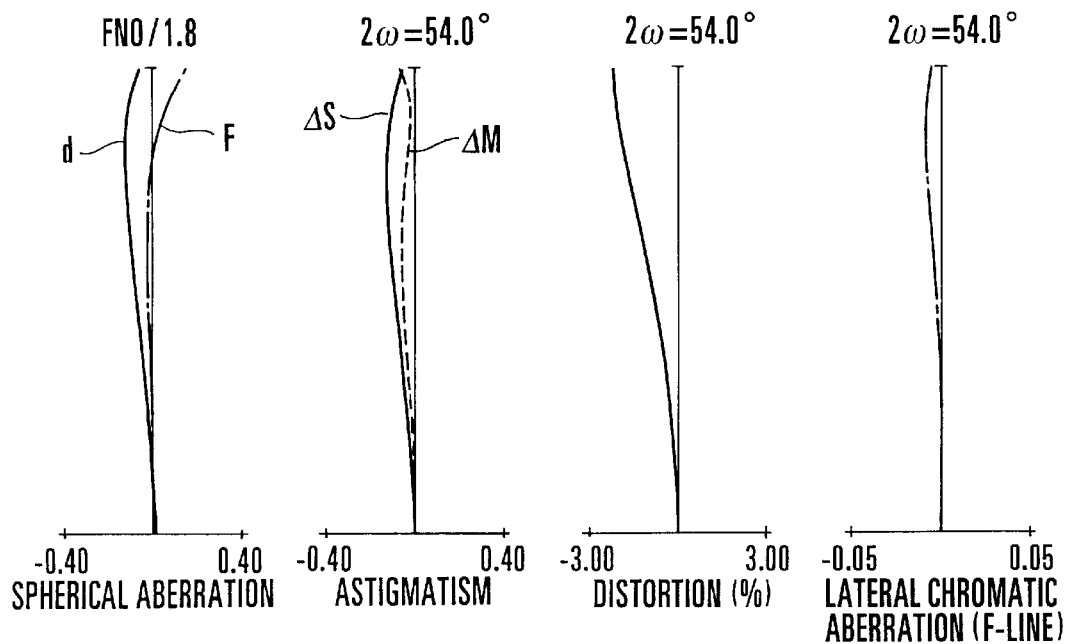
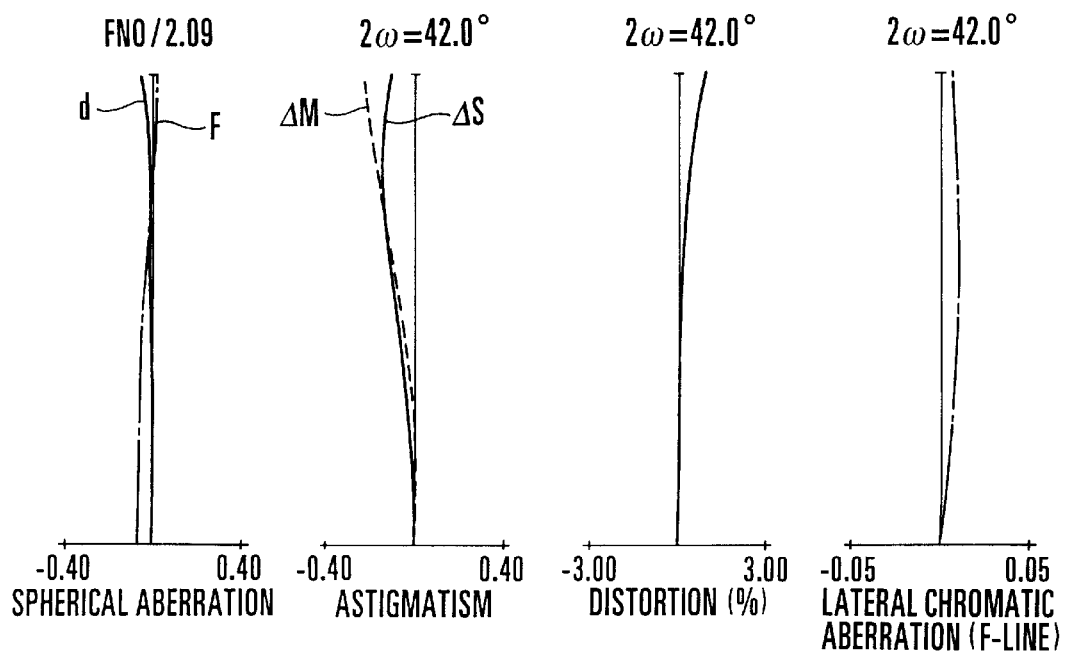

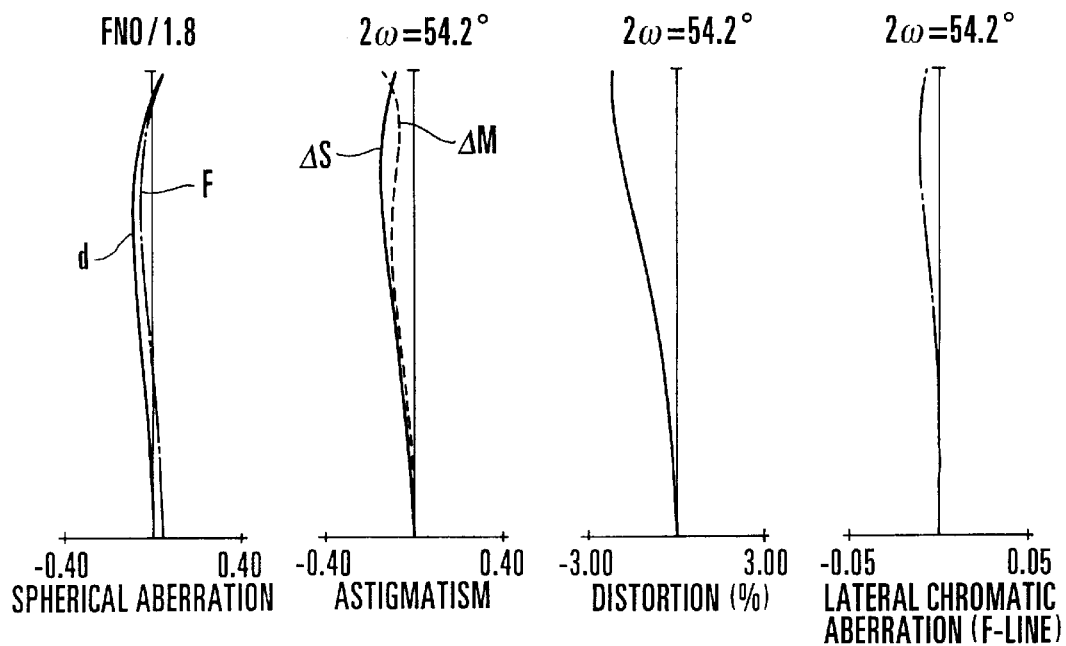
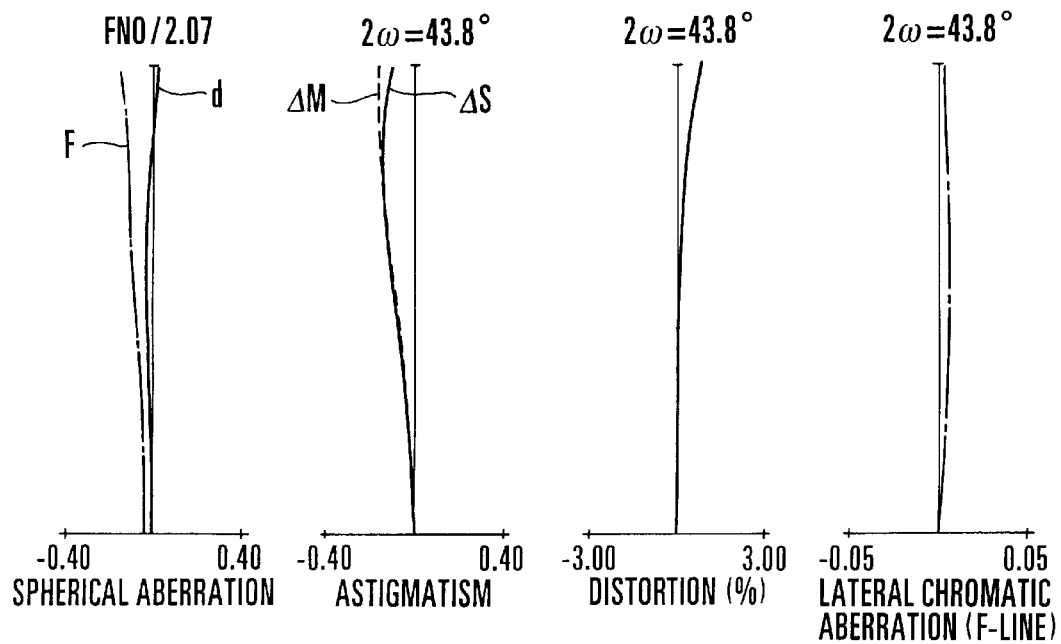

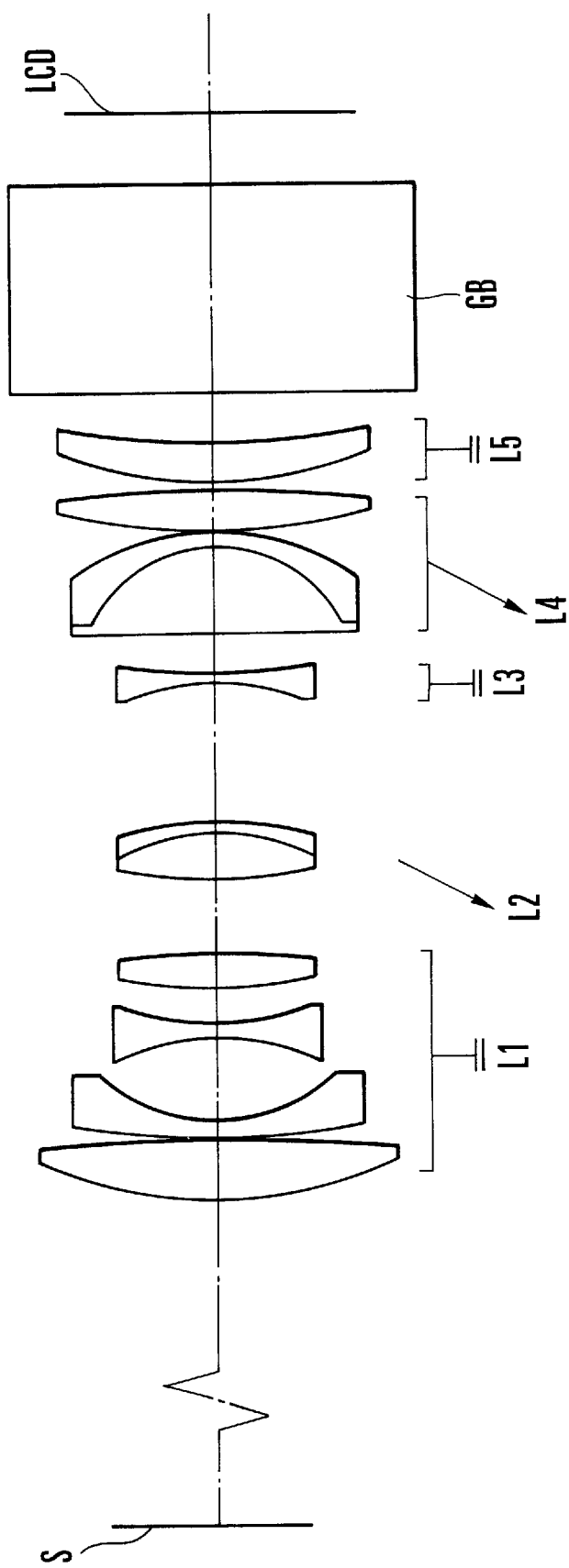
F I G. 69

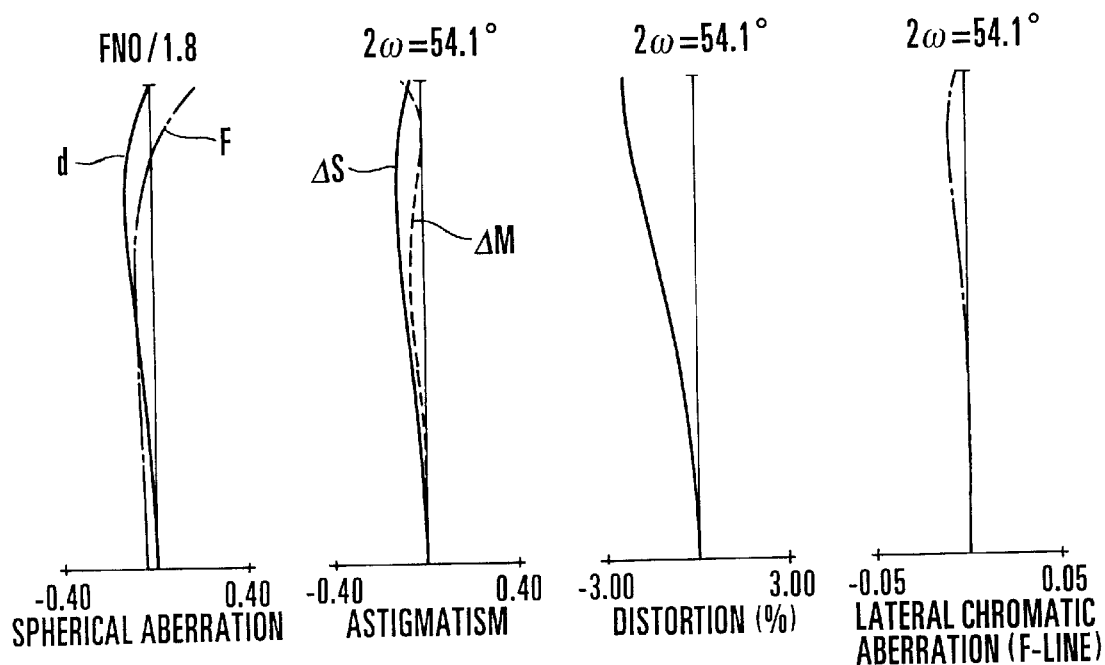
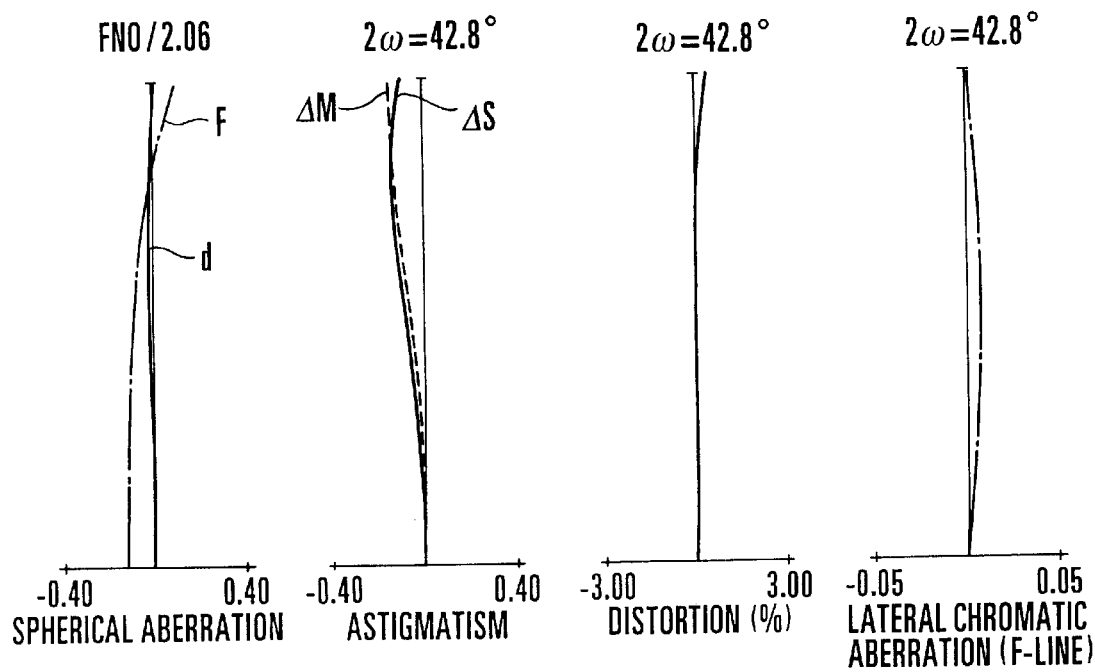

ZOOM LENS OF RETROFOCUS TYPE

BACKGROUND OF THE INVENTION

1. Field of the Invention

The present invention relates to zoom lenses and, more particularly, to zoom lenses of the retrofocus type.

2. Description of Related Art

For a camera using an image-pickup element, such as a video camera or digital still camera, a certain long back focal distance is prerequisite to the photographic lens, for the single-lens reflex camera, to a wide-angle lens, and for an liquid crystal projector, to the projection lens. It has, therefore, been the common practice in the art that a lens unit of negative refractive power takes the lead as viewed from the long-distance conjugate point side (in the camera, from the object side, or in the projector, from the screen side). That is, the retrofocus type has been used in such lenses.

Zoom lenses of the retrofocus type for such cameras are known in Japanese Laid-Open Patent Applications No. Hei 1-191820, No. Hei 3-203709 and No. Hei 3-240011. Each of these comprises, in order from the object side, a first lens unit of negative refractive power, a second lens unit of positive refractive power and a third lens unit of positive refractive power, the second lens unit axially moving to vary the focal length, while simultaneously moving the first lens unit to compensate for the shift of an image plane.

A projection lens of the retrofocus type for the liquid crystal projector in Japanese Laid-Open Patent Application No. Sho 62-291613 comprises a first lens unit of negative refractive power followed by a number of lens units whose overall refractive power is positive. Japanese Laid-Open Patent Application No. Hei 3-145613 discloses another projection lens which comprises, in order from the screen side, a first lens unit of negative refractive power, a second lens unit of positive refractive power and a third lens unit of positive refractive power.

To simplify the aberrational problems, it has been well known to use aspheric surfaces in the lens system. The aspheric surface is very effective for correcting spherical aberration, curvature of field and coma, but has a little effect on chromatic aberrations. To correct chromatic aberrations, a diffractive optical element can be used as disclosed in Japanese Laid-Open Patent Application No. Hei 4-213421 (U.S. Pat. No. 5,044,706), Japanese Laid-Open Patent Application No. Hei 6-324262 and U.S. Pat. No. 5,268,790 and No. 5,493,441.

However, the lens systems disclosed in Japanese Laid-Open Patent Applications No. Hei 4-213421 and No. Hei 6-324262 are monofocal. Therefore, no consideration is made on the chromatic aberrations of the zoom lens, in which their variation is very peculiar. Meanwhile, U.S. Pat. No. 5,268,790 and U.S. Pat. No. 5,493,441, although disclosing examples of application of the diffractive optical element to zoom lenses, both do not relate to the retrofocus type. So far, there are not known any examples of application of diffractive optical elements to the retrofocus type zoom lens.

BRIEF SUMMARY OF THE INVENTION

An object of the present invention is to provide a zoom lens of heretofore unknown configuration, as obtained by using a diffractive optical element in the retrofocus type of zoom lens.

To achieve the above object, in accordance with an aspect of the invention, there is provided a zoom lens of retrofocus type, which comprises, in order from a longer-distance conjugate point side to a shorter-distance conjugate point side, a front lens unit of negative refractive power, and a rear lens unit of positive refractive power, wherein a separation between the front lens unit and the rear lens unit varies according to variation of magnification, and at least one of the front lens unit and the rear lens unit is provided with a diffractive optical element.

The above and other objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 6A to 6D are graphic representations of the aberrations of the embodiment 1 in the wide-angle end.

FIGS. 7A to 7D are graphic representations of the aberrations of the embodiment 1 in the telephoto end.

FIGS. 8A to 8D are graphic representations of the aberrations of the embodiment 2 in the wide-angle end.

FIGS. 9A to 9D are graphic representations of the aberrations of the embodiment 2 in the telephoto end.

FIGS. 10A to 10D are graphic representations of the aberrations of the embodiment 3 in the wide-angle end.

FIGS. 11A to 11D are graphic representations of the aberrations of the embodiment 3 in the telephoto end.

FIGS. 12A to 12D are graphic representations of the aberrations of the embodiment 4 in the wide-angle end.

FIGS. 13A to 13D are graphic representations of the aberrations of the embodiment 4 in the telephoto end.

FIGS. 14A to 14D are graphic representations of the aberrations of the embodiment 5 in the wide-angle end.

FIGS. 15A to 15D are graphic representations of the aberrations of the embodiment 5 in the telephoto end.

FIG. 22 is a sectional view of a diffractive optical element of another laminated structure.

FIGS. 27A to 27D are graphic representations of the aberrations of the embodiment 6 in the wide-angle end.

FIGS. 28A to 28D are graphic representations of the aberrations of the embodiment 6 in a middle focal length position.

FIGS. 29A to 29D are graphic representations of the aberrations of the embodiment 6 in the telephoto end.

FIGS. 30A to 30D are graphic representations of the aberrations of the embodiment 7 in the wide-angle end.

FIGS. 31A to 31D are graphic representations of the aberrations of the embodiment 7 in a middle focal length position.

FIGS. 32A to 32D are graphic representations of the aberrations of the embodiment 7 in the telephoto end.

FIGS. 33A to 33D are graphic representations of the aberrations of the embodiment 8 in the wide-angle end.

FIGS. 34A to 34D are graphic representations of the aberrations of the embodiment 8 in a middle focal length position.

FIGS. 35A to 35D are graphic representations of the aberrations of the embodiment 8 in the telephoto end.

FIGS. 36A to 36D are graphic representations of the aberrations of the embodiment 9 in the wide-angle end.

FIGS. 37A to 37D are graphic representations of the aberrations of the embodiment 9 in a middle focal length position.

FIGS. 38A to 38D are graphic representations of the aberrations of the embodiment 9 in the telephoto end.

FIGS. 44A to 44D are graphic representations of the aberrations of the embodiment 10 in the wide-angle end.

FIGS. 45A to 45D are graphic representations of the aberrations of the embodiment 10 in a middle focal length position.

FIGS. 46A to 46D are graphic representations of the aberrations of the embodiment 10 in the telephoto end.

FIGS. 47A to 47D are graphic representations of the aberrations of the embodiment 11 in the wide-angle end.

FIGS. 50A to 50D are graphic representations of the aberrations of the embodiment 12 in the wide-angle end.

FIGS. 51A to 51D are graphic representations of the aberrations of the embodiment 12 in a middle focal length position.

FIGS. 52A to 52D are graphic representations of the aberrations of the embodiment 12 in the telephoto end.

FIG. 57 is a longitudinal section view of an embodiment 13 of the zoom lens.

FIGS. 58A to 58D are graphic representations of the aberrations of the embodiment 13 in the wide-angle end.

FIGS. 59A to 59D are graphic representations of the aberrations of the embodiment 13 in the telephoto end.

FIGS. 61A to 61D are graphic representations of the aberrations of the embodiment 14 in the wide-angle end.

FIGS. 62A to 62D are graphic representations of the aberrations of the embodiment 14 in the telephoto end.

FIGS. 64A to 64D are graphic representations of the aberrations of the embodiment 15 in the wide-angle end.

FIGS. 65A to 65D are graphic representations of the aberrations of the embodiment 15 in the telephoto end.

FIGS. 67A to 67D are graphic representations of the aberrations of the embodiment 16 in the wide-angle end.

FIGS. 68A to 68D are graphic representations of the aberrations of the embodiment 16 in the telephoto end.

FIG. 69 is a longitudinal section view of an embodiment 17 of the zoom lens.

FIGS. 70A to 70D are graphic representations of the aberrations of the embodiment 17 in the wide-angle end.

FIGS. 71A to 71D are graphic representations of the aberrations of the embodiment 17 in the telephoto end.

DETAILED DESCRIPTION OF THE INVENTION

Hereinafter, preferred embodiments of the invention will be described in detail with reference to the drawings.

Figure 1:
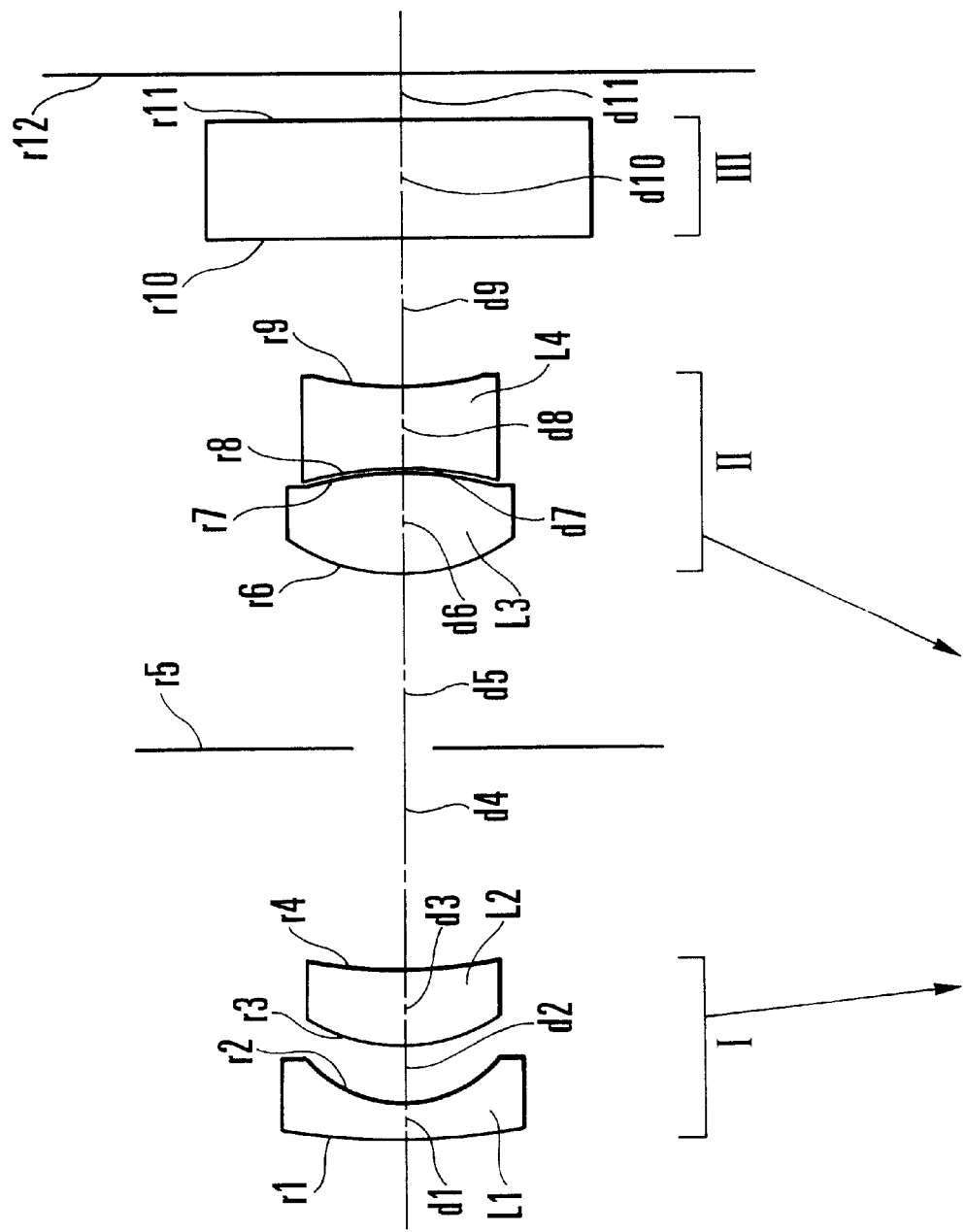
FIG. 1 is a longitudinal section view of an embodiment 1 of the zoom lens.
Figure 2:
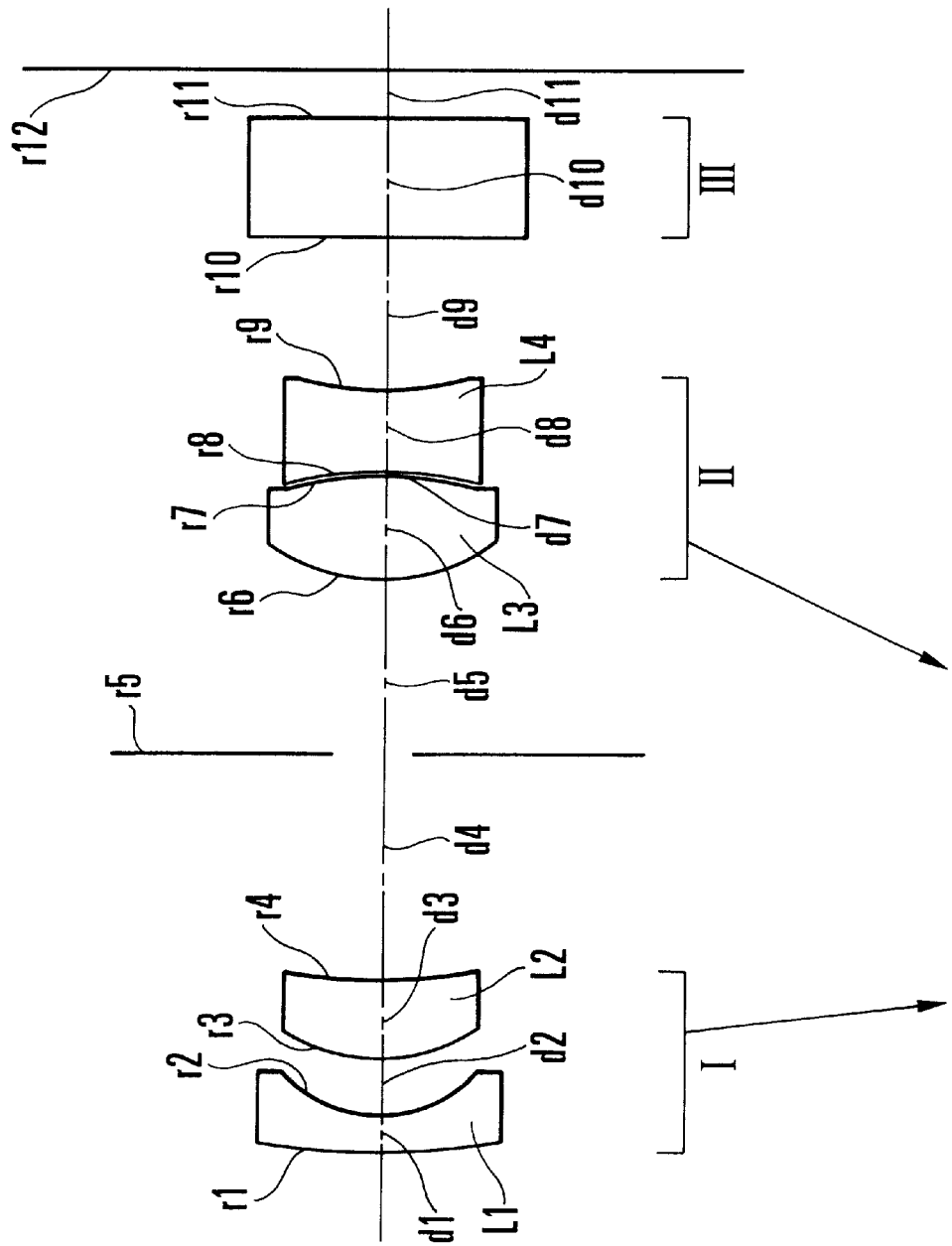
FIG. 2 is a longitudinal section view of an embodiment 2 of the zoom lens.
Figure 3:
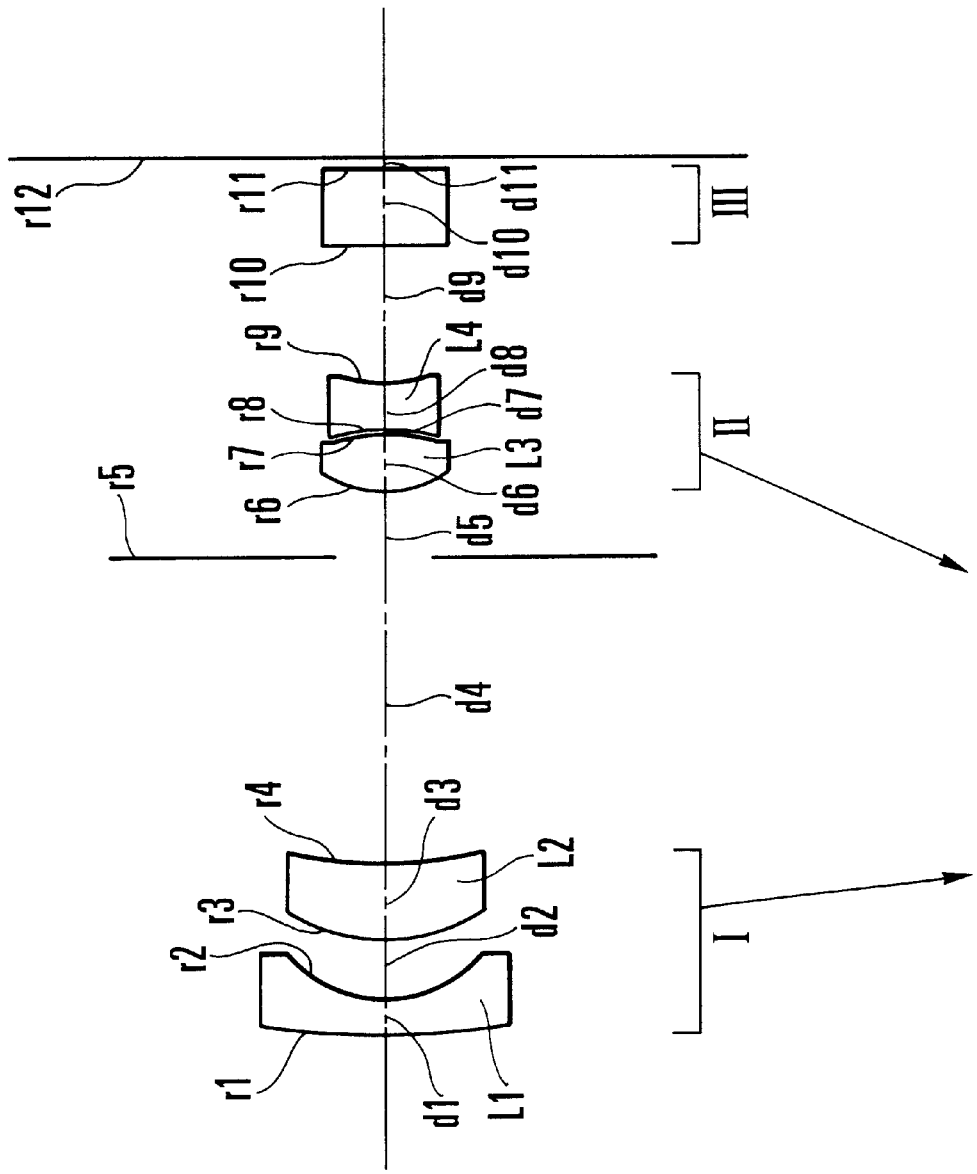
FIG. 3 is a longitudinal section view of an embodiment 3 of the zoom lens.
Figure 4:
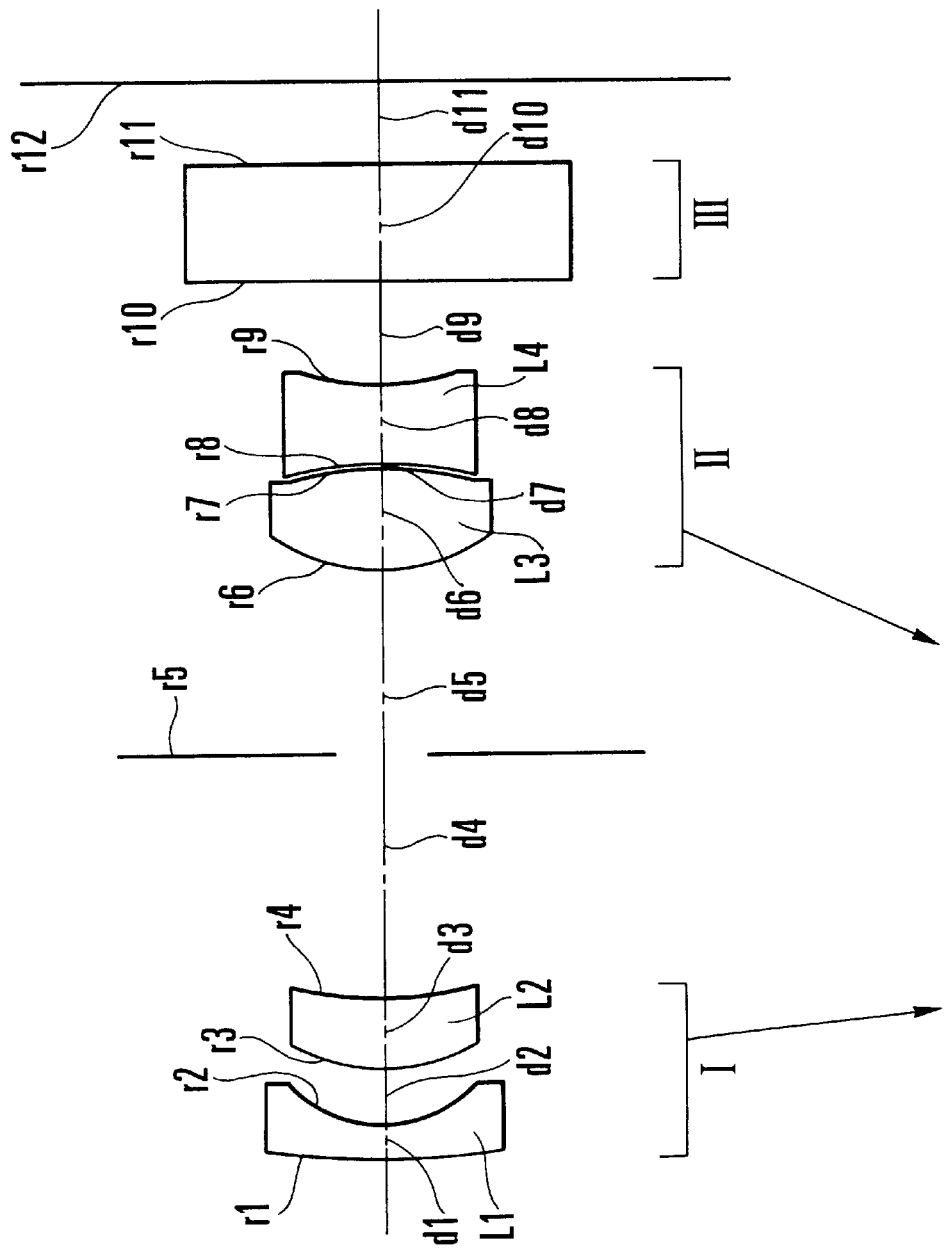
FIG. 4 is a longitudinal section view of an embodiment 4 of the zoom lens.

FIG. 1 in lens block diagram shows a first embodiment 1 of a 2-unit zoom lens for the digital still camera in the wide-angle end. The zoom lens comprises, in order from the object side (the longer-distance conjugate point side), a first lens unit I that is the front lens unit and a second lens unit II that is the rear lens unit and a flat plane glass III such as color filters and a phase plate. The first lens unit I is constructed with two lenses L1 and L2 in minus-plus power arrangement, having a negative refractive power as a whole. The second lens unit II is constructed with two lenses L3 and L4 in plus-minus power arrangement, having a positive refractive power as a whole. During zooming from the wide-angle end to the telephoto (end, the first lens unit I axially moves toward the image side, while simultaneously the second lens unit II axially moves toward the object side, as shown by the arrows. In the embodiment 1, use is made of a diffractive optical surface on the front lens surface of the lens L3 in the second lens unit II, thus canceling chromatic aberrations in the first and second lens units I and II. Thus, in the embodiment 1, the lens L3 is a diffractive optical element.

Further, the rear lens surface of the lens L1, the front lens surface of the lens L3 and the rear lens surface of the lens L4 are formed to aspheric shapes.

On the premise that the diffractive optical element is to be used in the 2-unit zoom lens, it is found that its unique merit is most effectively obtained when the diffractive optical element takes its place in the first surface of the second lens unit II as in the present embodiment. With this arrangement, concerning the longitudinal chromatic aberration, achromatism can be almost completed in the second lens unit II. Particularly, for the long focal lengths at or near the telephoto end, the achromatic effect is excellent.

The lateral chromatic aberration, too, can be deprived of almost perfectly by introducing the diffractive optical element. It is to be noted that, particularly in the wide-angle region, the chromatic aberrations produced from the glass lenses of the second lens unit II are preliminarily corrected to an excess in the reverse direction by the diffractive optical element. When combined with the front lens unit, this residual is canceled out. The chromatic aberrations on the image plane are thus maintained stable at a minimum.

The diffractive optical element may be made up with varying pitches in order to act as en aspheric surface. The terms in higher orders of the phase are then optimized so that the diffractive optical surface has an effect of correcting even coma and spherical aberration in the wide-angle end for improving the performance.

The use of such a configuration as in the present embodiment 1 leads to provide a possibility of correcting well not only spherical aberration, coma and curvature of field but also longitudinal and lateral chromatic aberrations, thus correcting all aberrations well at once. Particularly, the variation with zooming of the chromatic aberrations, which becomes a serious problem in the zoom lens, is suppressed to a minimum. So, the optical system can be constructed with a smallest number of lens elements. It becomes possible to provide a zoom lens which is reduced to a compact size and amenable to low-cost production techniques, while still maintaining a high performance.

The diffractive optical element is an optical element for bending light by the law of diffraction that gives the following equation:

$$n \cdot \sin\theta - n' \cdot \sin\theta' = m\lambda/d$$

where n is the refractive index of the medium containing the incident light, n' is the refractive index containing the emergent light, θ is the angle of incidence, θ' is the angle of emergence, m is the order of diffraction, λ is the wavelength and d is the grating space.

For the refractive optical elements of ordinary glasses, the dispersion is expressed by $\nu=(n-1)/\Delta n$. For the diffractive optical elements, on the other hand, the dispersion is expressed by $\nu=\lambda/\Delta\lambda$. Whilst the Abbe numbers of the most optical glasses lie in a range between 20 and 95, the Abbe numbers of the diffractive optical elements take a constant value of −3.453. In other words, whilst the ordinary optical glasses are positive in the Abbe number, the diffractive optical element is negative. Even in the partial dispersion ratio, it has a far different value from those of the ordinary glasses. By utilizing such characteristics of the diffractive optical element, the chromatic correction can be done effectively.

The diffractive optical surface can be expressed by the following phase equation:

$$\phi(h)=(2\pi/\lambda)\cdot(C_1 h^2 + C_2 h^4 + \ldots + C_i h^{2 \cdot i}) \qquad (1)$$

where φ(h) is the phase of the diffractive optical element, h is the radial distance from the optical axis of the lens system, and λ is the reference wavelength. That is, the diffractive optical surface is expressed as derived from the substrate surface of the lens by adding the phase.

The aspheric surface used in the embodiment 1 is of revolution symmetry and expressed in the coordinates with h in the radial distance from the lens axis and Z(h) in the axial direction by the following equation:

$$Z(h) = \frac{(h^2/r)}{1 + \sqrt{1 - (1+k)(h/r^2)}} + Bh^4 + Ch^6 + Dh^8 + Eh^{10} \qquad (2)$$

where r is the radius of the reference curvature, and k, B, C, D and E are the aspheric coefficients.

FIGS. 2 to 5 show the form and the construction and arrangement of the constituent lenses of the embodiments 2 to 5 in the wide-angle end. Of these, the embodiments 2 to 4 shown in FIGS. 2 to 4 each employ two diffractive optical surfaces which are coincident with the rear lens surface of the lens L1 and the front lens surface of the lens L3. The lens surfaces for which to provide with aspheres are the same as in the embodiment 1.

Figure 5:
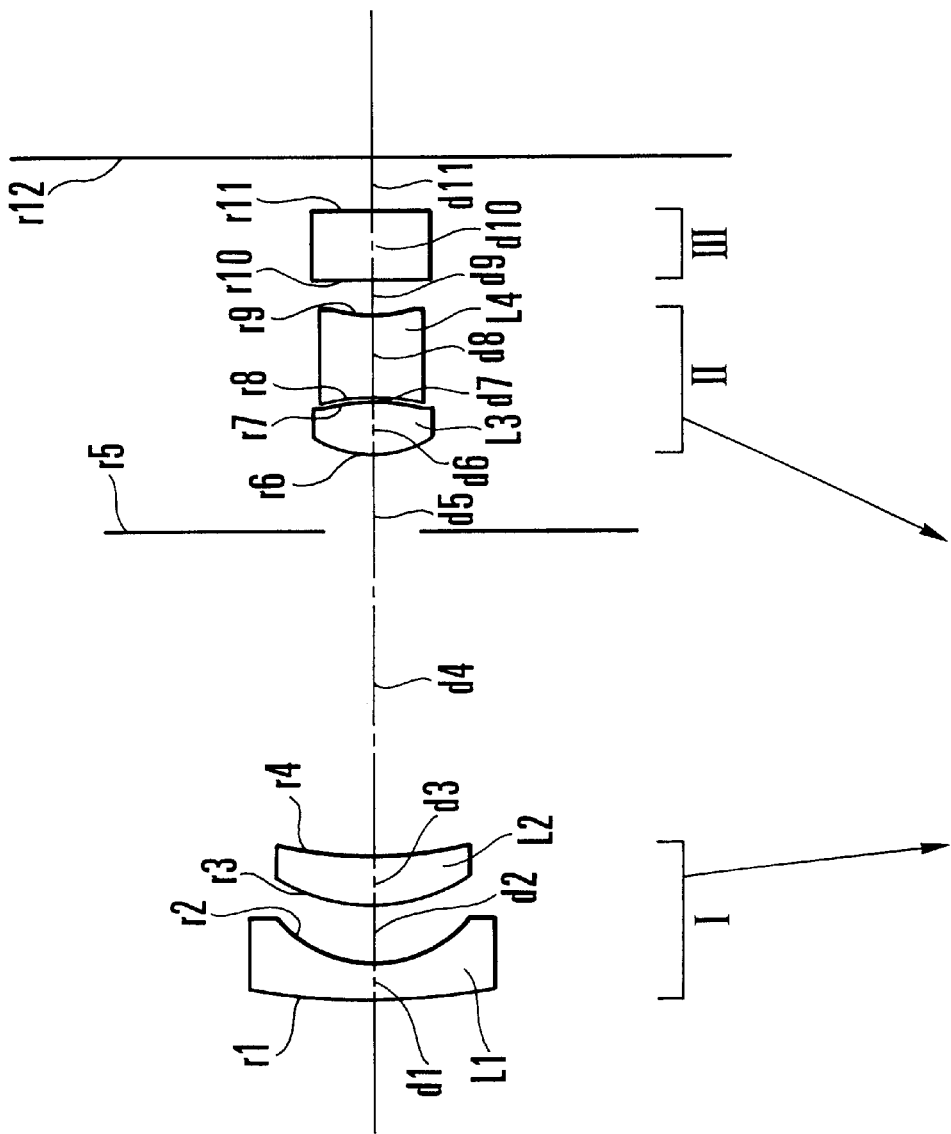
FIG. 5 is a longitudinal section view of an embodiment 5 of the zoom lens.

The embodiment 5 shown in FIG. 5 has the rear lens surface of the lens L1 in the form of a diffractive optical surface. The lens surfaces for which to provide with aspheres are the same as in the embodiments 1 to 4.

Next, five numerical examples 1 to 5 corresponding to the embodiments 1 to 5 are shown. In the numerical data for these examples, ri is the radius of curvature of the i-th lens surface, when counted from the object side, di is the i-th axial lens thickness or air separation, and ni and νi are respectively the refractive index and Abbe number of the material of the i-th lens element.

For the aspheric surfaces, the values of the coefficients in the equation (2) are tabulated. To define the diffractive optical surface, the phase coefficients in the equation (1) are evaluated. The first order of diffraction is used as the design order. The design wavelength is 587.6 nm (spectral d-line).

Numerical Example 1:

f = 3.75095~10.99   Fno = 1:2.85~5.66   2ω = 66.3°~25.2°

| | | | |
|---|---|---|---|
| r1 = 21.087 | d1 = 0.81 | n1 = 1.77250 | ν1 = 49.6 |
| r2 = 2.828 | d2 = 1.76 | | |
| r3 = 5.459 | d3 = 1.81 | n2 = 1.80518 | ν2 = 25.4 |
| r4 = 9.662 | d4 = Variable | | |
| r5 = ∞ (Stop) | d5 = Variable | | |
| r6 = 4.225 | d6 = 2.88 | n3 = 1.67790 | ν3 = 55.3 |
| r7 = −8.330 | d7 = 0.12 | | |
| r8 = −8.807 | d8 = 2.20 | n4 = 1.80518 | ν4 = 25.4 |
| r9 = 34.023 | d9 = Variable | | |
| r10 = ∞ | d10 = 3.10 | n5 = 1.51633 | ν5 = 64.2 |
| r11 = ∞ | d11 = 1.22 | | |
| r12 = ∞ | | | |

-continued

|  | Focal Length | | |
|---|---|---|---|
|  | 3.75 | 3.88 | 10.99 |
| d4 | 5.87 | 5.28 | 1.00 |
| d5 | 4.40 | 4.58 | 1.00 |
| d9 | 3.82 | 3.95 | 10.98 |

Aspheric Coefficients:

r2 q:  $r = 2.82839 \cdot 10^0$   $k = -1.59475 \cdot 10^{-1}$   $B = -2.14175 \cdot 10^{-3}$
       $C = -2.76791 \cdot 10^{-4}$   $D = 1.51140 \cdot 10^{-5}$   $E = -5.24174 \cdot 10^{-6}$
r6 bq: $r = 4.22466 \cdot 10^0$   $k = -2.42500 \cdot 10^{-1}$   $B = -2.73790 \cdot 10^{-5}$
       $C = 3.88250 \cdot 10^{-5}$   $D = -2.91830 \cdot 10^{-6}$   $E = 0.00000 \cdot 10^0$
r9 q:  $r = 3.40225 \cdot 10^{-1}$   $k = 8.17051 \cdot 10^0$   $B = 4.16531 \cdot 10^{-3}$
       $C = 4.46491 \cdot 10^{-4}$   $D = -2.84128 \cdot 10^{-5}$   $E = 9.74972 \cdot 10^{-6}$ Phase Coefficients:

r6:  $C_1 = -1.32450 \cdot 10^{-3}$   $C_2 = -5.48090 \cdot 10^{-5}$   $C_3 = 4.38270 \cdot 10^{-5}$
     $C_4 = -5.69600 \cdot 10^{-6}$   $C_5 = 2.99310 \cdot 10^{-7}$ Numerical Example 2:

$f = 3.75096 \sim 10.99$   Fno = 1:2.85~5.65   $2\omega = 66.3° \sim 25.2°$

| r1 = 21.132 | d1 = 0.81 | n1 = 1.77250 | $\nu 1 = 49.6$ |
|---|---|---|---|
| r2 = 2.811 | d2 = 1.71 | | |
| r3 = 5.419 | d3 = 1.80 | n2 = 1.80518 | $\nu 2 = 25.4$ |
| r4 = 9.713 | d4 = Variable | | |
| r5 = ∞ (Stop) | d5 = Variable | | |
| r6 = 4.227 | d6 = 2.93 | n3 = 1.67790 | $\nu 3 = 55.3$ |
| r7 = −8.320 | d7 = 0.11 | | |
| r8 = −8.686 | d8 = 2.19 | n4 = 1.80518 | $\nu 4 = 25.4$ |
| r9 = 37.319 | d9 = Variable | | |
| r10 = ∞ | d10 = 3.10 | n5 = 1.51633 | $\nu 5 = 64.2$ |
| r11 = ∞ | d11 = 1.23 | | |
| r12 = ∞ | | | |

|  | Focal Length | | |
|---|---|---|---|
|  | 3.75 | 3.97 | 10.99 |
| d4 | 5.83 | 5.11 | 1.00 |
| d5 | 4.49 | 4.52 | 1.00 |
| d9 | 3.79 | 4.00 | 10.91 |

Aspheric Coefficients:

r2:bq  $r = 2.81147 \cdot 10^0$   $k = -6.47770 \cdot 10^{-3}$   $B = -4.18270 \cdot 10^{-3}$
       $C = 2.67460 \cdot 10^{-4}$   $D = -1.28850 \cdot 10^{-4}$   $E = 0.00000 \cdot 10^0$
r6:bq  $r = 4.22466 \cdot 10^0$   $k = -2.37130 \cdot 10^{-1}$   $B = -3.12470 \cdot 10^{-5}$
       $C = 3.99250 \cdot 10^{-5}$   $D = -2.57630 \cdot 10^{-6}$   $E = 0.00000 \cdot 10^0$
r9:q   $r = 3.73194 \cdot 10^{+1}$   $k = -1.51757 \cdot 10^{+1}$   $B = 4.14203 \cdot 10^{-3}$
       $C = 4.80770 \cdot 10^{-4}$   $D = -4.04006 \cdot 10^{-5}$   $E = 1.12205 \cdot 10^{-5}$ Phase Coefficients:

r2:  $C_1 = -5.45840 \cdot 10^{-4}$   $C_2 = 9.41210 \cdot 10^{-4}$   $C_3 = -5.90030 \cdot 10^{-4}$
     $C_4 = 1.40270 \cdot 10^{-4}$   $C_5 = -1.09070 \cdot 10^{-5}$
r6:  $C_1 = -1.32220 \cdot 10^{-3}$   $C_2 = -5.11230 \cdot 10^{-5}$   $C_3 = 4.00700 \cdot 10^{-5}$
     $C_4 = -4.99700 \cdot 10^{-6}$   $C_5 = 2.64420 \cdot 10^{-7}$ Numerical Example 3:

$f = 3.75087 \sim 10.99$   Fno = 1:2.85~5.65   $2\omega = 66.3° \sim 25.1°$

| r1 = 25.926 | d1 = 0.81 | n1 = 1.80100 | $\nu 1 = 35.0$ |
|---|---|---|---|
| r2 = 2.711 | d2 = 1.29 | | |
| r3 = 5.176 | d3 = 1.91 | n2 = 1.84666 | $\nu 2 = 23.8$ |
| r4 = 11.618 | d4 = Variable | | |
| r5 = ∞ (Stop) | d5 = Variable | | |
| r6 = 3.679 | d6 = 2.34 | n3 = 1.72000 | $\nu 3 = 50.3$ |
| r7 = −11.286 | d7 = 0.10 | | |
| r8 = −30.000 | d8 = 1.44 | n4 = 1.84666 | $\nu 4 = 23.8$ |
| r9 = 6.991 | d9 = Variable | | |
| r10 = ∞ | d10 = 3.10 | n5 = 1.51633 | $\nu 5 = 64.2$ |
| r11 = ∞ | d11 = 0.13 | | |
| r12 = ∞ | | | |

-continued

|  | Focal Length | | |
|---|---|---|---|
|  | 3.75 | 5.49 | 10.99 |
| d4 | 7.64 | 4.78 | 1.00 |
| d5 | 1.77 | 1.07 | 1.00 |
| d9 | 4.46 | 6.03 | 11.07 |

Aspheric Coefficients:

r2:bq  $r = 2.71055 \cdot 10^0$   $k = -4.93830 \cdot 10^{-1}$   $B = -6.60180 \cdot 10^{-4}$
       $C = -1.07380 \cdot 10^{-4}$   $D = -2.89890 \cdot 10^{-6}$   $E = 0.00000 \cdot 10^0$
r6:bq  $r = 3.67860 \cdot 10^0$   $k = -3.40360 \cdot 10^{-2}$   $B = -2.42480 \cdot 10^{-4}$
       $C = -1.56120 \cdot 10^{-4}$   $D = 6.57520 \cdot 10^{-6}$   $E = 0.00000 \cdot 10^0$
r9:q   $r = 6.99105 \cdot 10^0$   $k = -7.30229 \cdot 10^0$   $B = 1.06598 \cdot 10^{-2}$
       $C = 8.81474 \cdot 10^{-4}$   $D = 9.58382 \cdot 10^{-6}$   $E = 3.62469 \cdot 10^{-5}$ Phase Coefficients:

r2:  $C_1 = 1.48350 \cdot 10^{-3}$   $C_2 = -2.10080 \cdot 10^{-5}$   $C_3 = 1.07140 \cdot 10^{-4}$
     $C_4 = -1.37710 \cdot 10^{-5}$   $C_5 = 3.44510 \cdot 10^{-7}$
r6:  $C_1 = -1.68270 \cdot 10^{-3}$   $C_2 = 2.14430 \cdot 10^{-4}$   $C_3 = -1.28080 \cdot 10^{-4}$
     $C_4 = 2.64920 \cdot 10^{-5}$   $C_5 = -1.66460 \cdot 10^{-6}$ Numerical Example 4:

$f = 3.75085 \sim 10.99$   Fno = 1:2.85~5.66°   $2\omega = 66.3° \sim 25.18°$

| r1 = 29.871 | d1 = 0.90 | n1 = 1.78590 | $\nu 1 = 44.2$ |
|---|---|---|---|
| r2 = 3.216 | d2 = 1.90 | | |
| r3 = 6.466 | d3 = 1.86 | n2 = 1.76182 | $\nu 2 = 26.5$ |
| r4 = 14.947 | d4 = Variable | | |
| r5 = ∞ (Stop) | d5 = Variable | | |
| r6 = 4.385 | d6 = 2.91 | n3 = 1.71300 | $\nu 3 = 53.8$ |
| r7 = −15.726 | d7 = 0.12 | | |
| r8 = −16.991 | d8 = 2.11 | n4 = 1.84666 | $\nu 4 = 23.8$ |
| r9 = 14.858 | d9 = Variable | | |
| r10 = ∞ | d10 = 3.10 | n5 = 1.51633 | $\nu 5 = 64.2$ |
| r11 = ∞ | d11 = 3.02 | | |
| r12 = ∞ | | | |

|  | Focal Length | | |
|---|---|---|---|
|  | 3.75 | 5.75 | 10.99 |
| d4 | 7.83 | 3.12 | 1.00 |
| d5 | 5.31 | 4.49 | 1.65 |
| d9 | 2.24 | 4.09 | 9.00 |

Aspheric Coefficients:

r2:bq  $r = 3.21613 \cdot 10^0$   $k = -1.06050 \cdot 10^0$   $B = 1.29110 \cdot 10^{-3}$
       $C = 1.30560 \cdot 10^{-4}$   $D = -1.16840 \cdot 10^{-5}$   $E = 0.00000 \cdot 10^0$
r6:bq  $r = 4.38486 \cdot 10^0$   $k = -5.12940 \cdot 10^{-1}$   $B = 1.42920 \cdot 10^{-4}$
       $C = 1.68860 \cdot 10^{-5}$   $D = -2.06550 \cdot 10^{-6}$   $E = 0.00000 \cdot 10^0$
r9:q   $r = 1.48584 \cdot 10^{+1}$   $k = -7.30229 \cdot 10^0$   $B = 4.75557 \cdot 10^{-3}$
       $C = -2.28683 \cdot 10^{-5}$   $D = -2.28683 \cdot 10^{-5}$   $E = 1.31093 \cdot 10^{-5}$ Phase Coefficients:

r2:  $C_1 = 5.38670 \cdot 10^{-4}$   $C_2 = 3.02180 \cdot 10^{-4}$   $C_3 = -7.74490 \cdot 10^{-5}$
     $C_4 = 7.76268 \cdot 10^{-6}$   $C_5 = 2.86200 \cdot 10^{-8}$
r6:  $C_1 = -1.23700 \cdot 10^{-3}$   $C_2 = -3.27010 \cdot 10^{-5}$   $C_3 = 3.18390 \cdot 10^{-5}$
     $C_4 = -3.84740 \cdot 10^{-6}$   $C_5 = 1.78230 \cdot 10^{-7}$ Numeral Example 5:

$f = 3.75096 \sim 10.95$   Fno = 1:2.85~5.67   $2\omega = 66.3° \sim 25.29°$

| r1 = 67.347 | d1 = 0.81 | n1 = 1.76200 | $\nu 1 = 40.1$ |
|---|---|---|---|
| r2 = 3.564 | d2 = 1.86 | | |
| r3 = 7.114 | d3 = 1.46 | n2 = 1.84666 | $\nu 2 = 23.8$ |
| r4 = 16.975 | d4 = Variable | | |
| r5 = ∞ (Stop) | d5 = Variable | | |
| r6 = 3.947 | d6 = 2.67 | n3 = 1.73400 | $\nu 3 = 51.5$ |
| r7 = −6.098 | d7 = 0.10 | | |
| r8 = −7.045 | d8 = 2.60 | n4 = 1.84666 | $\nu 4 = 23.8$ |
| r9 = 11.231 | d9 = Variable | | |
| r10 = ∞ | d10 = 3.10 | n5 = 1.51633 | $\nu 5 = 64.2$ |

-continued r11 = ∞        d11 = Variable
r12 = ∞

|  | Focal Length | | |
|---|---|---|---|
|  | 3.75 | 6.45 | 10.95 |
| d4 | 7.85 | 3.94 | 0.16 |
| d5 | 2.69 | 0.07 | 0.10 |
| d9 | 1.29 | 3.13 | 6.23 |
| d11 | 1.88 | 1.88 | 1.88 |

Aspheric Coefficients:

r2:bq  r = 3.56368 · 10⁰       k = −1.09130 · 10⁰     B = 1.00420 · 10⁻³
       C = 3.20070 · 10⁻⁵      D = −1.48110 · 10⁻⁶    E = 0.00000 · 10⁰
r6:q   r = 3.94652 · 10⁰       k = −1.85220 · 10⁻¹    B = −6.48580 · 10⁻⁴
       C = −1.74870 · 10⁻⁵     D = −1.25600 · 10⁻⁵    E = 0.00000 · 10⁰
r9:q   r = 1.12315 · 10⁺¹      k = −7.30229 · 10⁰     B = 7.57468 · 10⁻³
       C = 7.85907 · 10⁻⁴      D = −4.38603 · 10⁻⁶    E = 4.77683 · 10⁻⁶

Phase Coefficients:

r2:   $C_1$ = −1.64750 · 10⁻⁴    $C_2$ = 1.45960 · 10⁻⁴    $C_3$ = 1.83520 · 10⁻⁵
      $C_4$ = 4.95320 · 10⁻⁶     $C_5$ = 3.38260 · 10⁻⁷

FIGS. 6A to 6D through FIGS. 15A to 15D show the aberrations of the zoom lenses of the embodiments 1 to 5, respectively. From these graphs, it is understood that any of the embodiments has been corrected well for all aberrations.

The diffractive optical elements are usually manufactured by a similar technique to that of manufacturing holographic optical elements, but may otherwise be produced in the form of "binary optics" by the photo-lithographic technique. Also, using these methods, a mold may be made, from which they are produced. Yet another method is to take casts from a thin layer of plastic material and then deposit them as the diffractive optical layer on the leas surfaces. That is, the so called "replica" technique may be used.

The grating grooves of the diffractive optical element in the embodiments described above have the kinoform as shown in FIG. 16. Further, the diffractive optical element of the present embodiments have their pitches and depths falling in the ranges chat sufficiently allow for manufacturing. For example, in the embodiment 1, when the diffractive optical element is formed in a single layer, the minimum pitch is 103.3 μm, and the depth is 0.867 μm. These values lie at the level of manufacturing the diffractive optical element satisfactorily.

Figure 17:
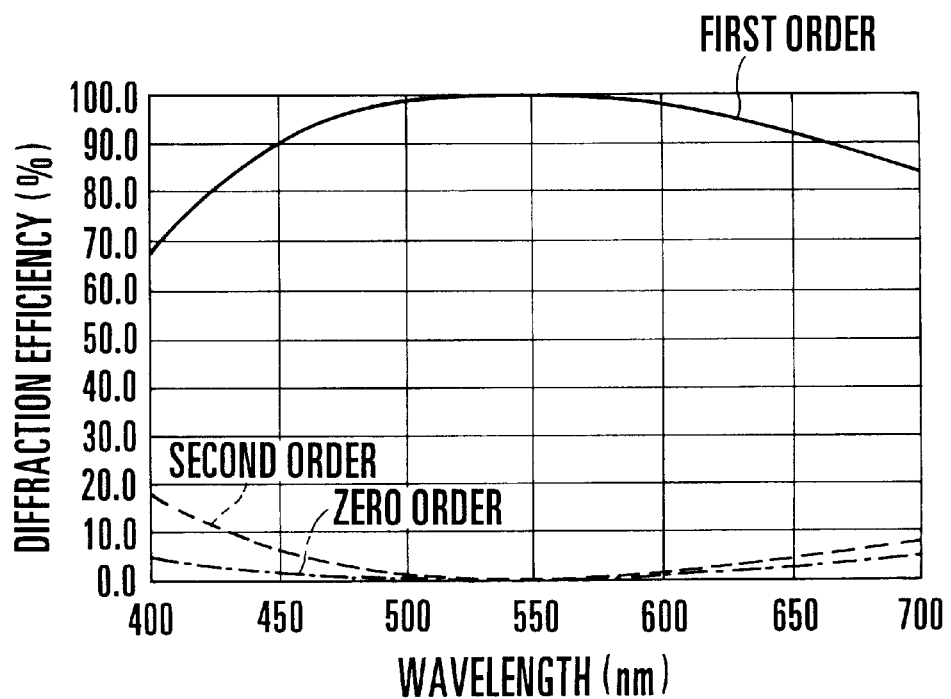
FIG. 17 is a graph of wavelength dependent characteristics.

To produce this diffraction grating, the surface of a substrate 1 is coated with an ultra-violet ray setting resin layer. In this layer 2, a diffraction grating 3 is then formed to a thickness d so that the diffraction efficiency in the first order for the wavelength of 530 μm is 100%. This diffractive optical element has wavelength dependent characteristics of the first order diffraction efficiency, as shown in FIG. 17. The diffraction efficiency in the design order becomes progressively lower as the wavelength goes away from the optimized value of 530 μm. Meanwhile, the diffracted rays of the next orders to the design one, or zero and second orders rise increasingly. This increase of the diffracted rays of the other orders than the design one causes production of flare and leads to lower the resolving power of the optical system.

Figure 16:
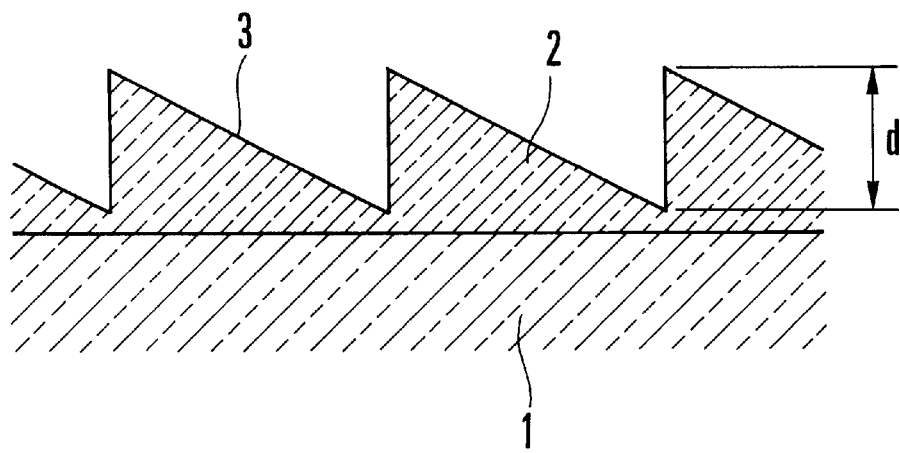
FIG. 16 is a sectional view of a monolayer diffractive optical element.
Figure 18:
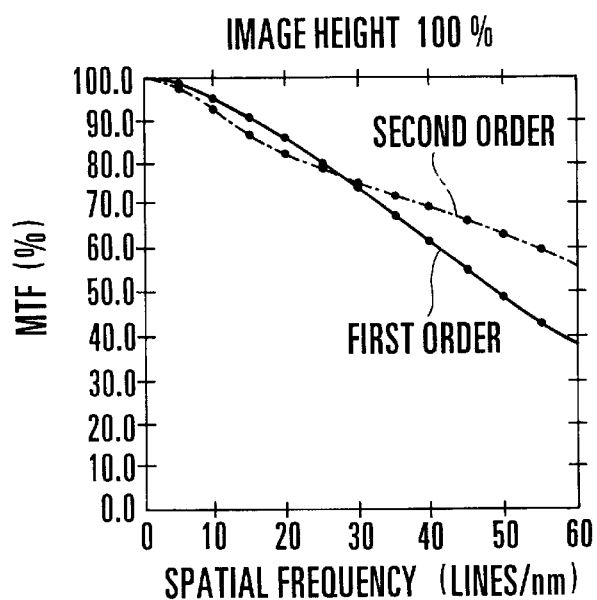
FIG. 18 is a graph of the MTF characteristics of the zoom lens of the embodiment 1 with the diffractive optical element of FIG. 16.

FIG. 18 shows the characteristics of Modulation Transfer Function (MTF) versus the spatial frequency of the grating form of FIG. 16 in the embodiment 1. It is understood that the MTF of the low frequency region is lower than the desired values.

Figure 19:
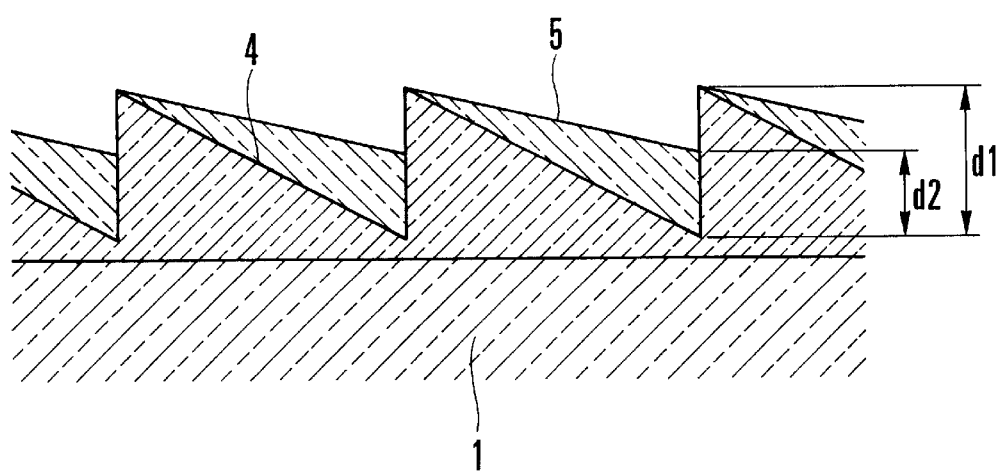
FIG. 19 is a sectional view of a diffractive optical element of a laminated structure.

So, it is considered to form the grooves of the grating by using a laminated type shown in FIG. 19. On the substrate 1, a first diffraction grating 4 is made from an ultraviolet setting resin (Nd=1.499, vd=54) and, as is stacked thereon, a second diffraction grating 5 is made from another ultraviolet setting resin (Nd=1.598, vd=28). For this combination of the materials, the grating thickness dl of the first diffraction grating 4 is determined to be d1=13.8 μm and the grating thickness d2 of the second diffraction grating 5 is determined to be d2=10.5 μm.

Figure 20:
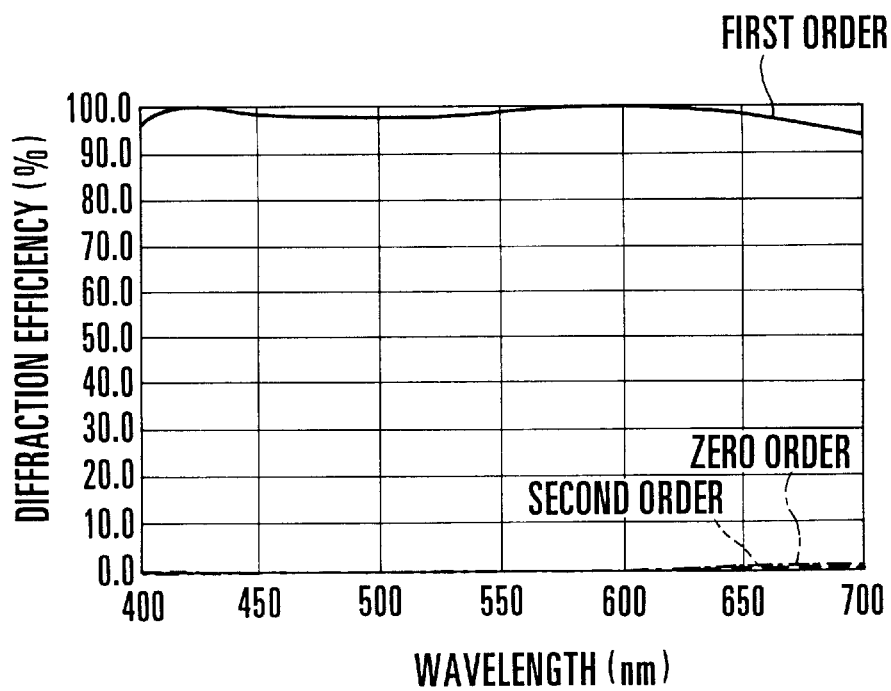
FIG. 20 is a graph of wavelength dependent characteristics.
Figure 21:
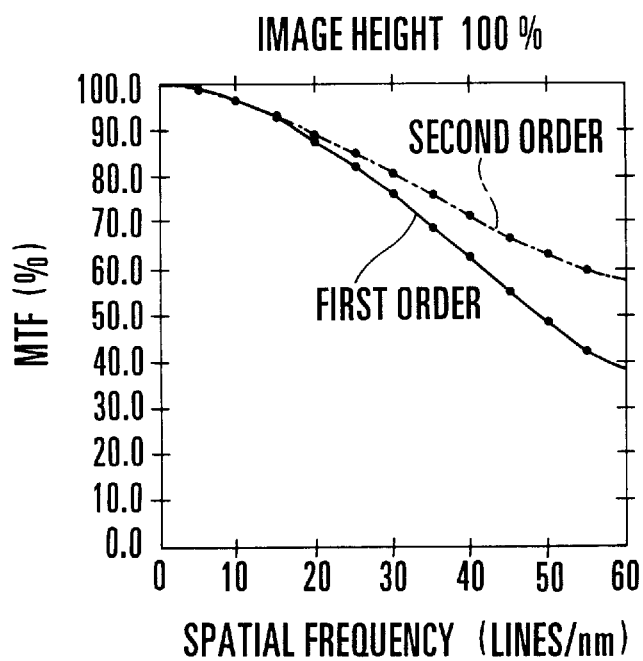
FIG. 21 is a graph of the MTF characteristics of the zoom lens of the embodiment 1 with the diffractive optical element of FIG. 19.
Figure 23:
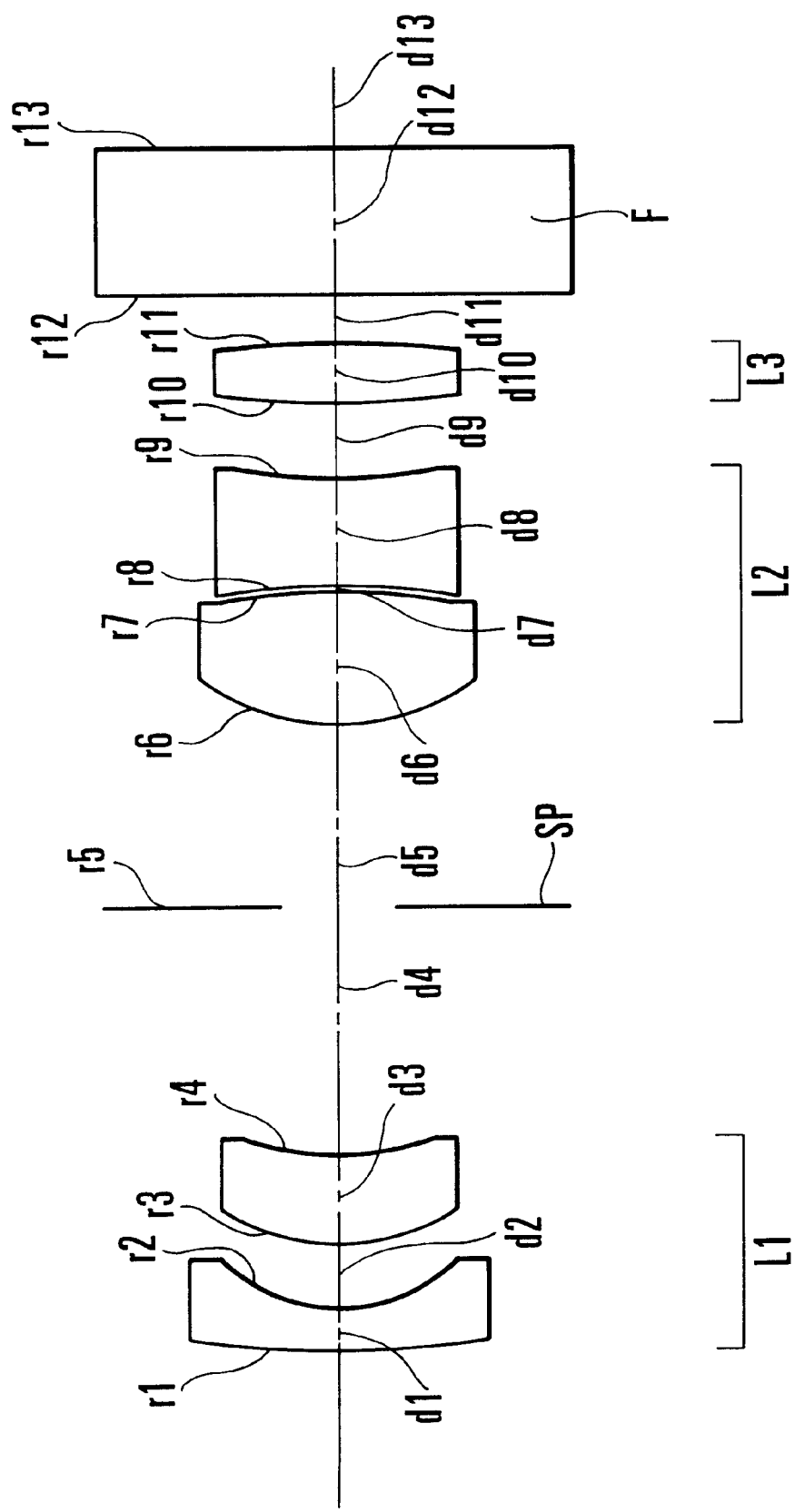
FIG. 23 is a longitudinal section view of an embodiment 6 of the zoom lens.
Figure 24:
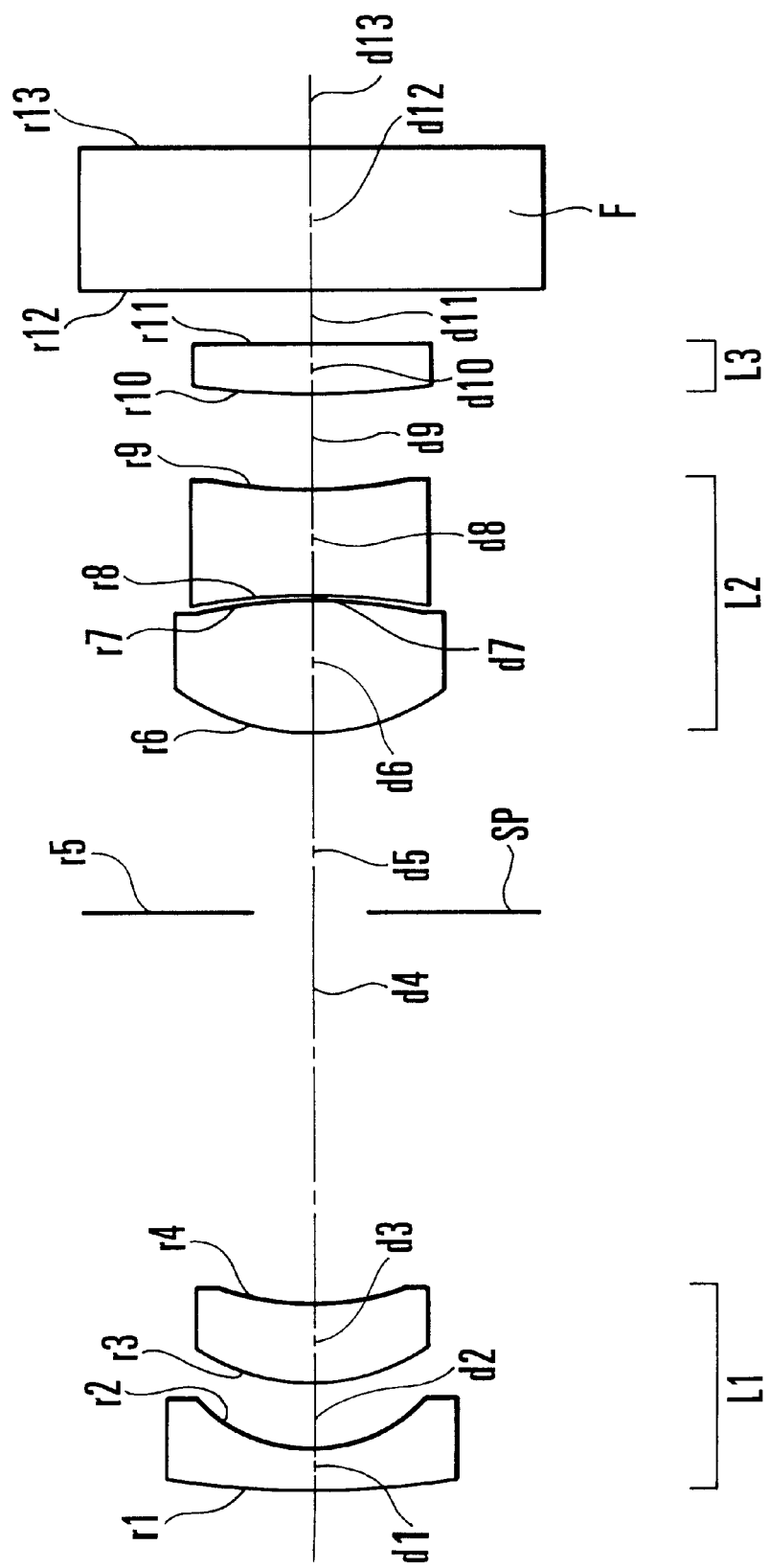
FIG. 24 is a longitudinal section view of an embodiment 7 of the zoom lens.
Figure 25:
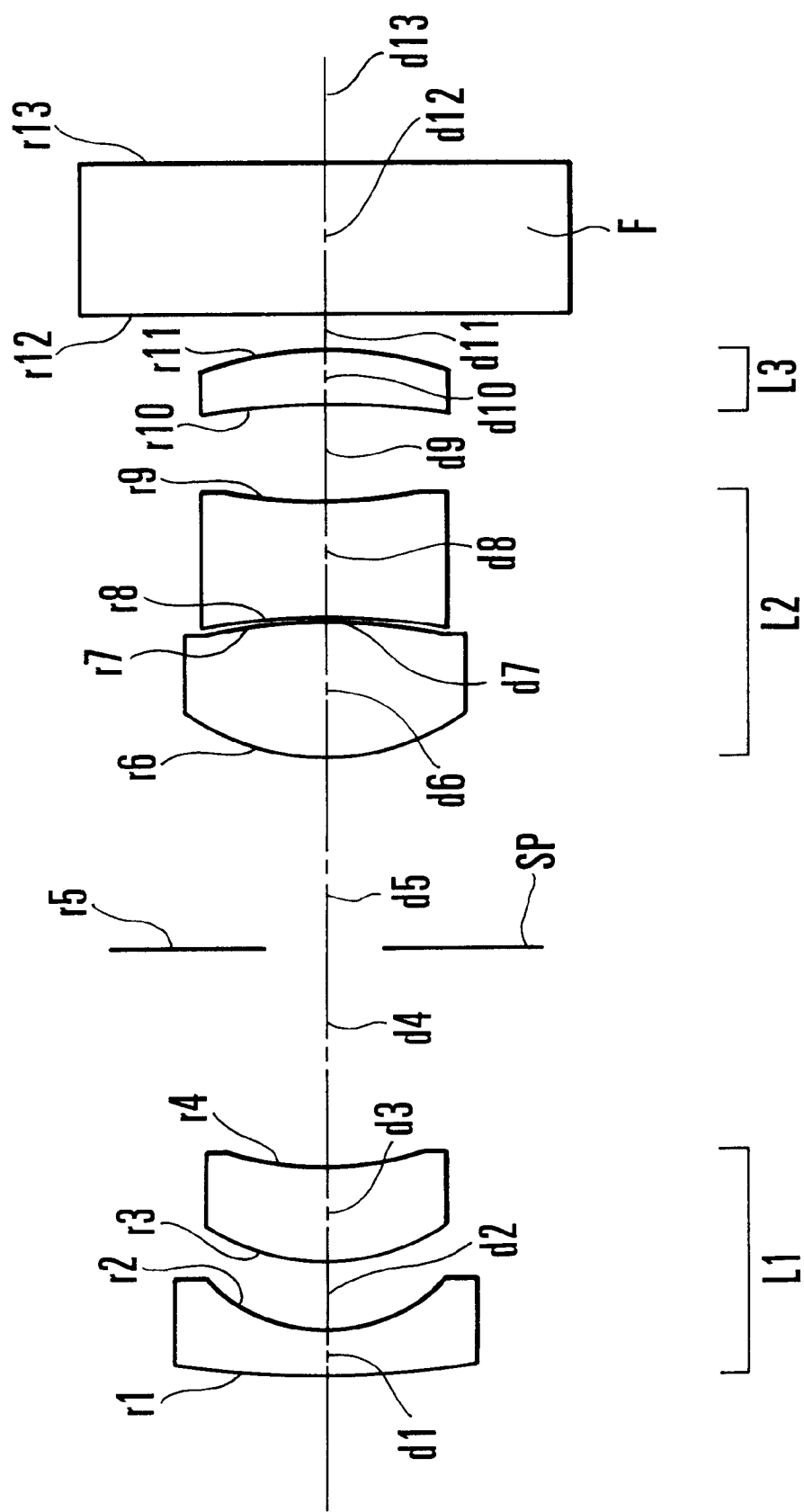
FIG. 25 is a longitudinal section view of an embodiment 8 of the zoom lens.
Figure 26:
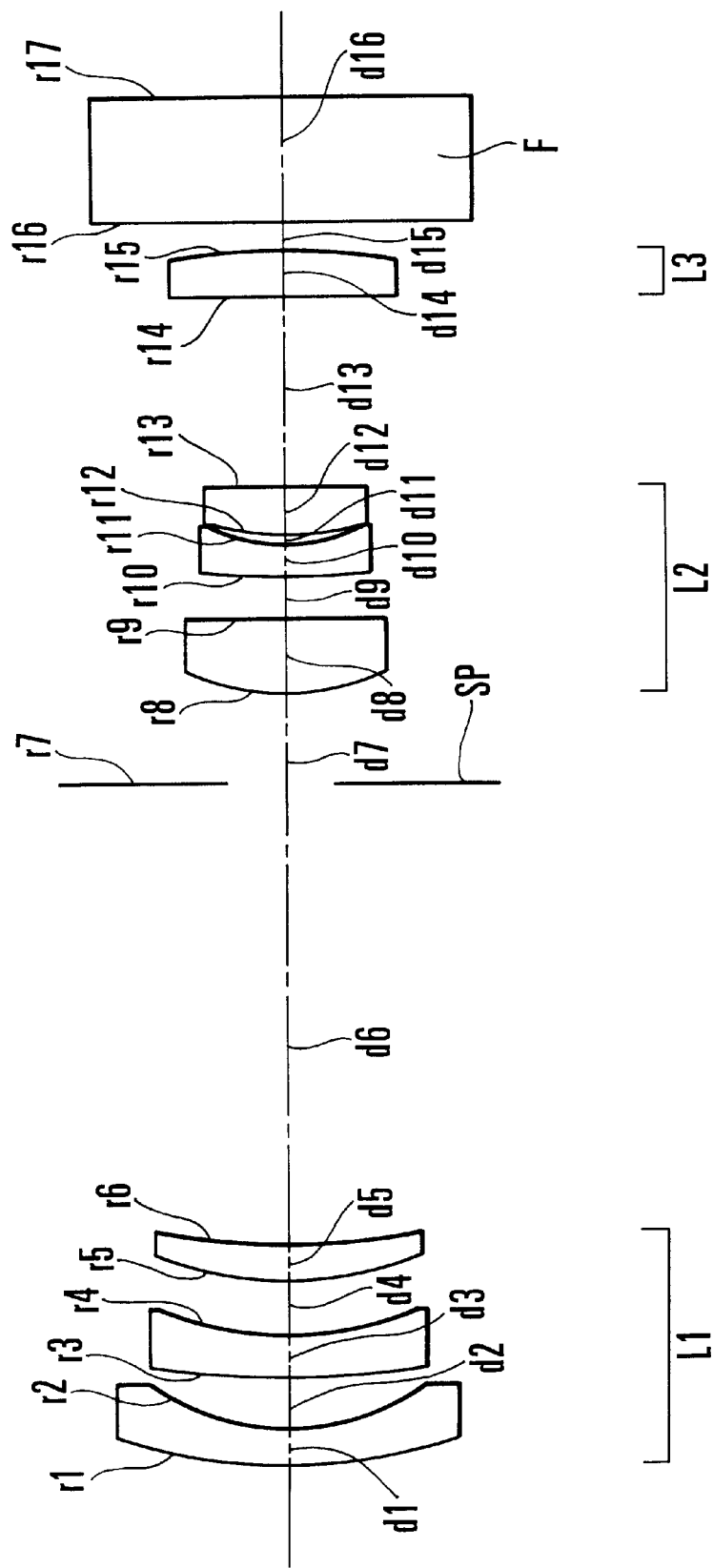
FIG. 26 is a longitudinal section view of an embodiment 9 of the zoom lens.

The diffractive optical element of this structure has a wavelength dependent characteristic of the diffraction efficiency in the first order, as shown in FIG. 20. As is apparent from FIG. 20, the making of the diffraction grating in the laminated structure increases the diffraction efficiency for the design order to higher than 95% over the entire useful range of wavelengths. FIG. 21 shows the spatial frequency response MTF characteristics for this case. By using the diffraction grating of the laminated structure, the resolving power in the low frequencies is improved. The desired MTF characteristic is thus obtained. It will be appreciated from the foregoing that the use of the diffraction grating of the laminated structure achieves further improvements of the optical performance.

It should be noted that the diffraction grating of the laminated structure described above is not confined in material to the ultraviolet setting resin. Other materials such as plastics may be used instead. Although it depends on the kind of material to be used in the substrate, the first diffraction grating 4 may be formed directly in the substrate 1. Furthermore, there is no need to differentiate the thicknesses of the two grating layers from each other. In some combinations of materials, the thicknesses of the two layers may be made equal to each other as shown in FIG. 22. Since, in this case, no gratings are exposed out of the surface of the diffractive optical element, the dust proof is excellent, contributing to an increase of the productivity on the assembling line in manufacturing the diffractive optical elements. So, inexpensive optical systems can be obtained.

Other embodiments are next described which are different from the embodiments 1 to 5 described above in that the rear lens unit is constructed with a plurality of lens units.

FIG. 23 to FIG. 26 in lens block diagram show four embodiments 6 to 9, respectively, applied to zoom lenses for the video camera. In the embodiments 6 to 9, the optical system comprises, in order from the object side (the longer-distance conjugate point side), a first lens unit L1 of negative refractive power movable during zooming, a second lens unit L2 of positive refractive power movable for zooming as the variator, a third lens unit L3 of positive refractive power, and an optical filter or face plate F. In the embodiments 6 to 9, the first lens unit L1 corresponds to the front lens unit, and the second and third lens units L2 and L3 correspond to the rear lens unit. The overall refractive power of the second and third lens units L2 and L3 is positive. In the embodiments 6 to 9, during zooming from the wide-angle end to the telephoto end, the second lens unit L2 axially moves toward the object side, while simultaneously moving the first lens unit L1 to compensate for the shift of an image plane. The first lens unit L1, or the second lens unit L2, or the third lens unit L3, that is, at least one of these lens units, has at least one diffractive optical surface of revolution symmetry with respect to an optical axis.

In particular, the third lens unit L3 is either stationary or movable during zooming. Focusing is possible also by using this third lens unit L3. Further, a stop S is positioned in the space between the first lens unit L1 and the second lens unit L2. It is preferred that the stop S is arranged particularly in the neighborhood of the second lens unit L2.

In the embodiments 6 to 9, at least one of the three lens units is provided with a diffractive optical element to correct chromatic aberrations well. Suppose, for example, the first lens unit L1 is selected to use the diffractive optical element therein, and assuming that the diffractive optical element has an appropriate phase, then the lateral chromatic aberrations for two wavelengths, for example, d-line and g-line, produced in the first lens unit L1 are suppressed to a minimum for good stability of lateral chromatic aberration over the entire zooming range. Moreover, the width of longitudinal chromatic aberration (secondary spectrum) itself does not worsen in the telephoto end.

Alternatively, suppose, for example, the second lens unit L2 is selected to use the diffractive optical element therein, and assuming that the diffractive optical element has an appropriate phase, then the lateral chromatic aberrations for two wavelengths, for example, d-line and g-line, produced in the second lens unit L2 are suppressed to a minimum for good stability of lateral chromatic aberration over the entire zooming range. Moreover, the width of longitudinal chromatic aberration (secondary spectrum) itself does not worsen in the telephoto end.

According to the prior art, to achromatize the zoom lens, it is the common practice that the front or first lens unit L1 is constructed with one or two negative lens or lenses of high dispersion and one or two positive lens or lenses of low dispersion. In more elaborate cases, the negative and positive lenses are cemented together, or the achromatism is shared by a plurality of lenses. Unlike this, the present invention is to employ the diffractive optical element in the first lens unit. By this, the number of lens elements necessary to correct the chromatic aberrations is reduced. Thus, it is made possible to reduce the total number of constituent lenses. Also, according to the prior art, the rear or second lens unit L2, too, is constructed with a negative lens of low dispersion and a positive lens of high dispersion each being one or two in number. The negative and positive lenses have to be cemented together, or a plurality of lenses have to be used for sharing the achromatism. However, even in the second lens unit L2 as well, a diffractive optical element may be used to reduce the number of lens elements necessary to correct chromatic corrections. Thus, it becomes possible to reduce the total number of constituent lenses.

This leads to provide a possibility that, even in a zoom lens that is to achieve higher level of correction of chromatic aberrations, the compact form is further improved, while still maintaining the high optical performance.

Even in the embodiments 6 to 9, the phase of the diffractive optical surface is expressed by using the equation (1).

From the equation (1), it is understandable that the phase can be adjusted in accordance with variation of the distance h from the optical axis. That is, the larger the lens diameter, the greater the influence of the coefficients in higher degrees. In the field of art of zoom lenses for home use, particularly the ones for video cameras, to which the embodiments 6 to 9 are assumed to be applied, efforts are being devoted to advance the compactness. The lens of too much large diameter, in other words, the lens that takes a very large value in the distance h, does not meet the trend of the art. On this account, the diameter has to decrease. Even in this case, if the phase coefficients are determined to be appropriate, advantageous correction of aberrations can be achieved. To this purpose, it is preferred that the diffractive optical surface satisfies the following conditions:

$$1 \cdot 10^{-4} < |C_2/C_1| < 1 \quad (3)$$

$$1 \cdot 10^{-7} < |C_3/C_1| < 1 \cdot 10^{-1} \quad (4)$$

These inequalities are, as described above, for assuring correction of aberrations to be done effectively at a small diameter. When these conditions are violated, it becomes difficult not only to correct aberrations but also to produce the diffractive optical surfaces. So, the violations are objectionable.

Specifically speaking, the first lens unit L1 is constructed in the form of, for example, a positive lens and a negative lens, totally two lenses, or two negative lenses and one positive lens, totaling three lenses, with the diffractive optical surface in any one of these lenses. Such positive and negative lenses may be cemented together. If so, this cemented surface must be brought into cooperation with the diffractive optical surface in correcting the chromatic aberrations. With this arrangement, the diffractive optical element must be made stronger in the positive refractive power.

The first lens unit L1 may otherwise be constructed with two negative lenses, before or after or between which a plate having at least one diffractive optical surface is arranged.

Also, the second lens unit L2 is, constructed in a specific form of, for example, two positive lenses and one negative lens, totally three lenses, before or after which, or between adjacent two of which a plate having at least one diffractive optical surface lies.

The second lens unit L2 may otherwise be constructed with two lenses of plus-minus or minus-plus power arrangement in total with a diffractive optical layer on any one of these lenses.

In any case, the frontmost or exposed surface of the complete lens to the outside is not suited to be used as the diffractive optical surface, except for the particular situations such as that when the designer cannot but select this surface on aberration correction, because the diffractive optical surface is made of an array of annular grooves of very narrow widths of, for example, several microns, or on the submicron order. To protect this surface from dust or the like, it is, therefore, preferable not to make the arrangement on the frontmost lens surface.

In the embodiments 6 to 8, the rear lens surface of the front lens in the first lens unit L1, the frontmost and rearmost lens surfaces in the second lens unit L2 are made aspherical. In the embodiment 9, the rear lens surface of the intermediate lens in the first lens unit L1 and the frontmost lens surface in the second lens unit L2 are made aspherical.

The diffractive optical surface is used as well, for the embodiment 6, in coincidence with the frontmost lens surface of the second lens unit L2, for the embodiment 7, with the rear lens surface of the front lens of the first lens unit L1, for the embodiment 8, with the frontmost lens surface of the third lens unit L3, and, for the embodiment 9, with the frontmost lens surface of the second lens unit L2.

In such a manner, the diffractive optical surface is arranged inside the lens system. As it lies in the first lens unit L1, or the second lens unit L2, or the third lens unit L3, the diffractive optical surface suppresses the chromatic aberrations (secondary spectrum) produced in that lens unit which contains it in cooperation with the other lens units. A good stability of chromatic correction is thus maintained against zooming of the second lens unit L2. If the refracting power of this diffractive optical surface is strengthened, the difference in saw tooth-shaped pitch between the paraxial and marginal zones increases largely, causing the production technique to become difficult. The diffraction efficiency of finished products also is not good. Therefore, for a case where the cemented contact or like achromatic means in the first lens unit L1, or the second lens unit L2, or the third lens unit L3 is replaced by the diffractive optical surface when the chromatic aberrations are corrected, this surface needs not to have so much refracting power.

Nonetheless, in view of correcting some of the off-axial aberrations, especially field curvature and distortion, that surface may be given a refracting power. For this purpose, letting the focal lengths of the diffractive optical surfaces in the first, second and third lens units L1, L2 and L3 be denoted by Fbo1, Fbo2 and Fbo3, respectively, and the focal lengths of the first, second and third lens units L1, L2 and L3 be denoted by F1, F2 and F3, respectively, the following conditions are set forth. So long as the relevant one of these conditions is satisfied, no difficult problems arise in manufacturing, and the aberrational problems including the chromatic one, too, are affected well.

$$0.05 < F1/Fbo1 < 3.0 \quad (5)$$

$$0.05 < F2/Fbo2 < 2.0 \quad (5')$$

$$0.05 < F3/Fbo3 < 1.0 \quad (5'')$$

Further, in the case where the first lens unit L1 has the diffractive optical surface, it is preferred to satisfy an additional condition as follows:

$$-2.0 < F1/\sqrt{Fw \cdot Ft} < 6.0 \quad (6)$$

where Fw and Ft are the shortest and longest focal lengths of the entire lens system, respectively.

If the focal length F1 lies in this range, the diffractive optical element can behave effectively. When the lower limit of the condition (6) is exceeded, as this means that the refractive power of the first lens unit L1 is too strong, any attempt to correct the chromatic aberrations by the diffractive optical element results in failure. The way to manufacture becomes also difficult. When the upper limit is exceeded, the diffractive optical element is no longer necessary to use, because the chromatic aberrations become so much easy to remove. Also, to obtain the complete lens of desired focal lengths, particularly, the second lens urit L2 becomes stronger in refractive power. So, the produced amount of aberrations by the second lens unit L2 increases to a value larger than is appropriate. In other words, the Petzval sum increases in the negative sense, and over-correction of field curvature results.

In general, the diffractive optical element produces chromatic aberrations in the reverse sense to that for the ordinary refraction. For Example, the cemented surface used in the conventional way to achromatize is removed since the cemented lens is replaced by a lens to reduce the total number of lens elements. For this case, it is preferred that the diffractive optical surface coincides with that surface which would be used to contribute the reverse chromatic aberrations to those the cemented surface contributes. With this arrangement, it results that the reverse chromatic aberrations to those the ordinary refraction produces are produced by the diffractive optical surface and that their directions coincide with those when the cemented surface would otherwise be used. Thus, it is made possible for the single lens to do the same achromatism as the cemented lens does.

From the point of view of what are so-called the "chromatic aberration coefficients" ("Lens Design Method" by Yoshiya Matsui at p. 98 issued from Kyoritsu Shuppan (Publishing Co. Ltd.)), it is preferred that, as the diffractive optical surface takes its place on the object side of the stop, the surface that contributes the longitudinal chromatic aberration coefficient L and the lateral chromatic aberration coefficient T, both of which have the same sign, is selected to use. On the image side of the stop, the surface of both contributions of opposite sign to each other is selected to use for the diffractive optical surface.

Although not revealed in the embodiments 6 to 9, it is also possible that the first lens unit L1 or the second lens unit L2 is constructed with only one lens element by using the diffractive optical element.

Next, four numerical examples 6 to 9 corresponding to the embodiments 6 to 9 are shown. In the numerical data for the examples 6 to 9, ri is the radius of curvature of the i-th lens surface, when counted from the object side, di is the i-th axial lens thickness or air separation, and ni and νi are respectively the refractive index and Abbe number of the material of the i-th lens element.

The equation for the aspheric surface in the embodiments 6 to 9 is the same as the equation (2) described in connection with the embodiments 1 to 5, and is not mentioned here again.

Numerical Example 6:

| f = 3.74977 | Fno = 1:2.85 | 2ω = 63.0 | |
|---|---|---|---|
| r1 = 18.838 | d1 = 1.00 | n1 = 1.77250 | ν 1 = 49.6 |
| r2 = 2.842 | d2 = 1.45 | | |
| r3 = 5.109 | d3 = 1.70 | n2 = 1.80518 | ν 2 = 25.4 |
| r4 = 10.190 | d4 = Variable | | |
| r5 = ∞ (Stop) | d5 = Variable | | |
| r6 = 4.339* | d6 = 3.25 | n3 = 1.67790 | ν 3 = 55.3 |
| r7 = −8.490 | d7 = 0.13 | | |
| r8 = −8.701 | d8 = 2.00 | n4 = 1.80518 | ν 4 = 25.4 |
| r9 = 26.030 | d9 = Variable | | |
| r10 = 31.840 | d10 = 1.10 | n5 = 1.51633 | ν 5 = 64.1 |
| r11 = −24.514 | d11 = 1.00 | | |
| r12 = ∞ | d12 = 3.10 | n6 = 1.51633 | ν 6 = 64.2 |
| r13 = ∞ | d13 = −32.57 | | |
| r14 = ∞ | | | |

*) Diffractive Optical Surface

| | Focal Length | | |
|---|---|---|---|
| | 3.75 | 7.38 | 11.00 |
| d4 | 5.94 | 1.36 | 1.04 |
| d5 | 4.78 | 2.89 | 1.00 |
| d9 | 2.00 | 5.89 | 9.77 |

Aspheric Coefficients:

r2: r = 2.84235 · 10⁰    k = −3.28517 · 10⁻¹    B = −2.63180 · 10⁻⁴
    C = 2.63180 · 10⁻⁴   D = 3.67708 · 10⁻⁵     E = −4.60653 · 10⁻⁶
r6: r = 4.33890 · 10⁰    k = −2.13355 · 10⁻¹    B = −8.90957 · 10⁻⁵
    C = 4.05938 · 10⁻⁵   D = −2.74445 · 10⁻⁵    E = 0.00000 · 10⁰
r9: r = 2.60299 · 10¹    k = −2.32563 · 10¹     B = 4.09405 · 10⁻³
    C = 4.25310 · 10⁻⁴   D = −3.66683 · 10⁻⁵    E = 9.71881 · 10⁻⁶

Phase Coefficients:

r6: C₁ = −1.38576 · 10⁻³   C₂ = −5.51769 · 10⁻⁵   C₃ = 4.66871 · 10⁻⁵
    C₄ = −6.04382 · 10⁻⁶   C₅ = 2.92159 · 10⁻⁷

Numerical Example 7:

| f = 3.74786 | Fno = 1:2.85 | 2ω = 63.0 | |
|---|---|---|---|
| r1 = 16.518 | d1 = 1.00 | n1 = 1.77250 | ν 1 = 49.6 |
| r2 = 2.812* | d2 = 1.52 | | |
| r3 = 5.072 | d3 = 1.70 | n2 = 1.80518 | ν 2 = 25.4 |
| r4 = 9.180 | d4 = Variable | | |
| r5 = ∞ (Stop) | d5 = Variable | | |
| r6 = 4.374 | d6 = 3.25 | n3 = 1.67790 | ν 3 = 55.3 |
| r7 = −8.279 | d7 = 0.13 | | |
| r8 = −8.827 | d8 = 2.00 | n4 = 1.80518 | ν 4 = 25.4 |
| r9 = 20.374 | d9 = Variable | | |
| r10 = 18.507 | d10 = 1.10 | n5 = 1.51633 | ν 5 = 64.1 |
| r11 = 1586.291 | d11 = 1.00 | | |
| r12 = ∞ | d12 = 3.10 | n6 = 1.51633 | ν 6 = 64.2 |
| r13 = ∞ | | | |

*) Diffractive Optical Surface

-continued

| | | Focal Length | |
|---|---|---|---|
| | 3.75 | 7.37 | 11.00 |
| d4 | 7.64 | 2.55 | 2.10 |
| d5 | 4.88 | 2.94 | 1.00 |
| d9 | 2.43 | 6.37 | 10.32 |

Aspheric Coefficients:

r2:    $r = 2.81245 \cdot 10^0$    $k = -2.82491 \cdot 10^{-1}$    $B = -2.09075 \cdot 10^{-3}$
      $C = -2.58187 \cdot 10^{-4}$    $D = 3.72765 \cdot 10^{-5}$    $E = -4.99400 \cdot 10^{-6}$
r6:    $r = 4.37416 \cdot 10^0$    $k = -2.03479 \cdot 10^{-1}$    $B = -2.16103 \cdot 10^{-4}$
      $C = 2.32139 \cdot 10^{-5}$    $D = -2.69331 \cdot 10^{-6}$    $E = 0.00000 \cdot 10^0$
r9:    $r = 2.03739 \cdot 10^1$    $k = -3.45356 \cdot 10^1$    $B = 3.96398 \cdot 10^{-3}$
      $C = 4.44621 \cdot 10^{-4}$    $D = -4.41524 \cdot 10^{-5}$    $E = 8.49502 \cdot 10^{-6}$ Phase Coefficients:

r2:   $C_1 = -2.73173 \cdot 10^{-3}$    $C_2 = 4.79617 \cdot 10^{-4}$    $C_3 = -3.11298 \cdot 10^{-5}$
    $C_4 = 5.39271 \cdot 10^{-7}$ Numerical Example 8:

$f = 3.75009$    $Fno = 1:2.8$    $2\omega = 62.9°$

| r1 = 19.911 | d1 = 1.00 | n1 = 1.77250 | v1 = 49.6 |
|---|---|---|---|
| r2 = 2.924 | d2 = 1.50 | | |
| r3 = 5.199 | d3 = 1.70 | n2 = 1.80518 | v2 = 25.4 |
| r4 = 9.470 | d4 = Variable | | |
| r5 = ∞ (Stop) | d5 = Variable | | |
| r6 = 4.177 | d6 = 3.25 | n3 = 1.67790 | v3 = 55.3 |
| r7 = −7.319 | d7 = 0.13 | | |
| r8 = −8.095 | d8 = 2.00 | n4 = 1.84666 | v4 = 23.8 |
| r9 = 23.672 | d9 = Variable | | |
| r10 = −23.522* | d10 = 1.10 | n5 = 1.51633 | v5 = 64.1 |
| r11 = −10.465 | d11 = 1.00 | | |
| r12 = ∞ | d12 = 3.10 | n6 = 1.51633 | v6 = 64.2 |
| r13 = ∞ | | | |

*) Diffractive Optical Surface

| | Focal Length | | |
|---|---|---|---|
| | 3.75 | 7.38 | 11.00 |
| d4 | 6.71 | 1.98 | 1.52 |
| d5 | 4.50 | 2.75 | 1.00 |
| d9 | 2.20 | 5.96 | 9.71 |

Aspheric Coefficients:

r2:    $r = 2.92356 \cdot 10^0$    $k = -2.13294 \cdot 10^{-1}$    $B = -1.66532 \cdot 10^{-3}$
      $C = -2.65729 \cdot 10^{-4}$    $D = 2.78451 \cdot 10^{-5}$    $E = -4.22498 \cdot 10^{-6}$
r6:    $r = 4.17748 \cdot 10^0$    $k = -3.38936 \cdot 10^{-1}$    $B = -1.38841 \cdot 10^{-4}$
      $C = 3.51215 \cdot 10^{-5}$    $D = -4.26335 \cdot 10^{-6}$    $E = 0.00000 \cdot 10^0$
r9:    $r = 2.36717 \cdot 10^1$    $k = -3.79872 \cdot 10^1$    $B = 4.11618 \cdot 10^{-3}$
      $C = 4.71814 \cdot 10^{-4}$    $D = -2.22596 \cdot 10^{-5}$    $E = 7.02493 \cdot 10^{-6}$ Phase Coefficients:

r10:   $C_1 = -4.96638 \cdot 10^{-4}$    $C_2 = 4.28021 \cdot 10^{-4}$    $C_3 = -2.67732 \cdot 10^{-5}$
     $C_4 = -1.43091 \cdot 10^{-6}$ Numerical Example 9:

$f = 6.00006$    $Fno = 1:2.84$    $2\omega = 54.9°$

| r1 = 13.483 | d1 = 1.20 | n1 = 1.69680 | v1 = 55.5 |
|---|---|---|---|
| r2 = 6.036 | d2 = 2.00 | | |
| r3 = 36.212 | d3 = 1.20 | n2 = 1.69350 | v2 = 53.2 |
| r4 = 7.600 | d4 = 1.72 | | |
| r5 = 9.515 | d5 = 1.30 | n3 = 1.80518 | v3 = 25.4 |
| r6 = 20.705 | d6 = Variable | | |
| r7 = ∞ (Stop) | d7 = 1.50 | | |
| r8 = 6.489* | d8 = 2.30 | n4 = 1.58313 | v4 = 59.4 |
| r9 = −2149.780 | d9 = 1.32 | | |
| r10 = 24.069 | d10 = 1.00 | n5 = 1.69895 | v5 = 30.1 |
| r11 = 5.466 | d11 = 0.32 | | |
| r12 = 11.081 | d12 = 1.40 | n6 = 1.77250 | v6 = 49.6 |
| r13 = −116.517 | d13 = Variable | | |
| r14 = 55.036 | d14 = 1.50 | n7 = 1.51633 | v7 = 64.1 |
| r15 = −28.037 | d15 = 1.00 | | |
| r16 = ∞ | d16 = 4.13 | n8 = 1.51633 | v8 = 64.2 |
| r17 = ∞ | | | |

*) Diffractive Optical Surface

| | Focal Length | | |
|---|---|---|---|
| | 6.00 | 13.92 | 18.00 |
| d6 | 16.35 | 3.97 | 1.85 |
| d15 | 5.99 | 15.89 | 20.99 |

Aspheric Coefficients:

r4:    $r = 7.60014 \cdot 10^0$    $k = -5.05839 \cdot 10^{-1}$    $B = -9.16037 \cdot 10^{-5}$
      $C = -4.12196 \cdot 10^{-6}$    $D = 0.00000 \cdot 10^0$    $E = 0.00000 \cdot 10^0$
r8:    $r = 6.48883 \cdot 10^0$    $k = -7.13274 \cdot 10^{-1}$    $B = 1.19802 \cdot 10^{-4}$
      $C = -2.22194 \cdot 10^{-6}$    $D = -5.49430 \cdot 10^{-7}$    $E = 2.44790 \cdot 10^{-8}$ Phase Coefficients:

r8:   $C_1 = -1.26069 \cdot 10^{-3}$    $C_2 = 4.67730 \cdot 10^{-5}$    $C_3 = -3.98604 \cdot 10^{-6}$
     $C_4 = 1.11279 \cdot 10^{-5}$ FIGS. 27A to 27D through FIGS. 38A to 38D show the aberrations of the embodiments 6 to 9, respectively, in the wide-angle end, a middle focal length position and the telephoto end.

In the embodiments 6 to 9, the diffractive optical elements are manufactured in the same way as in the embodiments 1 to 5.

Figure 39:
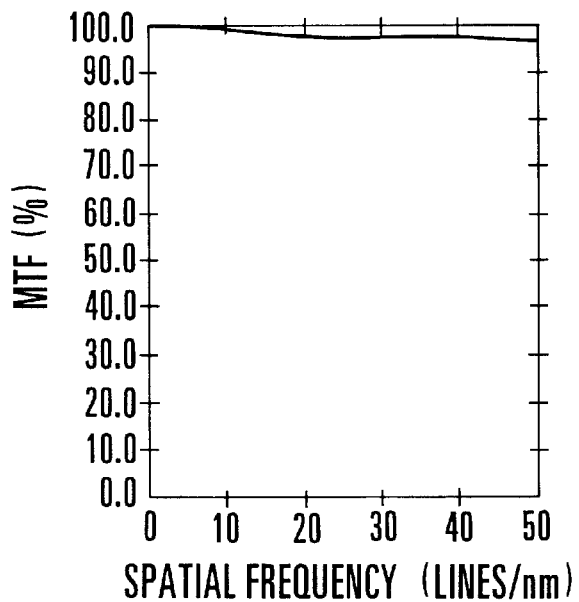
FIG. 39 is a graph of the MTF characteristics of the zoom lens of the embodiment 6 with the diffractive optical element of FIG. 16.

FIG. 39 shows the characteristics of Modulation Transfer Function (MTF) versus spatial frequency of the numerical example 6 using the grating form of FIG. 16. It is appreciated that the MTF in the low frequency region has a lower value than desired.

Figure 40:
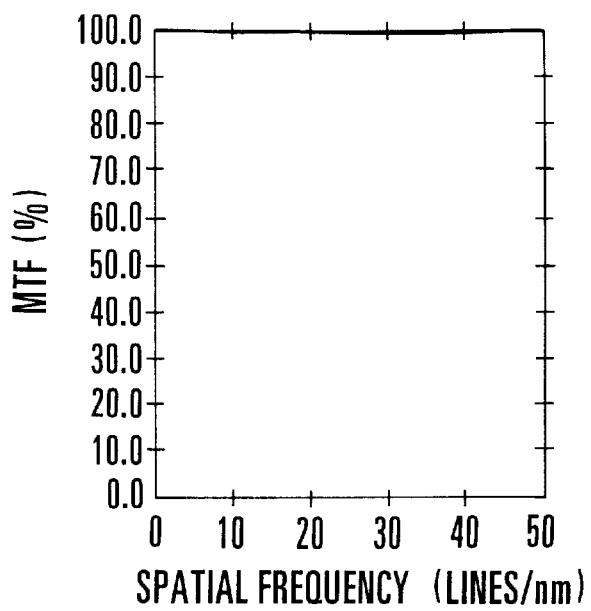
FIG. 40 is a graph of the MTF characteristics of the zoom lens of the embodiment 6 with the diffractive optical element of FIG. 19.

FIG. 40 shows the spatial frequency response MTF characteristics of the numerical example 6 using the laminated grating of FIG. 19. By altering the structure of construction of the diffraction grating to the laminated one, the MTF in the low frequency region is improved. The desired MTF characteristic is thus obtained.

Next, a system which uses the zoom lens of the retrofocus type having the diffractive optical element as the projection lens for a projector is described below.

Figure 41:
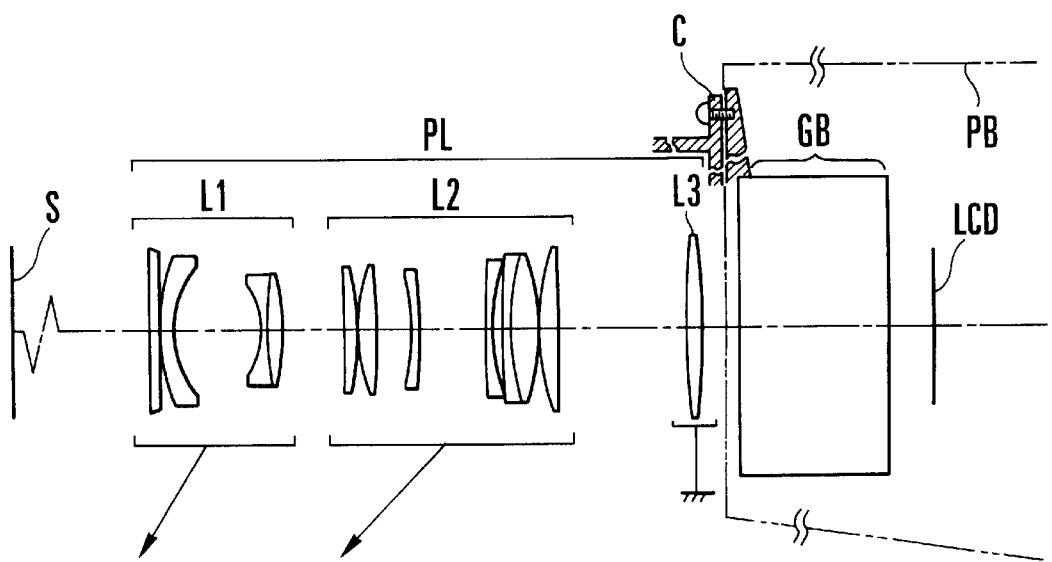
FIG. 41 is a longitudinal section view of an embodiment 10 of the zoom lens.
Figure 42:
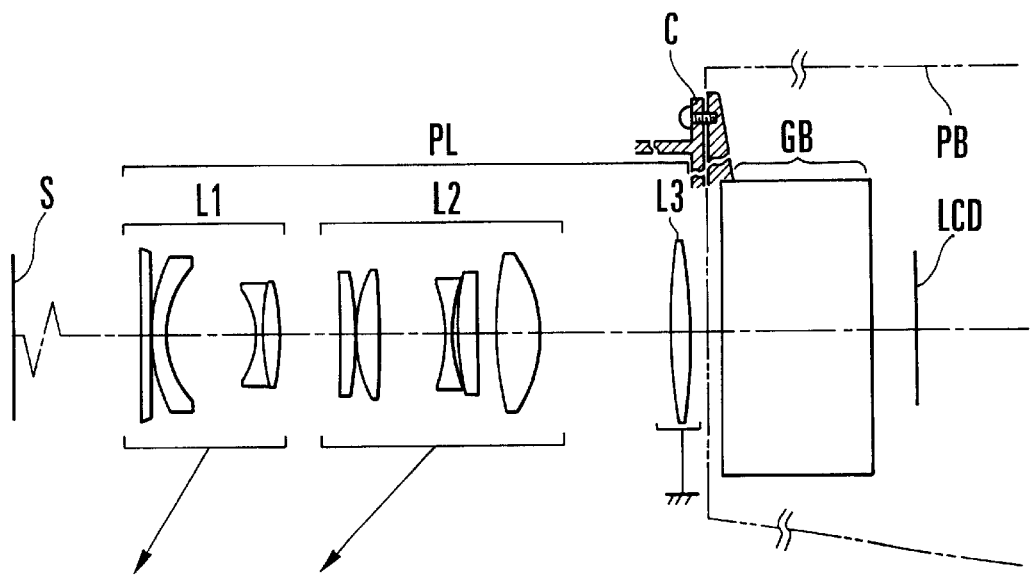
FIG. 42 is a longitudinal section view of an embodiment 11 of the zoom lens.
Figure 43:
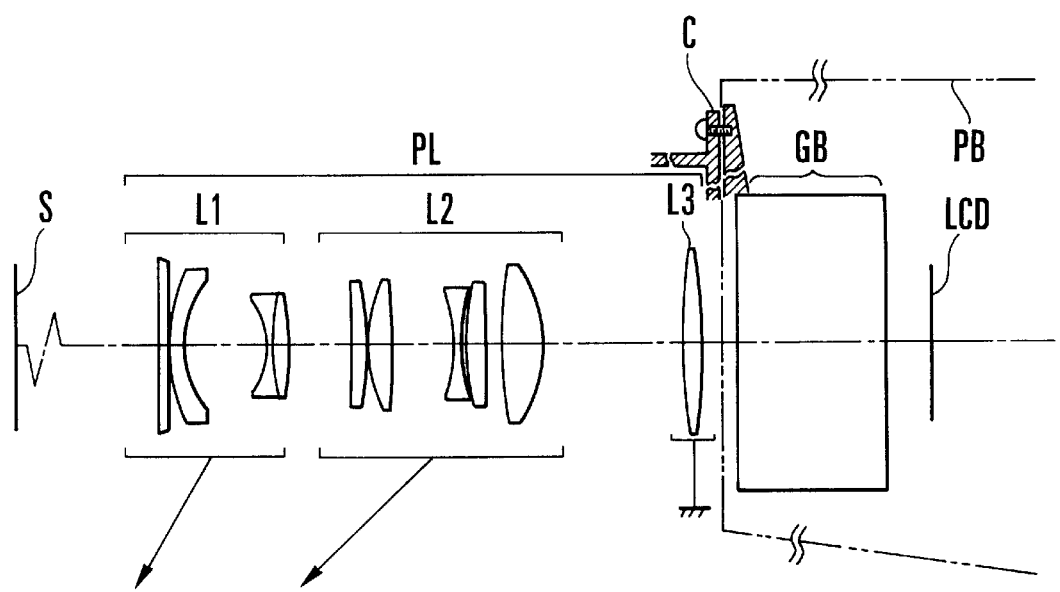
FIG. 43 is a longitudinal section view of an embodiment 12 of the zoom lens.
Figures 48A, 48B, 48C, 48D:
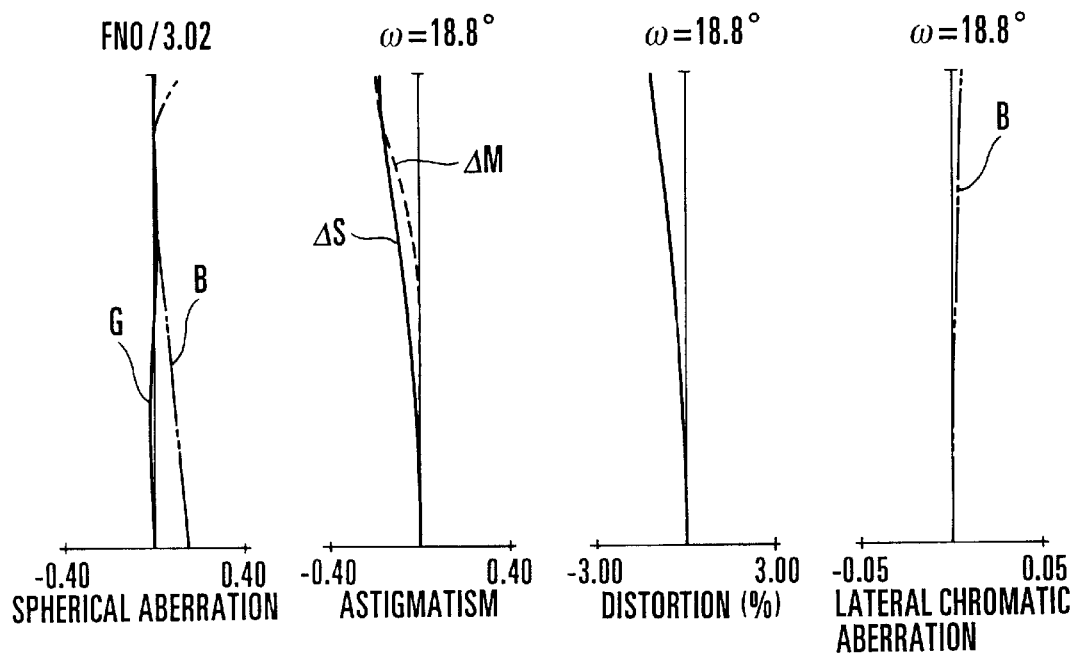
FIGS. 48A to 48D are graphic representations of the aberrations of the embodiment 11 in a middle focal length position.
Figures 49A, 49B, 49C, 49D:
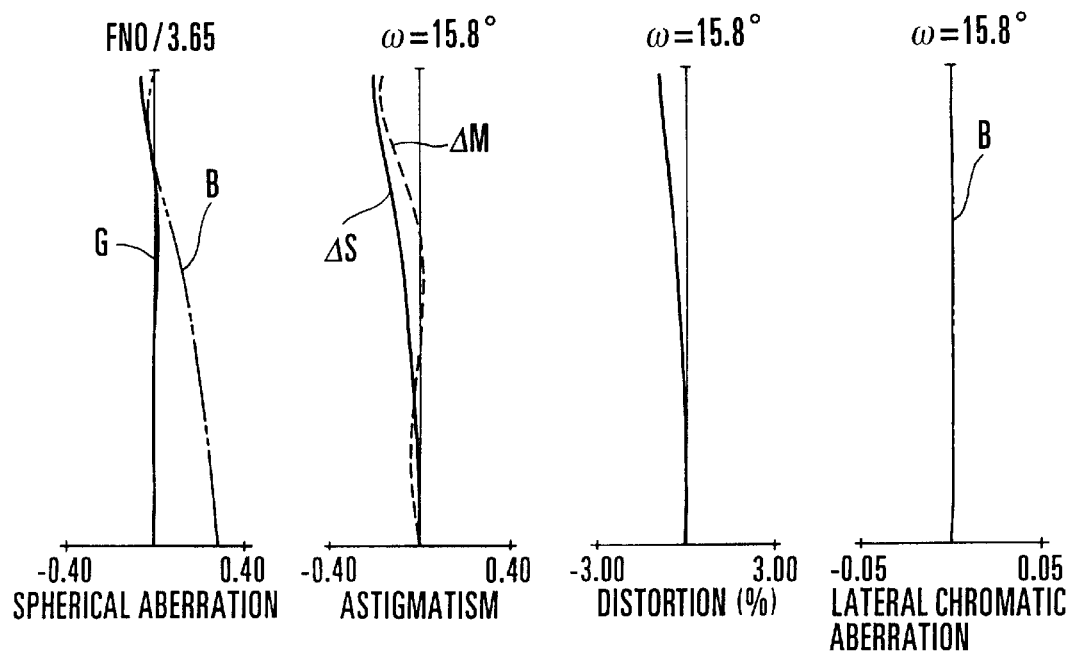
FIGS. 49A to 49D are graphic representations of the aberrations of the embodiment 11 in the telephoto end.

FIG. 41 to FIG. 43 in lens block diagram show embodiments 10 to 12 of zoom lenses used in the liquid crystal video projector with the main parts of the projector in schematic form.

FIGS. 44A to 44D through FIGS. 46A to 46D show the aberrations of the embodiment 10 in the wide-angle end, a middle focal length position and the telephoto end, respectively. FIGS. 47A to 47D through FIGS. 49A to 49D show the aberrations of the embodiment 11 in the wide-angle end, a middle focal length position and the telephoto end, respectively. FIGS. 50A to 50D through FIGS. 52A to 52D show the aberrations of the embodiment 12 in the wide-angle end, a middle focal length position and the telephoto end, respectively. In these aberration curves, B and G are the wavelengths of light of 470 nm and 530 nm, respectively, and $\Delta M$ and $\Delta S$ represent the meridional and sagittal image focuses, respectively.

In FIGS. 41 to 43, the zoom lens PL comprises, from front to rear, a first lens unit of negative refractive power, a second lens unit L2 of positive refractive power and a third lens unit L3 whose positive refractive power is weak. At least one of these lens units is provided with at least one diffractive optical element of revolution symmetry with respect to an optical axis. In the embodiments 10 to 12, the first lens unit L1 corresponds to the front lens unit and the second and third lens units L2 and L3 correspond to the rear lens unit.

A screen S (the plane of projection) and a liquid crystal display panel LCD or like original picture (the plane to be projected) lie in conjugate relation. In the general case, the screen S is put at a conjugate point of long distance (first conjugate point) and the original picture LCD takes its place at a short conjugate point (second conjugate point). A color combining prism, a polarizing filter, color filters and others are shown by a glass block GB. A stop, although not shown, is positioned on the first conjugate point side of the second lens unit L2.

The zoom lens PL is housed in an outer barrel which is releasably attached to a body PB of the liquid crystal video projector by a coupling members C. The glass block GB and those parts that follow including the liquid crystal display panel LCD are held in the projector body PB.

In the embodiments 10 to 12, during zooming from the wide-angle end to the telephoto end, the first lens unit L1 and the second lens unit L2 axially move toward the first conjugate point (the screen side), as indicated by the arrows in FIGS. 41 to 43. Focusing is performed by axially moving the first lens unit L1.

In the embodiments 10 to 12, the back focal distance has to be made even longer. For this purpose, the first lens unit L1 is strengthened in negative refractive power so that the entire lens system takes the retrofocus form. If the first lens unit L1 has too much strong a negative refractive power, the Petzval sum will increases to the negative direction, causing the image surface to begin declining. Also, the zooming movement of the first lens unit L1 causes large variation of astigmatism and distortion, which becomes difficult to correct. For this reason, in the embodiments 10 to 12, the rear lens unit is constructed with the second and third lens units of positive refractive powers. Each of these lens units is made to contribute to a weaker refractive power, thus assuring reduction of the Petzval sum.

In the embodiments 10 to 12, at least one of the three lens units is provided with the diffractive optical element to correct chromatic aberrations well.

Suppose, for example, the first lens unit L1 is selected to use the diffractive optical element therein, and assuming that the phase of the diffractive optical element is determined to be appropriate, then the lateral chromatic aberrations for two wavelengths of light, for example, d-line and g-line, produced in the first lens unit L1 are suppressed to a minimum for good stability of lateral chromatic aberration over the entire zooming range. Moreover, residual of longitudinal chromatic aberration (secondary spectrum) is prevented from worsening in the telephoto end.

According to the prior art, to, achromatize the zoom lens, it is the common practice that a front or first lens unit is constructed with one or two negative lens or lenses of high dispersion and one or two positive lens or lenses of low dispersion. In more elaborate cases, the negative and positive lenses are cemented together, or the achromatism is shared by a plurality of lenses. Unlike this, in the zoom lens of the embodiment 10, as described above, use is made of the diffractive optical element, producing an advantage of reducing the number of lens elements necessary to use in correcting chromatic aberrations. In such a manner, the total number of constituent lenses is reduced.

Alternatively, suppose, for example, the second lens unit is selected to use the diffractive optical element therein, and assuming that the phase of the diffractive optical element is determined to be appropriate, then the lateral chromatic aberrations for two wavelengths of light, for example, d-line and g-line, produced in the second lens unit L2 are suppressed to a minimum for good stability of lateral chromatic aberration over the entire zooming range. Moreover, residual of longitudinal chromatic aberration (secondary spectrum) residual is prevented from worsening in the telephoto end.

According to the prior art, a second lens unit, too, is constructed with a negative lens of low dispersion and a positive lens of high dispersion each being one or two in number. The negative and positive lenses have to be cemented together, or a plurality of lenses have to be used for sharing the achromatism. In the zoom lens of the embodiment 11, on the other hand, as described above, by using the diffractive optical element, the number of lens elements necessary to correct chromatic aberrations is lessened. The total number of constituent lenses is thus reduced.

In the embodiments 10 and 11, this leads to achieve a zoom lens which is corrected for chromatic aberrations at a higher level. Even for such a zoom lens, further improvements of the compact form are attained while still maintaining the good optical performance.

In the embodiment 12, the diffractive optical element is arranged in the third lens unit L3 to correct chromatic aberrations well throughout the entire zooming range.

In the embodiments 10 to 12, as the surface on which to deposit the diffractive optical layer, the most outside surface is not used except in the particular situations such as that when the designer cannot but select this surface on aberration correction, because the diffractive optical surface is made of an array of annular grooves of very narrow widths of, for example, several microns, or on the submicron order. To protect the diffractive optical surface from dust or the like, it is, therefore, preferable not to arrange it on the outermost side.

In the embodiments 10 to 12, as described above, the diffractive optical element is arranged in the interior of the first lens unit, or in the interior of the second lens unit or in the interior of the third lens unit to thereby suppress the lateral chromatic aberration the respective individual lens unit produces to a minimum. As the second lens unit moves to effect zooming, the range of variation of lateral chromatic aberration is also suppressed to a minimum.

In the embodiments 10 to 12, when each lens unit is constructed as described above, good stability of the quality of the projected image on the screen S is maintained throughout the entire zooming range.

The above-described characteristic features of the zoom lens PL suffice for projecting good images on the screen S. To attain further improved results, it is preferable to satisfy at least one of the following features or conditions.

(a) From the equation (1) described before, it is understandable that the phase can be adjusted by the distance h from the optical axis. That is, the larger the lens diameter, the greater the influence of the coefficients in higher degrees. In the zoom lenses in the embodiments 10 to 12 which are assumed to be of the telecentric type, the phase coefficients have to be effectively utilized in achieving advantageous correction of aberrations. For this purpose, it is preferred to satisfy the conditions (3) and (4) mentioned before.

When the conditions (3) and (4) are violated, it becomes difficult not only to correct aberrations but also to manufacture the diffractive optical surfaces. So, the violations are objectionable.

(b) If the refracting power of the diffractive optical element is strengthened, the difference in saw tooth-shaped pitch between the paraxial and marginal zones increases largely, causing the production technique to become difficult. The diffraction efficiency of finished products is also not good.

For a case where, like the zoom lenses in the embodiments 10 to 12, instead of the cemented lens, the diffractive optical element is used in the first lens unit L1, or the second lens unit L2, or the third lens unit L3 to correct the chromatic aberrations, the refractive power of the diffractive optical element needs not to be necessarily much.

Nonetheless, in order to correct some of the off-axial aberrations, especially field curvature and distortion, a refractive power may be given to diffractive optical surface. If so, letting the focal length of the diffractive optical surfaces in the i-th lens unit be denoted by Fboi, and the focal length of the i-th lens unit by Fi, the following condition is set forth. So long as this condition is satisfied, no difficult problems arise in manufacturing, and a good effect is produced to correct the aberrations including chromatic ones.

$$0.05 < Fi/Fboi < 3.0 \quad (7)$$

(c) Distortion is sufficiently suppressed in the first lens unit, and a sufficient back focal distance must be secured. For this purpose, it is desired to satisfy the following condition:

$$0.6 < |F1/\sqrt{Fw \cdot Ft}| < 0.95 \quad (8)$$

where Fw and Ft are the shortest and longest focal lengths of the entire lens system, respectively.

This condition has an aim to make a good compromise between the correction of distortion and the elongation of the back focal distance. When the upper limit of the condition (8) is exceeded, the zooming movement increases, the total length of the entire lens system increases, and the back focal distance becomes short. So, the violation is objectionable. Conversely when the lower limit is exceeded, the zooming movement decreases, but it becomes difficult to correct distortion. At the same time, the Petzval sum increases to the negative direction, causing the image surface to decline. So, this violation is objectionable.

(d) In general, the diffractive optical element produces chromatic aberrations in the reverse sense to that for the ordinary refraction. Now assuming that, for example, the cemented surface used in the conventional way to achromatize is removed as the cemented lens is replaced by a single lens to reduce the total number of lens elements, then it is preferable to select that surface which would be used to contribute the reverse chromatic aberrations to those the cemented surface contributed, in applying the diffractive optical surface. With this arrangement, it results that the reverse chromatic aberrations to those the ordinary refraction produces are produced by the diffractive optical surface and that their directions coincide with those when the cemented surface would otherwise be used. Thus, it is made possible for the single lens to do the same achromatism as the cemented lens does.

From the point of view of the chromatic aberration coefficients, it is preferred that, as the diffractive optical surface takes its place on the object side of the stop, the surface of the same sign in the longitudinal and lateral chromatic aberration coefficients is selected to use. On the image side of the stop, the surface of opposite sign in both coefficients is selected to use for the diffractive optical surface.

(e) Of the aims of the embodiments 10 to 12, there is one for increasing the range of the zoom lens. So, it is desired that the aberration that is produced when zooming is canceled in the first and second lens units. On this account, letting the focal length of the first lens unit be denoted by F1 and the focal length of the second lens unit by F2, the following condition is set forth:

$$1.01 < |F2/F1| < 1.59 \quad (9)$$

When the upper limit of the condition (9) is exceeded, the Petzval sum increases to the negative direction objectionably. So, the image surface tends to largely decline toward the plus side. Conversely, when the lower limit is exceeded, the total zooming movement of the first lens unit must be taken large to assure increase of the zooming range. So, the diameter of the front lens members is caused to increase, and the physical length of the complete lens tends to increase.

(f) The first lens unit has at least one negative lens and at least one pair of lenses cemented together. For the first negative lens in the first Lens unit, it is desired to satisfy the following condition:

$$1.71 < f11N/F1 < 2.76 \quad (10)$$

where f11N is the focal length of the first negative lens in the first lens unit.

The distortion produced in the first lens unit is corrected well by this arrangement. Then the upper limit of the condition (10) is exceeded, spherical aberration in the telephoto end becomes under-corrected and inward coma is produced. Conversely, when the lower limit is exceeded, over-correction of longitudinal chromatic aberration results. So, these violations are objectionable.

This negative lens may otherwise be made aspherical. If so, the performance is further improved. Also, the zoom lens has become a standard provision and, moreover, the demand for increasing the range is growing. Along with this, the variation of longitudinal chromatic aberration with zooming comes to affect the image quality. If large longitudinal chromatic aberration is produced, a picture of certain colors in the liquid crystal display panel, when projected onto the screen, become out of focus. The image quality is thus deteriorated. To correct this well, the rear lens in the first lens unit is made to be a cemented lens, thus making it possible to obtain a projected image of good quality over the whole gamut of colors.

(g) To further improve the correction of aberrations, especially off-axial flare and chromatic aberrations, the second lens unit is constructed with inclusion of at least one aspherical lens and at least one diffractive optical element of revolution symmetry.

The fineness of pixels in the liquid crystal display panel has been enhanced. Along with this, there arises a problem of the resolving power which was so far not very serious. Then, good correction of those aberrations which attribute to this has become inevitable. So, use is made of the aspheric surface in the second lens unit, thereby correcting the off-axial flare well. The rear lens in the second lens unit takes the position at which the off-axial rays pass relatively far away from the optical axis. For this reason, the diffractive optical element is put in this position to thereby correct lateral chromatic aberration well. Further improvements of the optical performance are thus achieved.

(h) To improve the correction of aberrations, especially chromatic aberrations, the third lens unit includes at least one diffractive optical element of revolution symmetry with respect to the optical axis. As mentioned before, the use of a high definition liquid crystal display element leads to require good correction of chromatic aberrations, especially lateral one, which so far did not give rise to a very serious problem. This feature makes it possible to solve that problem.

(i) To achieve a good telecentric optical system, it is preferred to satisfy the following condition:

$$2.2 < F3/\sqrt{Fw \cdot Ft} < 3.7 \tag{11}$$

where F3 is the focal length of the third lens unit.

The inequalities of condition (11) are for optimizing the back focal distance and the telecentric condition in good balance. When the upper limit is exceeded, the back focal distance becomes longer than necessary, causing the total length of the entire lens system to increase largely. Moreover, the telecentric condition collapses. When the lower limit is exceeded, it becomes difficult to secure the sufficiently long back focal distance which the invention aims at.

(j) The aspheric surface to be used in the embodiments 10 to 12 is desired to have such a shape that the positive refractive power becomes progressively weaker toward the margin of the lens.

It is to be noted that the liquid crystal video projector according to the embodiments 10 to 12 includes at least the above-described telecentric zoom lens, an element for color combination, three liquid crystal display elements of corresponding images to the separated colors in view of the color combining element, a drive circuit for the liquid crystal display elements, a signal processing circuit, a color separation mirror, a light source and fly-eye lenses.

Figure 53:
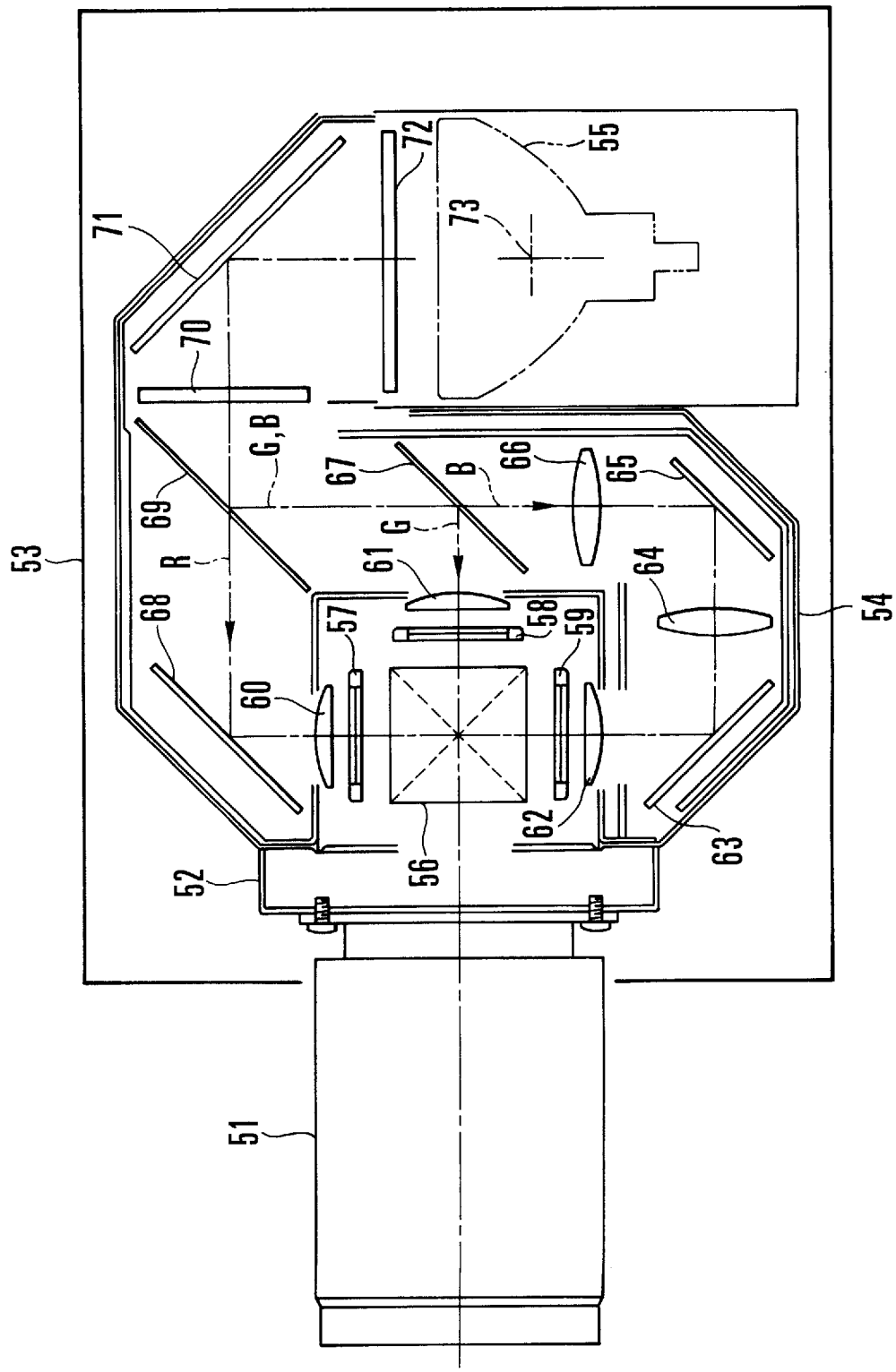
FIG. 53 is a top view of the main parts of a liquid crystal projector.

FIG. 53 schematically shows the zoom lens of the telecentric system of the embodiments 10 to 12 and a liquid crystal projector using the same with the parts of the projector functionally expressed, as viewed from the top thereof. In FIG. 53, the zoom lens 51 of any one of the embodiments 10 to 12 (as the projection lens) is mounted on a lens holder 52 in a casing 53 of the projector body PB. All the above-described optical parts are installed within an optical engine box 54 with a reflector 55. A color combining prism and color filters are shown as a glass block 56. Liquid crystal display elements 57 to 59 present images which correspond to the original colors R, G and B and are positioned in front of respective condenser lenses 60 to 62 for producing collimated light beams. The box 54 further includes dichroic mirrors (color separation mirrors) or mere reflection mirrors 63, 65 and 68, condenser lenses 64 and 66 and dichroic mirrors 67 and 69. A fly-eye lens 72 lies in front of a light source 73, making uniform the illumination over the entire area of the image frame. Reference numeral 71 denotes a mere reflection mirror. A converter 70 uses the light from the light source 73 efficiently and produces a polarized light beam in order to increase the amounts of light impinging on the display panels.

In FIG. 53, the white light issuing from the lamp 73 is reflected forward by the reflector 55, then passes through the fly-eye lens 72 to the total reflection mirror 71 and then passes through the polarized light converter 70, thus becoming a light beam of uniform intensity in cross-section, before it enters the first dichroic mirror 69. In passing through the first dichroic mirror 69, two colors, for example, red (R) and greenish blue (G, B), are separated out. Of these, the red light (R) passes through the first dichroic mirror 69 to the third dichroic mirror or total reflection mirror 68 and therefrom is reflected to the condenser lens 60.

The other light (G,B) is reflected from the first dichroic mirror 69 to the second dichroic mirror 67 where two more colors G and B are separated out, one of which the green light G is reflected to the condenser lens 61.

The other light B passes through the second dichroic mirror 67 to the first condenser lens 66, then is reflected by the fourth dichroic mirror or total reflection mirror 65, then passes through the second condenser lens 64, then is reflected by the fifth dichroic mirror or total reflection mirror 63 and then enters the condenser lens 62.

The entering light beams through the condenser lenses 60 to 62 illuminate the respective liquid crystal display elements 57 to 59 of corresponding images to the original colors. Three light beams that bear image information emerge from the respective liquid crystal display elements 57 to 59 and then are combined to one light beam by the color combining prism 56. This light beam is projected by the zoom lens 51 onto the screen S.

In some cases, a polarizing filter is used as arranged in between the liquid crystal display element and the condenser or collimator lens.

Figure 54:
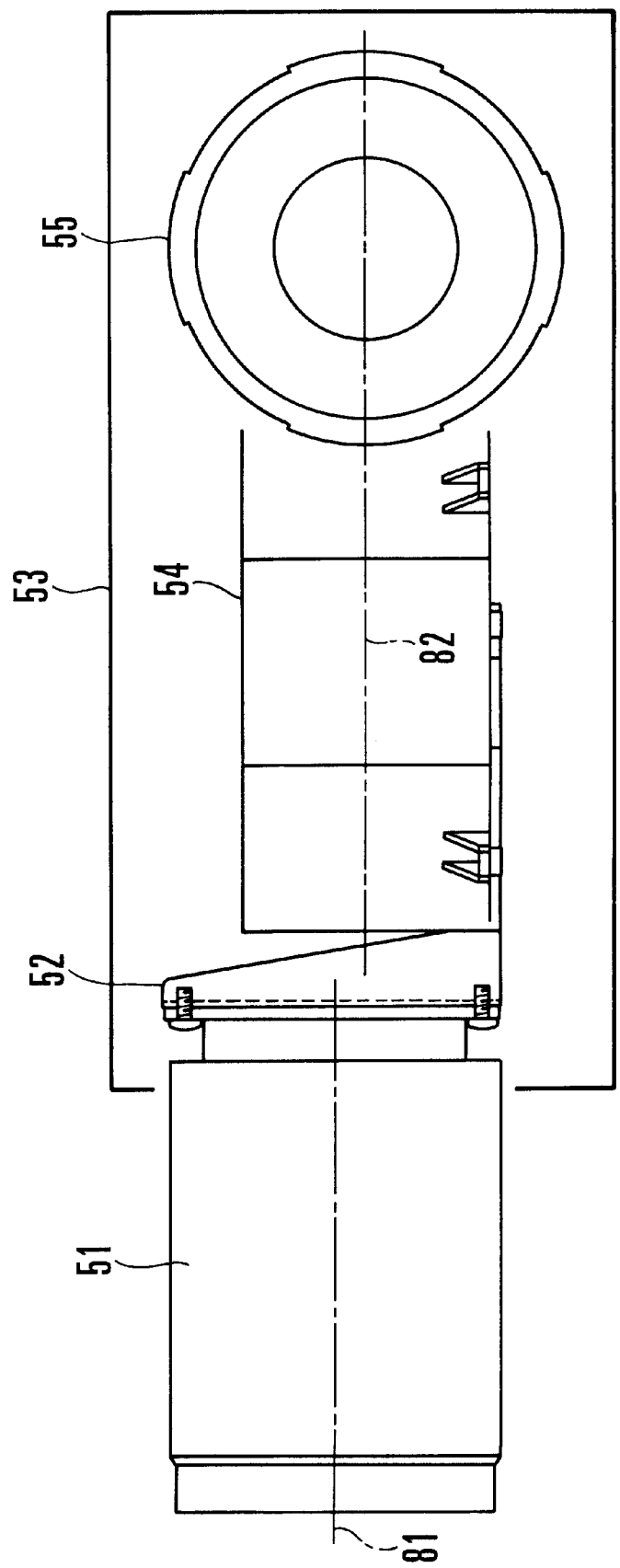
FIG. 54 is a side elevation view of the main parts of the liquid crystal projector of FIG. 53.

FIG. 54 is a side elevation view of the liquid crystal projector. In FIG. 54, the optical axis of the zoom lens 51 is denoted by reference numeral 81. The liquid crystal display element has an incidence-normal 82 at the center of the area thereof. As can be seen from FIG. 54, the axis 81 is not made to coincide with the central normal 82, but is made to displace from the central normal 82. This is because, as the image on the liquid crystal display element is projected onto the screen (not shown), the projected image takes its place on the upper side of the projector. When the user views the image on the screen from behind the projector, the shadow of the projector body overlaps the projected image on the screen in a lesser part, thus making it possible to provide a comfortable image to view.

To assure sufficient comfortability of viewing the projected image, it is preferable that the amount of displacement $\Delta Y$ of the optical axis 81 of the zoom lens from the central normal 82 of the liquid crystal element lies in the following range:

$$0.14 < \Delta Y/Fw < 0.24 \tag{12}$$

When the amount of displacement $\Delta Y$ increases beyond the upper limit of the condition (12), the image is projected to too much higher a position than the liquid crystal projector. Although this makes it easier to entirely look at the projected image, the illumination on the upper marginal zone is extremely lowered. The display of the image is presented objectionably dark. Conversely, when the amount of displacement $\Delta Y$ decreases beyond the lower limit, the projected image is hardly viewed as obstructed by the projector body.

The diffractive optical element to be used in the embodiments 10 to 12 is constructed either with a single layer in the kinoform shown in FIG. 16, or with two layers of different thicknesses like that shown in FIG. 19 or of equal thickness like that shown in FIG. 22 in the stacked form. Concerning also the process for producing the diffractive optical element, the same as in the embodiments 1 to 5 may apply.

Figure 55:
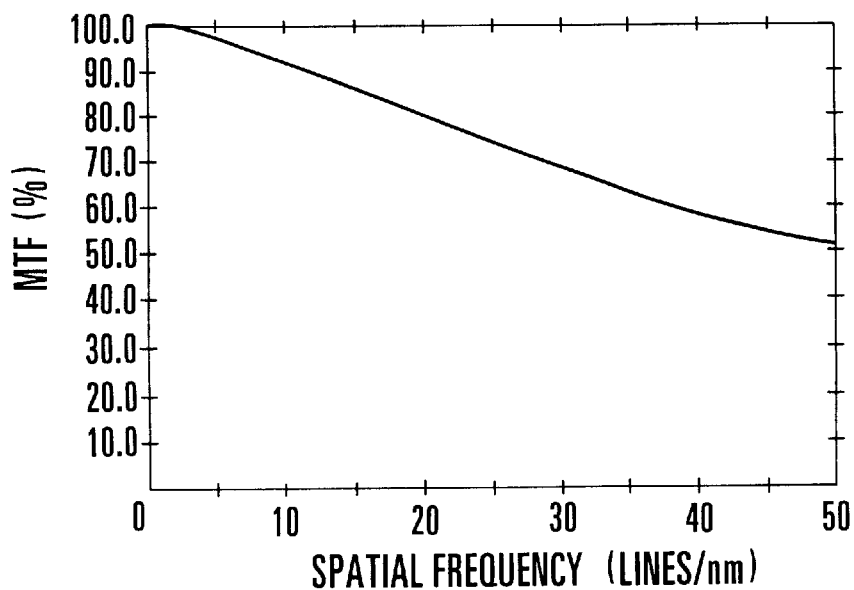
FIG. 55 is a graph of the MTF characteristics of the zoom lens of the embodiment 10 with the diffractive optical element of FIG. 16.

FIG. 55 shows the characteristics of Modulation Transfer Function (MTF) versus spatial frequency of the zoom lens of the embodiment 10 using the grating form of FIG. 16. It is appreciated from FIG. 55 that the MTF in the low frequency region is somewhat lowered.

Figure 56:
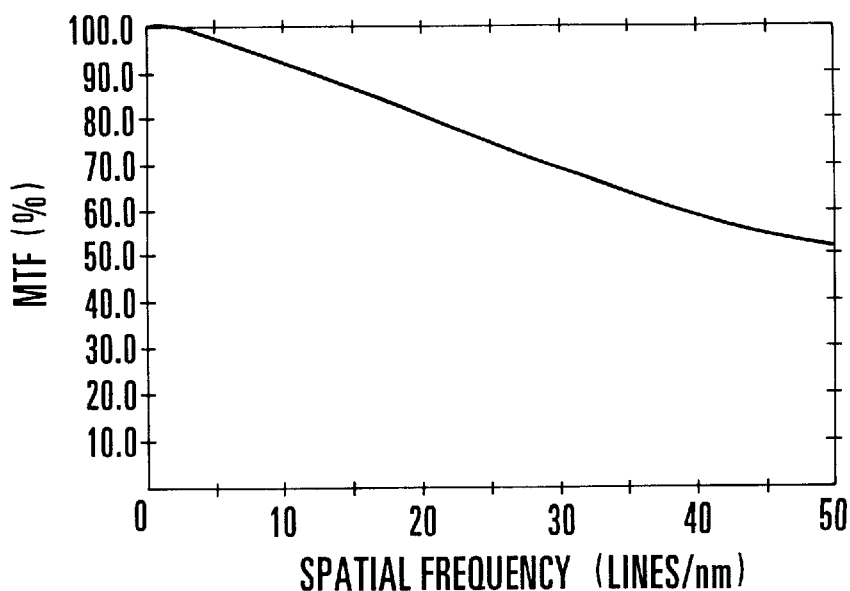
FIG. 56 is a graph of the MTF characteristics of the zoom lens of the embodiment 10 with the diffractive optical element of FIG. 19.

FIG. 56 shows the spatial frequency response MTF characteristics of the zoom lens of the embodiment 10 using the grating form of FIG. 19. By altering the structure of construction of the diffractive optical element to the laminated one, the MTF in the low frequency region is improved to obtain the desired MTF characteristic. With the use of the laminated structure, the optical performance of the zoom lens is further improved by the diffractive optical element.

Next, three numerical examples 10 to 12 of zoom lenses corresponding to the embodiments 10 to 12 are shown. In the numerical data for these examples 10 to 12, ri is the radius of curvature of the i-th lens surface, when counted from the object side, di is the i-th axial lens thickness or air separation, and ni and vi are respectively the refractive index and Abbe number of the material of the i-th lens element. The last lens surfaces in the numerical examples 10 to 12 define a glass block including the color separation prism, polarizing filter and color filters.

The shape of the aspheric surface is expressed by the equation (2) described before. In the values of the aspheric and phase coefficients, the notation "e-Z" means "$10^{-Z}$".

The values of the factors of the above-described conditions for the numerical examples 10 to 12 are also listed in Table-1.

TABLE 1

| Condition | Numerical Example | | |
|---|---|---|---|
| No. | 10 | 11 | 12 |
| (3) | 0.30 | 0.0047 | 0.0016 |
| (4) | 4.99e−4 | 1.79e−5 | 2.75e−6 |
| (7) | 0.31 | 0.14 | 0.51 |
| (8) | 0.749 | 0.781 | 0.788 |
| (9) | 1.324 | 1.287 | 1.273 |
| (10) | 2.136 | 2.269 | 2.301 |
| (11) | 3.09 | 2.80 | 2.75 |
| (12) | 0.168 | 0.147 | 0.147 |

Numerical Example 10:

f = 47.63~76.42    Fno = 2.57~3.60    2ω = 48.6°~31.5°

| r1 = ∞ | d1 = 2.50 | n1 = 1.51633 | v1 = 64.1 |
|---|---|---|---|
| r2 = ∞ | d2 = 0.10 | | |
| r3 = 72.395 | d3 = 3.70 | n2 = 1.49171 | v2 = 57.4 |
| r4 = 28.232 | d4 = 23.64 | | |
| r5 = −23.044 | d5 = 1.60 | n3 = 1.58144 | v3 = 40.8 |
| r6 = 95.349 | d6 = 4.20 | n4 = 1.80518 | v4 = 25.4 |
| r7 = −67.524 | d7 = Variable | | |
| r8 = ∞ (Stop) | d8 = 3.70 | n5 = 1.65844 | v5 = 50.9 |
| r9 = −78.004 | d9 = 0.20 | | |
| r10 = 52.215 | d10 = 5.00 | n6 = 1.51633 | v6 = 64.1 |
| r11 = −180.896 | d11 = 9.46 | | |
| r12 = −68.004 | d12 = 2.00 | n7 = 1.74077 | v7 = 27.8 |
| r13 = −191.961 | d13 = 18.04 | | |
| r14 = 343.204 | d14 = 2.00 | n8 = 1.62588 | v8 = 35.7 |
| r15 = 54.449 | d15 = 2.53 | | |
| r16 = 235.377 | d16 = 2.00 | n9 = 1.84666 | v9 = 23.8 |
| r17 = 70.224 | d17 = 7.40 | n10 = 1.51633 | v10 = 64.1 |
| r18 = −70.224 | d18 = 0.30 | | |
| r19 = 74.728 | d19 = 5.10 | n11 = 1.65844 | v11 = 50.9 |
| r20 = −588.246 | d20 = Variable | | |
| r21 = 238.154 | d21 = 4.00 | n12 = 1.63854 | v12 = 55.4 |
| r22 = −238.154 | d22 = 9.98 | | |
| r23 = ∞ | d23 = 40.00 | n13 = 1.51633 | v13 = 64.1 |
| r24 = ∞ | | | |

| Variable | Focal Length | | |
|---|---|---|---|
| separation | 47.63 | 63.13 | 76.42 |
| d7 | 16.84 | 6.56 | 1.07 |
| d20 | 34.00 | 61.78 | 85.60 |

Aspheric Coefficients:

| r3: | k = 3.98722e+00 | B = 3.57909e−06 | C = 4.66608e−09 |
|---|---|---|---|
| | D = −1.54183e−11 | E = 3.68607e−14 | F = −1.98234e−17 |

Phase Coefficients:

| r3: | C1 = −3.63257e−07 | C2 = 1.08111e−07 | C3 = −1.8134e−10 |
|---|---|---|---|
| | C4 = −3.614044e−13 | C5 = −9.41578e−18 | C6 = 3.42317e−20 |

Numerical Example 11:

f = 47.70~76.21    Fno = 2.50~3.65    2ω = 48.5°~31.5°

| r1 = ∞ | d1 = 2.50 | n1 = 1.51633 | v1 = 64.1 |
|---|---|---|---|
| r2 = ∞ | d2 = 0.50 | | |
| r3 = 66.171 | d3 = 3.70 | n2 = 1.49171 | v2 = 57.4 |
| r4 = 28.805 | d4 = 23.98 | | |
| r5 = −24.089 | d5 = 1.60 | n3 = 1.58144 | v3 = 40.8 |
| r6 = 62.973 | d6 = 0.09 | | |
| r7 = 66.586 | d7 = 4.40 | n4 = 1.80518 | v4 = 25.4 |
| r8 = −79.065 | d8 = Variable | | |
| r9 = ∞ (Stop) | d9 = 4.20 | n5 = 1.60311 | v5 = 60.6 |
| r10 = −101.120 | d10 = 0.20 | | |
| r11 = 41.289 | d11 = 6.20 | n6 = 1.63854 | v6 = 55.4 |
| r12 = −309.303 | d12 = 18.24 | | |
| r13 = −46.518 | d13 = 1.90 | n7 = 1.74077 | v7 = 27.8 |
| r14 = 46.518 | d14 = 1.26 | | |
| r15 = 74.518 | d15 = 5.40 | n8 = 1.49171 | v8 = 57.4 |
| r16 = −227.254 | d16 = 4.76 | | |
| r17 = 105.081 | d17 = 11.50 | n9 = 1.51633 | v9 = 64.1 |
| r18 = −39.577 | d18 = Variable | | |
| r19 = 174.232 | d19 = 5.10 | n10 = 1.51633 | v10 = 64.1 |
| r20 = −174.232 | d20 = 9.98 | | |
| r21 = ∞ | d21 = 40.00 | n11 = 1.51633 | v11 = 64.1 |
| r22 = ∞ | | | |

| Variable | Focal Length | | |
|---|---|---|---|
| separation | 47.70 | 63.05 | 76.21 |
| d8 | 16.97 | 6.62 | 1.06 |
| d18 | 35.01 | 62.79 | 86.61 |

Aspheric Coefficients:

| r3: | k = 4.71665e+00 | B = 2.51398e−06 | C = 1.38111e−09 |
|---|---|---|---|
| | D = −1.89750e−12 | E = 2.77356e−15 | F = 6.42233e−18 |
| r16: | k = −5.96357e+01 | B = 4.80456e−06 | C = 4.13110e−09 |
| | D = −3.75093e−12 | E = −1.66195e−15 | F = 2.53167e−17 |

Phase Coefficients:

| r16: | C1 = −4.00568e−05 | C2 = 1.88104e−07 | C3 = −7.15433e−10 |
|---|---|---|---|
| | C4 = −4.44106e−13 | C5 = −3.17967e−15 | C6 = −4.11617e−18 |

Numerical Example 12:

f = 47.64~76.24    Fno = 2.50~3.65    2ω = 48.6°~31.5°

| r1 = ∞ | d1 = 2.50 | n1 = 1.51633 | v1 = 64.1 |
|---|---|---|---|
| r2 = ∞ | d2 = 0.50 | | |
| r3 = 62.810 | d3 = 3.70 | n2 = 1.49171 | v2 = 57.4 |
| r4 = 28.441 | d4 = 23.28 | | |
| r5 = −24.182 | d5 = 1.60 | n3 = 1.58144 | v3 = 40.8 |
| r6 = 63.150 | d6 = 0.09 | | |
| r7 = 67.012 | d7 = 4.40 | n4 = 1.80518 | v4 = 25.4 |
| r8 = −80.203 | d8 = Variable | | |
| r9 = ∞ (Stop) | d9 = 4.20 | n5 = 1.60311 | v5 = 60.6 |
| r10 = −104.921 | d10 = 0.20 | | |
| r11 = 41.696 | d11 = 6.20 | n6 = 1.63854 | v6 = 55.4 |
| r12 = −278.818 | d12 = 16.85 | | |

-continued

| | | | |
|---|---|---|---|
| r13 = −47.304 | d13 = 1.90 | n7 = 1.74077 | ν7 = 27.8 |
| r14 = 47.304 | d14 = 1.36 | | |
| r15 = 74.540 | d15 = 5.40 | n8 = 1.49171 | ν8 = 57.4 |
| r16 = −217.058 | d16 = 4.48 | | |
| r17 = 115.978 | d17 = 11.30 | n9 = 1.51633 | ν9 = 64.1 |
| r18 = −38.801 | d18 = Variable | | |
| r19 = 175.112 | d19 = 5.10 | n10 = 1.51633 | ν10 = 64.1 |
| r20 = −175.112 | d20 = 9.98 | | |
| r21 = ∞ | d21 = 40.00 | n11 = 1.51633 | ν11 = 64.1 |
| r22 = ∞ | | | |

| Variable | Focal Length | | |
|---|---|---|---|
| separation | 47.64 | 63.04 | 76.24 |
| d8 | 17.01 | 6.63 | 1.08 |
| d18 | 34.43 | 65.21 | 89.03 |

Aspheric Coefficients:

| r3: | k = 4.99966e+00 | B = 2.11176e−06 | C = 6.50188e−10 |
|---|---|---|---|
| | D = −1.66201e−12 | E = 2.61361e−15 | F = 1.52356e−18 |
| r16: | k = −6.86029e+01 | B = 4.54754e−06 | C = 4.29889e−09 |
| | D = −9.24800e−12 | E = −8.31032e−15 | F = 3.46238e−17 |

Phase Coefficients:

| r20: | C1 = −7.63527e−05 | C2 = 1.22713e−07 | C3 = −2.09924e−10 |
|---|---|---|---|
| | C4 = 1.62491e−13 | C5 = −2.46679e−17 | C6 = −3.19960e−21 |

As in the embodiments 10 to 12, the negative lead type is used as the lens type and appropriate rules of design are set forth for each of the lens units. In particular, the diffractive optical element is used in an appropriate one of the lens units. Accordingly, the entire lens system is reduced to a compact size, while still maintaining the good telecentric condition over the entire zooming range. It is, therefore, made possible to achieve a zoom lens having good optical performance over the entire area of the image frame suited to be used with the liquid crystal display panels, and a projecting apparatus using the same.

Further, by specifying all such design parameters described before, the zoom ratio is increased to 1.57 or higher and the large aperture ratio is secured at about 2.6 in F-number. Despite these, astigmatism and distortion are lessened and, while securing the back focal distance long enough to accommodate the color combining prism or like optical elements and various optical filters or like optical elements, chromatic aberrations are corrected well. It is, therefore, made possible to realize a telecentric zoom lens having good optical performance maintained stable over the entire zooming range and over the entire focusing range. In addition, a liquid crystal video projector can be realized which is adapted to be used with that zoom lens.

Next, other embodiments of projection lenses for the projectors are described.

FIG. 57, FIG. 60, FIG. 63, FIG. 66 and FIG. 69 are longitudinal section views of embodiments 13 to 17 of zoom lenses, respectively. In these figures, a plane of projection or screen S lies at a first conjugate point of long distance. A plane to be projected, or liquid crystal display element LCD lies at a second conjugate point of short distance.

In these figures, the zoom lens comprises, from front to rear, a first lens unit L1 of negative refractive power, a second lens unit L2 of positive refractive power, a third lens unit L3 of negative refractive power, a fourth lens unit L4 of positive refractive power and a fifth lens unit L5 of positive refractive power. A glass block GB represents an infrared cut filter and others. In the embodiments 13 to 17, the first lens unit L1 corresponds to the front lens unit and the second to fifth lens units L2 to L5 correspond to the rear lens unit.

In these figures, the arrows show the loci of motion of the lens units during zooming from the wide-angle end to the telephoto end.

In the embodiments 13 to 17, during zooming from the wide-angle end to the telephoto end, the second lens unit L2 and the fourth lens unit L4 axially move toward the first conjugate point.

During this time, the separation between the second lens unit L2 and the third lens unit L3 increases and the separation between the third lens unit L3 and the fourth lens unit L4 decreases. The third lens unit L3, during zooming, either remains stationary, or axially moves toward the second conjugate point monotonously or moves in a locus convex toward the first conjugate point. The first and fifth lens units L1 and L5 remain stationary during zooming.

Focusing is performed by moving the first lens unit L1. At least one of the first to fifth lens units L1 to L5 is provided with at least one diffractive optical element.

Each of the embodiments 13 to 17, is next described. The embodiment 13 of FIG. 57 is an example of introduction of the diffractive optical element into the first lens unit that remains stationary during zooming. During zooming from the wide-angle end to the telephoto end, the second and fourth lens units L2 and L4 axially move toward the first conjugate point, while simultaneously moving the third lens unit L3 toward the second conjugate point monotonously. The fifth lens unit L5 remains stationary during zooming.

Figure 60:
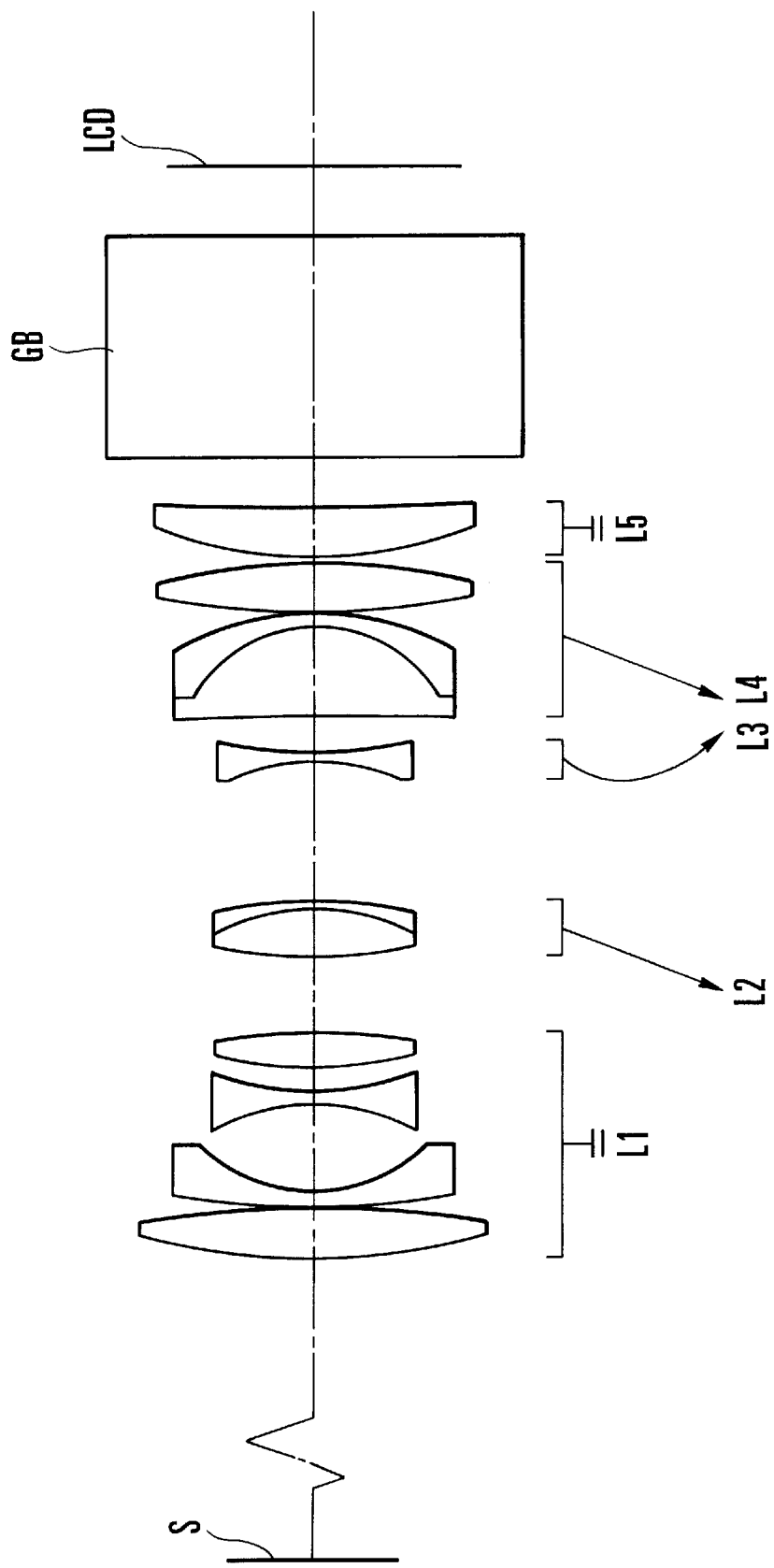
FIG. 60 is a longitudinal section view of an embodiment 14 of the zoom lens.

The embodiment 14 of FIG. 60 is an example of introduction of the diffractive optical element into the first lens unit that remains stationary during zooming. During zooming from the wide-angle end to the telephoto end, the second and fourth lens units axially move toward the first conjugate point. At the same time, the third lens unit axially moves first toward the first conjugate point and then turns toward the second conjugate point (while depicting a locus convex toward the first conjugate point). The fifth lens unit remains stationary during zooming.

Figure 63:
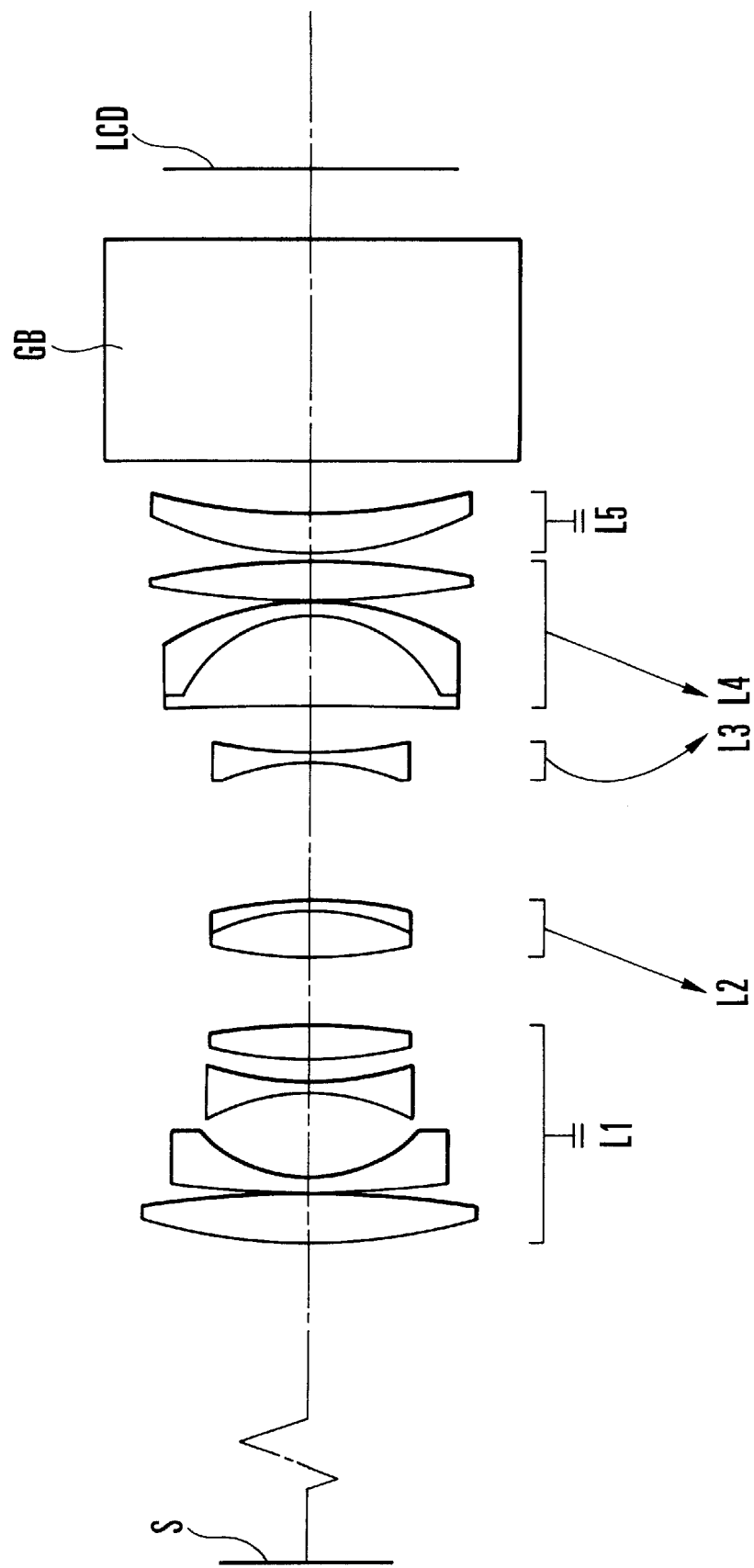
FIG. 63 is a longitudinal section view of an embodiment 15 of the zoom lens.

The embodiment 15 of FIG. 63 is an example of introduction of the diffractive optical elements into the first lens unit that remains stationary during zooming and also to the fifth lens unit. During zooming from the wide-angle end to the telephoto end, the second and fourth lens units axially move toward the first conjugate point. At the same time, the third lens unit axially moves first toward the first conjugate point and then turns toward the second conjugate point (while depicting a locus convex toward the first conjugate point). The fifth lens unit remains stationary during zooming.

Figure 66:
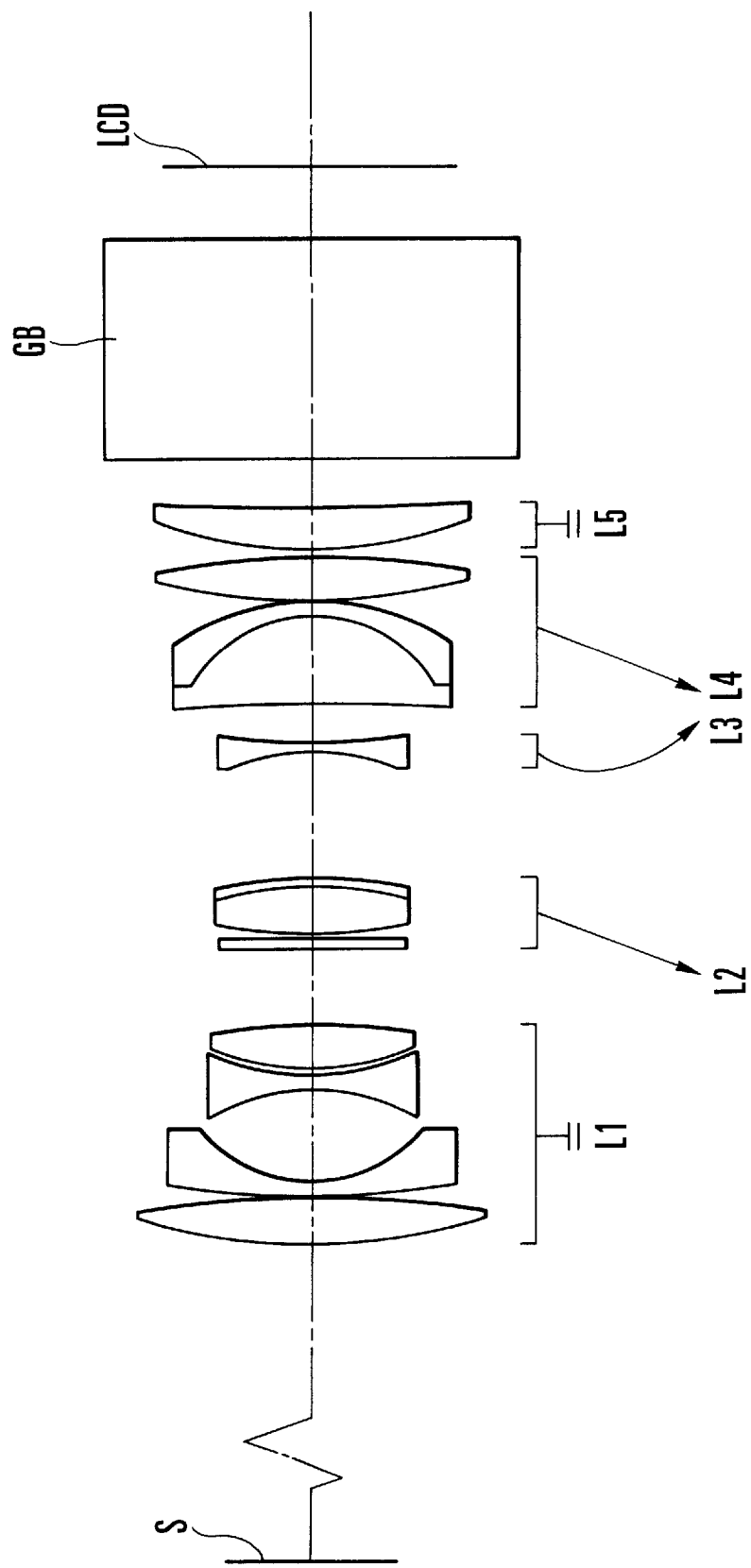
FIG. 66 is a longitudinal section view of an embodiment 16 of the zoom lens.

The embodiment 16 of FIG. 66 is an example of introduction of the diffractive optical elements into the first lens unit and the second lens unit. During zooming from the wide-angle end to the telephoto end, the second and fourth lens units axially move toward the first conjugate point. At the same time, the third lens unit axially moves first toward the first conjugate point and then turns toward the second conjugate point (while depicting a locus convex toward the first conjugate point). The fifth lens unit remains stationary during zooming. The diffractive optical element on the ninth surface is made by applying a diffractive optical surface on a flat plane glass.

The embodiment 17 of FIG. 69 is an example of introduction of the diffractive optical elements into the first lens unit and the fourth lens unit. During zooming from the wide-angle end to the telephoto end, the second and fourth lens units axially move toward the first conjugate point. The first, third and fifth lens units remain stationary during zooming.

In the figures, Li denotes the i-th lens unit (i=1~5). The lens units L1 to L5 constitute a zoom lens system which is attached to the liquid crystal video projector body through coupling members. The glass block GB and those parts that follow including the liquid crystal display panel LCD are held in the projector body.

In the embodiments 13 to 17, during zooming from the wide-angle end to the telephoto end, zooming movements occur as indicated by the arrow. Also, the first lens unit is axially moved to effect focusing.

Also, the first lens unit is preferably provided with an aspheric surface. According to this arrangement, the performance is further improved.

To facilitate improvements of the correction of aberrations, especially off-axial flare and chromatic aberrations, the first lens unit is made to include at least one aspherical lens and at least one diffractive optical element of revolution symmetry with respect to the optical axis. As mentioned before, the fineness of pixels in the liquid crystal display panel has been enhanced. Along with this, there arises a problem of the resolving power which was so far not very serious. Then, good correction of those aberrations which attribute to this has become inevitable. So, use is made of the aspheric surface in the fifth lens unit, thereby correcting the off-axial flare well. The fourth lens unit takes the position at which the off-axial rays passes relatively far away from the optical axis. For this reason, the diffractive optical element is put in this position to thereby correct lateral chromatic aberration well. Further improvements of the optical performance are thus achieved.

To improve the correction of aberrations, especially chromatic aberrations, the fifth lens unit includes at least one diffractive optical element of revolution symmetry with respect to the optical axis. As mentioned before, the use of a high definition liquid crystal display element leads to require good correction of chromatic aberrations, especially lateral one, which so far did not give rise to a very serious problem. This feature makes it possible to solve that problem.

The construction features of the zoom lens described above provide a possibility of accomplishing the objects of the embodiments 13 to 17. It is more preferred to satisfy at least one of the following conditions.

(A) Letting the longest and shortest focal lengths of the entire lens system be denoted by Fw and Ft, respectively, and the focal length of the i-th lens unit be denoted by Fi, the following conditions are satisfied:

$$0.8 < |F1/F2| < 2.3 \tag{13}$$

$$0.6 < F2/\sqrt{Fw \cdot Ft} \tag{14}$$

The inequalities of conditions (13) and (14) are for determining an appropriate relationship between the main variator or the second lens unit and the first lens unit.

When the lower limit of the condition (13) is exceeded, the diameter of the front lens member determined by the first lens unit increases greatly. Also, large distortion is produced in the wide-angle end. So, the violation is objectionable. When the upper limit is exceeded, the total zooming movement of the second lens unit must be made large to obtain the desired zoom ratio. So, the physical length of the complete lens is caused to increase objectionably.

The inequality of condition (14) is for appropriately determining the power of the main variator unit or the second lens unit. When the lower limit is exceeded, the image plane is objectionably over-corrected. When the upper limit is exceeded, the total zooming movement of the second lens unit must be taken large to obtain the desired zoom ratio go, the physical length of the complete lens is caused to increase objectionably.

(B) The whole lens system has to hold a nearly telecentric property. For this purpose, it is desired to satisfy the following condition:

$$4 < |Tk|/Fw \tag{15}$$

where Tk is the distance from the second conjugate point of short distance to the exit pupil of the zoom lens (or the distance from the panel (image plane) to the exit pupil which takes a minimum absolute value during zooming).

The term "nearly telecentric" property used herein means that the exit pupil is far enough to remove the light distribution characteristics of the liquid crystal element or the influence of the angle dependence of the color combining dichroic mirror when a plurality of color beams are combined. In actual practice, this condition is prerequisite to remove its angle dependency.

More preferably, the value of the factor of the condition (15) falls within the following range:

$$9.0 < |Tk|/Fw \tag{15a}$$

(C) To correct distortion well, it is preferred to satisfy the following condition:

$$1 < |F1|/Fw < 2 \tag{16}$$

When the upper limit of this condition is violated, distortion cannot be made appropriate in the wide-angle end. When the lower limit is exceeded, distortion cannot be made appropriate in the telephoto end.

(D) With the diffractive optical element arranged in the first lens unit, when an appropriate phase for the diffractive optical element is selected, the lateral chromatic aberrations for two wavelengths of light, for example, d-line and g-line, produced in the first lens unit are suppressed to a minimum. So, a good stability of lateral chromatic aberration is maintained over the entire zooming range. Moreover, the longitudinal chromatic aberration (secondary spectrum) residual that exists in the telephoto end does not worsen.

(E) With the diffractive optical element arranged in the second lens unit, when an appropriate phase for the diffractive optical element is selected, the lateral chromatic aberrations for two wavelengths of light, for example, d-line and g-line, produced in the second lens unit are suppressed to a minimum. So, a good stability of lateral chromatic aberration is maintained over the entire zooming range. Moreover, the longitudinal chromatic aberration (secondary spectrum) residual that exists in the telephoto end does not worsen.

(F) The zoom lens is constructed so as to satisfy the features (D) and (E) at once. With this construction, a high standard of correction of chromatic aberrations is attained in order to insure that the requirements of maintaining good optical performance and of further improvement of the compact form are fulfilled at once.

(G) The phase for the diffractive optical surface is expressed by the equation (1) described before. In the zoom lens of the telecentric type, the phase coefficients have to be effectively utilized in achieving advantageous correction of aberrations. For this purpose, it is preferred to satisfy the following condition:

$$fi \cdot C1 < 0 \tag{17}$$

where C1 is the phase coefficient of the term in the first degree in the equation for the diffractive optical element, and fi is the refractive power of the lens unit that has the diffractive optical element. C1 represents the paraxial refractive power of the diffractive optical element. When C1 has a positive value, the refractive power of the diffractive optical element is negative. When C1 has a negative value, the refractive power of the diffractive optical element is positive. If this condition is satisfied, it results that, regardless of whether the diffractive optical element is put in the positive or negative lens unit, the curvature of that lens unit can be made looser, giving an advantage on the aberration correction.

(H) The phase coefficients of the diffractive optical system are preferably determined so as to satisfy the conditions (3) and (4) mentioned before.

When the conditions (3) and (4) are violated, it becomes difficult not only to correct aberrations but also to manufacture the diffractive optical surfaces. So, the violations are objectionable.

(I) The diffractive optical element is arranged at least one lens in the interior of the first lens unit, or in the interior of the second lens unit or in the interior of the third lens unit to thereby suppress the lateral chromatic aberration the respective individual lens unit produces to a minimum. As the second lens unit moves to effect zooming, the range of variation of lateral chromatic aberration is also suppressed to a minimum.

(J) As the diffractive optical element is applied on the optical surface, its base is spherical, or flat plane, or aspherical, or even quadric.

Also, a layer of plastic is deposited as the aforesaid diffractive optical surface on any of these surface. That is, the so-called "replica" diffraction grating may be employed. According to this, it becomes easy to obtain the high optical performance.

(K) If the refracting power of the diffractive optical element is strengthened, the difference in pitch between the paraxial and marginal zones increases largely, causing the production technique to become difficult. The diffraction efficiency of finished products is also not good.

As in the embodiments 13 to 17, instead of the cemented lens, the diffractive optical element is used in the first lens unit, or the second lens unit, or the third lens unit to correct the chromatic aberrations. In this case, the refractive power of the diffractive optical element needs not to be necessarily much.

Nonetheless, in order to correct some of the off-axial aberrations, especially field curvature and distortion, a refractive power may be given to the diffractive optical element. If so, the above-mentioned condition (7) must be satisfied. In this case, no difficult problems arise in manufacturing, and a good effect is produced to correct the aberrations including chromatic ones.

(L) For the second lens unit as the main variator, the following conditions are set forth:

$$0.8 < Z2/Z < 1.1 \qquad (18)$$

$$0.9 < M2/M4 < 15 \qquad (19)$$

$$0.4 < M2/(Ft-Fw) < 1.5 \qquad (20)$$

where Z2 is the magnification change of the second lens unit as defined by $Z2=\beta 2t/\beta 2w$ wherein $\beta 2w$ and $\beta 2t$ are the magnifications of the second lens unit in the wide-angle end and the telephoto end, respectively, Z is the change of the focal length of the entire lens system as defined by $Z=Ft/Fw$, and M2 and M4 are the total zooming movements of the second and fourth lens units as the variators, respectively.

The inequalities of condition (18) give a proper range for the ratio of the changes of magnification by the second and fourth lens units. Since the third lens unit decreases the magnification during zooming, it is preferred to satisfy this condition.

The inequalities of conditions (19) and (20) have an aim to make appropriate the physical length of the entire lens system and the zooming movements of the variators. Particularly, the second and fourth lens units give a fact that the fourth lens unit tends to be rather weaker in refractive power. To make appropriate contributions to the variation of the focal length, this range is preferable. It is more preferred that, in particular, the zooming movement of the second lens unit exceeds the zooming movement of the fourth lens unit.

$$1 \leq M2/M4 < 1.6 \qquad (19a)$$

(M) As described above, compared with the second lens unit, the fourth lens unit tends to weaken in refractive power. It is preferred to satisfy, in particular, the following condition:

$$0.4 < F2/F4 < 1.5 \qquad (21)$$

The inequalities of condition (21) is necessary to determine an appropriate Petzval sum in such a manner as to make good compromise between the power arrangement and the magnification change of the main variator.

(N) To make appropriate the exit pupil of the entire lens system and distortion, it is preferred to satisfy the following conditions:

$$0.1 < bf/F5 < 0.5 \qquad (22)$$

$$0.5 < |F1|/bf < 2.2 \qquad (23)$$

where bf is the distance from the fifth lens unit to the display (LCD) or the reduced length to air with the dichroic mirrors removed.

The inequalities (22) are necessary to make the entire lens system in an appropriately telecentric form. When the upper limit is exceeded, the size increases greatly. When the lower limit is exceeded, distortion is produced. The inequalities (23), too, have an aim to take appropriate distortion, while elongating the exit pupil to get the telecentric form.

(O) The power arrangement of all the lens units is made appropriate and the zooming movements of all the variators are made appropriate to improve the compact form. For this purpose, it is preferred to satisfy the following condition:

$$0.7 < |F1|/\sqrt{Fw \cdot Ft} < 2.1 \qquad (24)$$

In this connection, it should be noted that distortion must be suppressed sufficiently in the first lens unit and also a sufficient back focal distance must be secured.

When the upper limit is exceeded, the focusing movement increases to increase the physical length of the entire lens system, and the back focal distance shortens. So, the violation is objectionable. Conversely, when the lower limit is exceeded, the focusing movement decreases, but it becomes difficult to correct distortion. At the same time, the Petzval sum increased to the negative direction, causing the image surface to decline. So, this violation is objectionable.

(P) Letting the focal length of the i-th lens unit be denoted by Fi, and the shortest and longest focal lengths of the entire lens system by Fw and Ft, respectively, the following conditions are set forth:

$$0.6 < |F3|/\sqrt{Fw \cdot Ft} < 1.4 \quad (25)$$

$$0.8 < F4/\sqrt{Fw \cdot Ft} < 1.8 \quad (26)$$

$$1.5 < F5/\sqrt{Fw \cdot Ft} < 6.0 \quad (27)$$

The inequalities (25) and (26) express an appropriate power distribution over those lens units which contribute to variations of the focal length. When the upper limit of either condition is exceeded, the zooming movement increases to obtain the desired zoom ratio, causing the physical length of the entire lens system to increase objectionably. When the lower limit is exceeded, the zooming movement of each of the lens units decreases, but the variation with zooming of aberrations, especially curvature of field, increases objectionably.

The inequalities (27), together with the inequalities (22), are necessary to make farther the exit pupil to secure the telecentric form. When the lower limit is exceeded, the telecentric form is secured, but the fifth lens unit produces distortion objectionably. Also, when the upper limit is exceeded, the size of the entire lens system increases objectionably.

(Q) The lateral chromatic aberration is reduced at any zooming station. Moreover, its range of variation with zooming, too, is suppressed to a minimum. For these purposes, it is preferred that the third lens unit includes a lens whose material has an Abbe number v3 lying in the following range:

$$55 < v3 \quad (28)$$

More preferably, $$60 < v3 \quad (28a)$$

(R) The mean Abbe number v1n of the negative lenses in the first lens unit lies in the following range:

$$60 < v1n \quad (29)$$

With the selection of such a material, it becomes possible to reduce the chromatic aberrations and their range of variation with zooming.

(S) The telecentric system is made optimum in such a manner as to optimize the distance from the zoom lens to the display panel. For this purpose, the following condition is set forth:

$$2 < F5/Fw < 7 \quad (30)$$

When the lower limit is exceeded, the optimum telecentricity is no longer realized. When the upper limit is exceeded, the size increases objectionably.

(T) In general, the diffractive optical element produces chromatic aberrations in the reverse sense to that for the ordinary refraction. Assuming that, for example, the cemented surface used in the conventional way to achromatize is removed as the cemented lens is replaced by a single lens to reduce the total number of lens elements, then it is preferable to select that surface which would be used to contribute the reverse chromatic aberrations to those the cemented surface contributes, when in applying the diffractive optical surface. With this arrangement, it results that the reverse chromatic aberrations to those the ordinary refraction produces are produced by the diffractive optical surface and that their directions coincide with those when the cemented surface would otherwise be used. Thus, it is made possible for the single lens to do the same achromatism as the cemented lens does.

From the point of view of the chromatic aberration coefficients mentioned before, it is preferred that, as the diffractive optical surface takes its place on the object side of the stop, the surface of the same sign in the longitudinal and lateral chromatic aberration coefficients is selected to use. On the image side of the stop, the surface of the opposite sign in both coefficients is selected to use for the diffractive optical surface.

In the embodiments 13 to 17, the chromatic aberrations are reduced by using the diffractive optical element of the structure shown in FIG. 16 or FIG. 19 or FIG. 22. In turn, the number of constituent lenses is reduced. Further improvements of the compact form are thus achieved, while still maintaining good optical performance.

Next, five numerical examples 13 to 17 corresponding to the embodiments 13 to 17 are shown. In the numerical data for these examples 13 to 17, ri is the radius of curvature of the i-th lens surface, when counted from the first conjugate point side, di is the i-th axial lens thickness or air separation, and ni and vi are respectively the refractive index and Abbe number of the material of the i-th lens element.

Also, the flat plate glass in the numerical examples 13 to 17 is a glass block including the color combining prism, polarizing filter and color filters. The values of the factors of the above-described conditions for the numerical examples 13 to 17 are listed in Table-2. The values of the focal lengths of all the lens units and the focal length of the diffractive optical element for the numerical examples 13 to 17 to determine the values of the factors in the conditions (17) and (7) are also listed in Table-3.

In the values of the phase coefficients, the notation "e-Z" means "$10^{-Z}$."

Numerical Example 13:

f = 33.29~42.1  Fno = 1.18~2.1  2ω = 54.1°~44.0°

| | | | |
|---|---|---|---|
| r1 = 81.480 | d1 = 7.30 | n1 = 1.51633 | v1 = 64.1 |
| r2 = −215.459 | d2 = 0.20 | | |
| r3 = 127.474 | d3 = 2.20 | n2 = 1.51633 | v2 = 64.1 |
| r4 = 27.091 | d4 = 10.34 | | |
| r5 = −45.890 | d5 = 2.00 | n3 = 1.51633 | v3 = 64.1 |
| r6 = 41.527 | d6 = Variable | | |
| r7 = 97.271 | d7 = 5.00 | n4 = 1.72000 | v4 = 50.2 |
| r8 = −100.178 | d8 = 14.08 | | |
| r9 = 51.381 | d9 = 8.00 | n5 = 1.69680 | v5 = 55.5 |
| r10 = −38.917 | d10 = 1.40 | n6 = 1.80518 | v6 = 25.4 |
| r11 = −76.413s | d11 = Variable | | |
| r12 = −44.205 | d12 = 1.30 | n7 = 1.51633 | v7 = 64.1 |
| r13 = 34.093 | d13 = 2.50 | n8 = 1.80518 | v8 = 25.4 |
| r14 = 41.389 | d14 = Variable | | |
| r15 = −521.769 | d15 = 12.00 | n9 = 1.69680 | v9 = 55.5 |
| r16 = −20.868 | d16 = 2.00 | n10 = 1.80518 | v10 = 25.4 |
| r17 = −45.034 | d17 = 0.20 | | |
| r18 = 337.807 | d18 = 5.00 | n11 = 1.60311 | v11 = 60.6 |
| r19 = −99.198 | d19 = Variable | | |
| r20 = 57.149 | d20 = 6.00 | n12 = 1.60311 | v12 = 60.6 |
| r21 = 190.809 | d21 = 7.10 | | |
| r22 = ∞ | d22 = 32.00 | n13 = 1.51633 | v13 = 64.2 |
| r23 = ∞ | | | |

(r22, r23) = GB
s) Stop

| Variable | Focal Length | | |
|---|---|---|---|
| separation | 33.31 | 37.70 | 42.11 |
| d6 | 10.31 | 7.62 | 5.59 |
| d11 | 10.98 | 15.59 | 20.10 |
| d14 | 11.53 | 8.47 | 5.13 |
| d19 | 1.00 | 2.14 | 3.00 |

-continued r3: Diffractive Optical Surface

| C1 | C2 | C3 |
|---|---|---|
| 9.78669e-05 | -2.01981e-07 | 2.71608e-10 |

Numerical Example 14:

f = 33.22~42.12  Fno = 1:1.8~2.07  2ω = 54.2°~43.96°

| | | | |
|---|---|---|---|
| r1 = 93.471 | d1 = 7.30 | n1 = 1.51805 | ν1 = 64.1 |
| r2 = -150.853 | d2 = 0.20 | | |
| r3 = 123.856 | d3 = 2.20 | n2 = 1.51805 | ν2 = 64.1 |
| r4 = 23.512 | d4 = 12.55 | | |
| r5 = -30.818 | d5 = 2.00 | n3 = 1.51805 | ν3 = 64.1 |
| r6 = 40.912 | d6 = 3.18 | | |
| r7 = 59.942 | d7 = 5.00 | n4 = 1.72305 | ν4 = 50.2 |
| r8 = -91.111 | d8 = Variable | | |
| r9 = 63.992 | d9 = 7.00 | n5 = 1.69948 | ν5 = 55.5 |
| r10 = -32.801 | d10 = 1.40 | n6 = 1.81185 | ν6 = 25.4 |
| r11 = -60.063s | d11 = Variable | | |
| r12 = -31.727 | d12 = 1.30 | n7 = 1.51805 | ν7 = 64.1 |
| r13 = 68.198 | d13 = Variable | | |
| r14 = -378.228 | d14 = 13.00 | n8 = 1.69948 | ν8 = 55.5 |
| r15 = -21.251 | d15 = 2.00 | n9 = 1.81185 | ν9 = 25.4 |
| r16 = -40.023 | d16 = 0.20 | | |
| r17 = 132.292 | d17 = 7.00 | n10 = 1.60524 | ν10 = 60.6 |
| r18 = -100.879 | d18 = Variable | | |
| r19 = 68.011 | d19 = 7.00 | n11 = 1.60524 | ν11 = 60.6 |
| r20 = 510.719 | d20 = 7.10 | n12 = 1.51805 | ν12 = 64.2 |
| r21 = ∞ | d21 = 32.00 | | |
| r22 = ∞ | | | |

(r21, r22) = GB
s) Stop

| Variable | Focal Length | | |
|---|---|---|---|
| separation | 33.22 | 36.72 | 42.12 |
| d8 | 11.10 | 5.67 | 1.58 |
| d11 | 20.02 | 24.44 | 30.51 |
| d13 | 5.23 | 5.57 | 3.09 |
| d18 | 1.00 | 1.66 | 2.17 | r3: Diffractive Optical Surface

| C1 | C2 | C3 |
|---|---|---|
| 2.54526e-04 | -3.86445e-07 | 5.88535e-10 |

Numerical Example 15:

f = 33.37~44.28  Fno = 1:1.8~2.09  2ω = 54.0°~42.0°

| | | | |
|---|---|---|---|
| r1 = 83.975 | d1 = 7.30 | n1 = 1.51805 | ν1 = 64.1 |
| r2 = -163.245 | d2 = 0.20 | | |
| r3 = 146.222 | d3 = 2.20 | n2 = 1.51805 | ν2 = 64.1 |
| r4 = 22.688 | d4 = 11.73 | | |
| r5 = -32.876 | d5 = 2.00 | n3 = 1.51805 | ν3 = 64.1 |
| r6 = 44.145 | d6 = 3.12 | | |
| r7 = 60.547 | d7 = 5.00 | n4 = 1.72305 | ν4 = 50.2 |
| r8 = -94.905 | d8 = Variable | | |
| r9 = 64.610 | d9 = 7.00 | n5 = 1.69948 | ν5 = 55.5 |
| r10 = -33.125 | d10 = 1.40 | n6 = 1.81185 | ν6 = 25.4 |
| r11 = -63.703s | d11 = Variable | | |
| r12 = -33.174 | d12 = 1.30 | n7 = 1.48898 | ν7 = 70.2 |
| r13 = 70.120 | d13 = Variable | | |
| r14 = -697.326 | d14 = 13.00 | n8 = 1.69948 | ν8 = 55.5 |
| r15 = -21.251 | d15 = 2.00 | n9 = 1.81185 | ν9 = 25.4 |
| r16 = -39.476 | d16 = 0.20 | | |
| r17 = 128.348 | d17 = 6.00 | n10 = 1.60524 | ν10 = 60.6 |
| r18 = -109.879 | d18 = Variable | | |
| r19 = 50.848 | d19 = 6.00 | n11 = 1.60524 | ν11 = 60.6 |
| r20 = 91.643 | d20 = 7.10 | | |
| r21 = ∞ | d21 = 32.00 | n12 = 1.51805 | ν12 = 64.2 |
| r22 = ∞ | | | |

(r21, r22) = GB
s) Stop

| Variable | Focal Length | | |
|---|---|---|---|
| separation | 33.37 | 37.19 | 42.28 |
| d8 | 10.13 | 5.26 | 5.58 |
| d11 | 19.69 | 24.85 | 31.02 |
| d13 | 7.07 | 6.35 | 3.52 |
| d18 | 1.00 | 1.44 | 1.76 | r3: Diffractive Optical Surface

| C1 | C2 | C3 |
|---|---|---|
| 2.88580e-04 | -5.05548e-07 | 1.02969e-09 | r19: Diffractive Optical Surface

| C1 | C2 | C3 |
|---|---|---|
| -6.31175e-05 | 1.97625e-07 | -1.01560e-10 |

Numerical Example 16:

f = 33.24~42.30  Fno = 1:1.8~2.07  2ω = 54.2°~43.78°

| | | | |
|---|---|---|---|
| r1 = 76.274 | d1 = 7.30 | n1 = 1.51805 | ν1 = 64.1 |
| r2 = -173.754 | d2 = 0.20 | | |
| r3 = 134.762 | d3 = 2.20 | n2 = 1.51805 | ν2 = 64.1 |
| r4 = 22.231 | d4 = 13.01 | | |
| r5 = -29.890 | d5 = 2.00 | n3 = 1.51805 | ν3 = 64.1 |
| r6 = 35.723 | d6 = 0.96 | | |
| r7 = 40.813 | d7 = 6.00 | n4 = 1.72305 | ν4 = 50.2 |
| r8 = -103.044 | d8 = Variable | | |
| r9 = ∞ | d9 = 1.50 | n5 = 1.51805 | ν5 = 64.1 |
| r10 = ∞ | d10 = 0.50 | | |
| r11 = 68.588 | d11 = 7.00 | n6 = 1.69948 | ν6 = 55.5 |
| r12 = -59.096 | d12 = 1.40 | n7 = 1.81185 | ν7 = 25.4 |
| r13 = -68.564s | d13 = Variable | | |
| r14 = -32.062 | d14 = 1.30 | n8 = 1.48898 | ν8 = 70.2 |
| r15 = 73.326 | d15 = Variable | | |
| r16 = -174.341 | d16 = 12.50 | n9 = 1.69948 | ν9 = 55.5 |
| r17 = -21.251 | d17 = 2.00 | n10 = 1.81185 | ν10 = 25.4 |
| r18 = -38.132 | d18 = 0.20 | | |
| r19 = 102.962 | d19 = 6.00 | n11 = 1.60524 | ν11 = 60.6 |
| r20 = -127.656 | d20 = Variable | | |
| r21 = 68.423 | d21 = 6.00 | n12 = 1.60524 | ν12 = 60.6 |
| r22 = 406.902 | d22 = 7.10 | | |
| r23 = ∞ | d23 = 32.00 | n13 = 1.51805 | ν13 = 64.2 |
| r24 = ∞ | | | |

(r23, r24) = GB
s) Stop

| Variable | Focal Length | | |
|---|---|---|---|
| separation | 33.25 | 37.10 | 42.31 |
| d8 | 11.19 | 5.82 | 1.64 |
| d13 | 18.69 | 23.40 | 29.36 |
| d15 | 5.95 | 5.83 | 3.46 |
| d20 | 1.00 | 1.77 | 2.36 |

-continued r3: Diffractive Optical Surface

| C1 | C2 | C3 |
|---|---|---|
| 5.27641e−04 | −7.27557e−07 | 8.51180e−10 | r9: Diffractive Optical Surface

| C1 | C2 | C3 |
|---|---|---|
| −6.51658e−04 | 4.44622e−07 | 3.02396e−10 |

-continued

| d11 | 21.33 | 27.04 | 31.35 |
|---|---|---|---|
| d13 | 6.17 | 5.21 | 3.58 |
| d18 | 1.00 | 1.96 | 3.59 | r3: Diffractive Optical Surface

| C1 | C2 | C3 |
|---|---|---|
| 4.66063e−04 | −4.55072e−07 | 5.17981e−10 | r7: Diffractive Optical Surface

| C1 | C2 | C3 |
|---|---|---|
| 1.79630e−05 | 2.26701e−07 | −1.32203e−10 |

TABLE 2

| Condition | Numerical Example | | | | |
|---|---|---|---|---|---|
| No. | 13 | 14 | 15 | 16 | 17 |
| (13) | 0.99856 | 1.34858 | 1.33194 | 1.36191 | 1.2841 |
| (14) | 0.892517 | 1.304911 | 1.352071 | 1.283969 | 1.352646 |
| (15) | 6.54831 | 23.389 | 23.5523 | 17.9448 | 24.6082 |
| (16) | 1.00225 | 1.9814 | 2.02703 | 1.97257 | 1.95829 |
| (18) | 0.974203 | 0.973322 | 0.955566 | 0.981493 | 0.998436 |
| (19) | 2.35945 | 8.172115 | 11.18705 | 7.026132 | 4.026117 |
| (20) | 0.53557 | 1.07083 | 0.96009 | 1.05353 | 1.10973 |
| (21) | 0.645296 | 1.162918 | 1.243427 | 1.125315 | 1.297897 |
| (22) | 0.284965 | 0.293431 | 0.215861 | 0.279953 | 0.200228 |
| (23) | 0.88338 | 1.74078 | 1.79058 | 1.73525 | 1.72737 |
| (24) | 0.89123 | 1.75977 | 1.80088 | 1.74865 | 1.73693 |
| (25) | 1.16589 | 1.1125 | 1.22099 | 1.21153 | 1.18851 |
| (26) | 1.383112 | 1.122101 | 1.087375 | 1.140986 | 1.042183 |
| (27) | 3.540393 | 3.445142 | 4.659265 | 3.599603 | 5.021953 |
| (30) | 3.981408 | 3.879022 | 5.244359 | 4.060547 | 5.661969 |
| (3) | 2.06e−03 | 1.52e−03 | 1.75e−03 | 1.38e−03 | 9.76e−04 |
| (4) | 2.78e−06 | 2.31e−06 | 3.57e−06 | 1.61e−06 | 1.11e−06 |

Numerical Example 17:

f = 33.30~42.33   Fno = 1:1.8~2.06   2ω = 54.1°~42.76°

| r1 = 62.031 | d1 = 9.00 | n1 = 1.51805 | ν1 = 64.1 |
|---|---|---|---|
| r2 = −237.395 | d2 = 0.40 | | |
| r3 = 132.374 | d3 = 2.20 | n2 = 1.51805 | ν2 = 64.1 |
| r4 = 23.785 | d4 = 12.91 | | |
| r5 = −34.574 | d5 = 2.00 | n3 = 1.51805 | ν3 = 64.1 |
| r6 = 41.772 | d6 = 5.18 | | |
| r7 = 66.677 | d7 = 5.00 | n4 = 1.72305 | ν4 = 50.2 |
| r8 = −144.908 | d8 = Variable | | |
| r9 = 68.753 | d9 = 7.00 | n5 = 1.69948 | ν5 = 55.5 |
| r10 = −29.259 | d10 = 1.40 | n6 = 1.81185 | ν6 = 25.4 |
| r11 = −58.639s | d11 = Variable | | |
| r12 = −30.217 | d12 = 1.30 | n7 = 1.48898 | ν7 = 70.2 |
| r13 = 79.640 | d13 = Variable | | |
| r14 = −935.943 | d14 = 13.00 | n8 = 1.69948 | ν8 = 55.5 |
| r15 = −21.251 | d15 = 2.00 | n9 = 1.81185 | ν9 = 25.4 |
| r16 = −37.510 | d16 = 0.20 | | |
| r17 = 93.028 | d17 = 6.00 | n10 = 1.60524 | ν10 = 60.6 |
| r18 = −176.394 | d18 = Variable | | |
| r19 = 60.531 | d19 = 6.00 | n11 = 1.60524 | ν11 = 60.6 |
| r20 = 124.077 | d20 = 7.10 | | |
| r21 = ∞ | d21 = 32.00 | n12 = 1.51805 | ν12 = 64.2 |
| r22 = ∞ | | | |

(r21, r22) = GB
s) Stop

| Variable | Focal Length | | |
|---|---|---|---|
| separation | 33.30 | 37.85 | 42.33 |
| d8 | 11.27 | 5.56 | 1.25 |

TABLE 3

| | Numerical Example | | | | |
|---|---|---|---|---|---|
| | 13 | 14 | 15 | 16 | 17 |
| F1 | −33.368 | −65.824 | −67.648 | −65.582 | −65.2169 |
| F2 | 33.416 | 48.81 | 50.789 | 48.155 | 50.788 |
| F3 | −43.651 | −41.613 | −45.865 | −45.4376 | −44.625 |
| F4 | 51.784 | 41.972 | 40.846 | 42.792 | 39.131 |
| F5 | 132.553 | 128.865 | 175.02 | 135.001 | 188.56 |
| Fbo1 | 257.682 | 268.819 | 333.037 | 350.089 | 328.83 |
| Fbo2 | | | | 819.72 | |
| Fbo3 | | | | | |
| Fbo4 | | | | | 158.5035 |
| Fbo5 | | | 83.186 | | |

Incidentally, FIGS. 58A to 58D ard FIGS. 59A to 59D show the aberrations of the embodiment 13 in the wide-angle and telephoto ends, respectively. FIGS. 61A to 61D and FIGS. 62A to 62D show the aberrations of the embodiment 14 in the wide-angle and telephoto ends, respectively. FIGS. 64A to 64D and FIGS. 65A to 65D show the aberrations of the embodiment 15 in the wide-angle and telephoto ends, respectively. FIGS. 67A to 67D and FIGS. 68A to 68D show the aberrations of the embodiment 16 in the wide-angle and telephoto ends, respectively. FIGS. 70A to 70D and FIGS. 71A to 71D show the aberrations of the embodiment 17 in the wide-angle and telephoto ends, respectively.

As described above, the five lens units are used in total. Of these, a certain one is provided with a diffractive optical element whose phase is made appropriate to lessen astigmatism and distortion. In addition, the lateral chromatic aberration is corrected so well as to be suited to the high definition liquid crystal display. It is, therefore, made possible to achieve a zoom lens of telecentric system with the back focal distance elongated, while still maintaining good optical performance.

In particular, according to the zoom lenses of the embodiments 13 to 17, based on the rules of design described before, the zoom ratio is increased to 1.3 or higher and the large aperture ratio is secured at about 1.8 in F-number. Despite these advantages, astigmatism and distortion are lessened and, while securing the back focal distance long enough to accommodate the color combining prism or like optical elements and various optical filters or like optical elements, longitudinal chromatic aberration is corrected well. It is, therefore, made possible to realize a zoom lens of telecentric optical system having good optical performance maintained stable over the entire zooming range and over the entire focusing range. In addition, a liquid crystal video projector can be realized which is adapted to be used with that zoom lens.

What is claimed is:

1. A zoom lens of retrofocus type, comprising, in order from a longer-distance conjugate point side to a shorter-distance conjugate point side: a front lens unit of negative refractive power; and one or more lens units, wherein said one or more lens units, taken together, have a positive refractive power, wherein a separation between said front lens unit and a most longer-distance conjugate point side lens unit of said one or more lens units varies when zooming, and at least one of said front lens unit and said one or more lens units is provided with a diffractive optical element, wherein plural lens units of said zoom lens move independently during zooming, and wherein said diffractive optical element has a positive refractive power.

2. A zoom lens according to claim 1, wherein said front lens unit consists of a first lens unit of negative refractive power, and said one or more lens units consists of a second lens unit of positive refractive power.

3. A zoom lens according to claim 2, wherein said second lens unit comprises, in order from the longer-distance conjugate point side to the shorter-distance conjugate point side, a positive lens and a negative lens, and said positive lens of said second lens unit is said diffractive optical element and has a diffractive optical surface facing the longer-distance conjugate point side.

4. A zoom lens according to claim 3, wherein said first lens unit comprises, in order from the longer-distance conjugate point side to the shorter-distance conjugate point side, a negative lens and a positive lens, and said negative lens of said first lens unit is said diffractive optical element and has a diffractive optical surface facing the shorter-distance conjugate point side.

5. A zoom lens according to claim 2, wherein said first lens unit comprises, in order from the longer-distance conjugate point side to the shorter-distance conjugate point side, a negative lens and a positive lens, and said negative lens of said first lens unit is said diffractive optical element and has a diffractive optical surface facing the shorter-distance conjugate point side.

6. A zoom lens according to claim 1, wherein at least one of said front lens unit and said one or more lens units has an aspherical lens.

7. A zoom lens according to claim 1, wherein, when a phase $\phi(h)$ of a diffractive optical surface of said diffractive optical element is expressed by the following equation:

$$\phi(h) = (2\pi/\lambda) \cdot (C_1 h^2 + C_2 h^4 + \ldots + C_i h^{2 \cdot i})$$

where h is a radial distance from an optical axis and $\lambda$ is a reference wavelength, and $C_i$ is a phase coefficient of a term in 2i-th degree, the diffractive optical surface of said diffractive optical element, satisfies the following conditions:

$$1 \times 10^{-4} < |C_2/C_1| < 1$$

$$1 \times 10^{-7} < |C_3/C_1| < 1 \times 10^{-1}.$$

8. A zoom lens according to claim 1, wherein said front lens unit consists of a first lens unit of negative refractive power, and said one or more lens units comprises, in order from the longer-distance conjugate point side to the shorter-distance conjugate point side, a second lens unit of positive refractive power, and a third lens unit, and wherein, during variation of magnification from a wide-angle end to a telephoto end, said second lens unit is moved toward the longer-distance conjugate point side, while simultaneously moving said first lens unit to compensate for shift of an image plane caused by the variation of magnification.

9. A zoom lens according to claim 8, wherein said third lens unit has a positive refractive power.

10. A zoom lens according to claim 8, wherein said second lens unit comprises, in order from the longer-distance conjugate point side to the shorter-distance conjugate point side, a positive lens and a negative lens, and said positive lens of said second lens unit is said diffractive optical element and has a diffractive optical surface facing the longer-distance conjugate point side.

11. A zoom lens according to claim 8, wherein said first lens unit comprises, in order from the longer-distance conjugate point side to the shorter-distance conjugate point side, a negative lens and the positive lens, and said negative lens of said first lens unit is said diffractive optical element and has a diffractive optical surface facing the shorter-distances conjugate point side.

12. A zoom lens according to claim 8, wherein said third lens unit consists of a positive single lens, and said positive single lens is said diffractive optical element and has a diffractive optical surface facing the longer-distance conjugate point side.

13. A zoom lens according to claim 8, wherein, letting a focal length of the i-th lens unit be denoted by Fi, and, when the i-th lens unit has said diffractive optical element, a focal length of a diffractive optical surface of said diffractive optical element be denoted by Fboi, at least one of the following conditions is satisfied:

$$0.05 < F1/Fbo1 < 3.0$$

$$0.05 < F2/Fbo2 < 2.0$$

$$0.05 < F3/Fbo3 < 1.0$$

14. A zoom lens according to claim 8, wherein said first lens unit includes said diffractive optical element, and wherein, letting a focal length of said first lens unit be denoted by F1 and focal lengths in the wide-angle end and the telephoto end of said zoom lens be denoted by Fw and Ft, respectively, the following condition is satisfied:

$$-2.0 < F1/\sqrt{Fw \cdot Ft} < 6.0$$

15. A zoom lens according to claim 1, wherein said front lens unit consists of a first lens unit of negative refractive power, and said one or more lens units comprises, in order from the longer-distance conjugate point side to the shorter-distance conjugate point side, a second lens unit of positive refractive powers and a third lens unit, and wherein, during variation of magnification from a wide-angle end to a telephoto end, said first lens unit and said second lens unit move toward the longer-distance conjugate point side while simultaneously varying a separation therebetween.

16. A zoom lens according to claim 15, wherein said third lens unit has a positive refractive power.

17. A zoom lens according to claim 15, wherein, letting a focal length of the i-th lens unit be denoted by Fi and, when the i-th lens unit has said diffractive optical element, a focal length of the diffractive optical surface of said diffractive optical element be denoted by Fboi, the following condition is satisfied:

0.05<Fi/Fboi<3.0.

18. A zoom lens according to claim 15, wherein, letting a focal length of said first lens unit be denoted by F1 and focal lengths in the wide-angle end and the telephoto end of said zoom lens be denoted by Fw and Ft, respectively, the following condition is satisfied:

0.6<|F1/√Fw·Ft|<0.9.

19. A zoom lens according to claim 15, wherein, letting a focal length of said first lens unit be denoted by F1 and a focal length of said second lens unit be denoted by F2, the following condition is satisfied:

1.01<|F2/F1|<1.59.

20. A zoom lens according to claim 15, wherein said first lens unit has at least one negative lens and at least one cemented lens, and wherein, letting a focal length of said negative lens be denoted by f11N and a focal length of said first lens unit be denoted by F1, the following condition is satisfied:

1.71<f11N/F1<2.76.

21. A zoom lens according to claim 16, wherein, letting a focal length of said third lens unit be denoted by F3 and focal lengths in the wide-angle end and the telephoto end of said zoom lens be denoted by Fw and Ft, respectively, the following condition is satisfied:

2.2<F3/√Fw·Ft<3.7.

22. A zoom lens according to claim 1, wherein said front lens unit consists of a first lens unit of negative refractive power, and said one or more lens units comprises, in order from the longer-distance conjugate point side to the shorter-distance conjugate point side, a second lens unit of positive refractive power, a third lens unit of negative refractive power, a fourth lens unit of positive refractive powers and a fifth lens unit of positive refractive power, and wherein, during variation of magnification from a wide-angle end to a telephoto end, said second lens unit and said fourth lens unit move toward the longer-distance conjugate point side.

23. A zoom lens according to claim 22, wherein a separation between said second lens unit and said third lens unit is wider in the telephoto end than in the wide-angle end, and a separation between said third lens unit and said fourth lens unit is narrower in the telephoto end than in the wide-angle end.

24. A zoom lens according to claim 22, wherein said first lens unit and said fifth lens unit remain stationary during variation of magnification.

25. A zoom lens according to claim 22, wherein, during variation of magnification from the wide-angle end to the telephoto end, said third lens unit moves while depicting a locus convex toward the longer-distance conjugate point side.

26. A zoom lens according to claim 22, wherein said third lens unit remains stationary during variation of magnification.

27. A zoom lens according to claim 22, wherein, letting a focal length of the i-th lens unit be denoted by Fi and focal lengths in the wide-angle end and the telephoto end of said zoom lens be denoted by Fw and Ft, respectively, the following conditions are satisfied:

0.8<|F1/F2|<2.3

0.6<F2/√Fw·Ft.

28. A zoom lens according to claim 22, wherein, letting a focal length of said first lens unit be denoted by F1 and a focal length in the wide-angle end of said zoom lens by Fw, the following condition is satisfied:

1<|F1|/Fw<2.

29. A zoom lens according to claim 22, wherein, when a phase φ(h) of a diffractive optical surface of said diffractive optical element is expressed by the following equation:

$$\phi(h)=(2\pi/\lambda)\cdot(C_1h^2+C_2h^4+\ldots+C_ih^{2i})$$

where h is a radial distance from an optical axis and λ is a reference wavelength, and $C_i$ is a phase coefficient of a term in 2i-th degree, letting a focal length of the i-th lens unit having said diffractive optical element be denoted by fi and a phase coefficient of the term in the first degree in the equation for said diffractive optical element be denoted by C1, the following condition is satisfied:

fi·C1<0.

30. A zoom lens according to claim 22, wherein, when a phase φ(h) of a diffractive optical surface of said diffractive optical element is expressed by the following equation:

$$\phi(h)=(2\pi/\lambda)\cdot(C_1h^2+C_2h^4+\ldots+C_ih^{2i})$$

where h is a radial distance from an optical axis and λ is a reference wavelength, and $C_i$ is a phase coefficient of a term in 2i-th degree, the diffractive optical surface of said diffractive optical element satisfies the following conditions:

$1\times10^{-4}<|C_2/C_1|<1$ $1\times10^{-7}<|C_3/C_1|<1\times10^{-1}$.

31. A zoom lens according to claim 22, wherein, letting a focal length of the i-th lens unit be denoted by Fi and, when the i-th lens unit has said diffractive optical element, a focal length of a diffractive optical surface of said diffractive optical element be denoted by Fboi, the following condition is satisfied:

0.05<Fi/Fboi<3.0.

32. A zoom lens according to claim 22, wherein, letting magnifications in the wide-angle end and the telephoto end of said second lens unit be denoted by β2w and β2t, respectively, a magnification change of said second lens unit be denoted by Z2=β2t/β2w, focal lengths in the wide-angle end and the telephoto end of said zoom lens be denoted by Fw and Ft, respectively, a change in focal length of said zoom lens be denoted by Z=Ft/Fw, and movements of said second lens unit and said fourth lens unit during variation of magnification from the wide-angle end to the telephoto end be denoted by M2 and M4, respectively, the following conditions are satisfied:

$0.8 < Z2/Z < 1.1$ $0.9 < M2/M4 < 15$ $0.4 < M2/(Ft-Fw) < 1.5.$

33. A zoom lens according to claim 22, wherein, letting focal lengths of said second lens unit and said fourth lens unit be denoted by F2 and F4, respectively, the following condition is satisfied:

$0.4 < F2/F4 < 1.5.$

34. A zoom lens according to claim 22, wherein, letting a focal length of said first lens unit be denoted by F1 and focal lengths in the wide-angle end and the telephoto end of said zoom lens be denoted by Fw and Ft, respectively, the following condition is satisfied:

$0.7 < |F1|/\sqrt{Fw \cdot Ft} < 2.1.$

35. A zoom lens according to claim 22, wherein, letting a focal length of the i-th lens unit be denoted by Fi and focal lengths in the wide-angle end and the telephoto end of said zoom lens be denoted by Fw and Ft, respectively, the following conditions are satisfied:

$0.6 < |F3|/\sqrt{Fw \cdot Ft} < 1.4$ $0.8 < F4/\sqrt{Fw \cdot Ft} < 1.8$ $1.5 < F5/\sqrt{Fw \cdot Ft} < 6.0.$

36. A zoom lens according to claim 22, wherein, letting a focal length of said fifth lens unit be denoted by F5 and a focal length in the wide-angle end of said zoom lens be denoted by Fw, the following condition is satisfied:

$2 < F5/Fw < 7.$

37. An optical apparatus comprising:

a zoom lens according to one of claims 1 to 36.

* * * * *

UNITED STATES PATENT AND TRADEMARK OFFICE
CERTIFICATE OF CORRECTION

PATENT NO. : 6,081,389
DATED : June 27, 2000
INVENTOR(S) : Hidemi TAKAYAMA, et al.

It is certified that error appears in the above-identified patent and that said Letters Patent is hereby corrected as shown below:

COLUMN 1:

Line 42, "chromathc" should read --chromatic--.

COLUMN 4:

Line 67, "(end," should read --end,--.

COLUMN 8:

Line 56, "Numeral Example 5" should read --Numerical Example 5--.

COLUMN 9:

Line 20, "C4 = 4.95320 •$10^{-6}$" should read --C4= -4.95320•$10^{-6}$--.
Line 33, "leas" should read --lens--.
Line 39, "chat" should read --that--.

COLUMN 13:

Line 35, "easy" should read --easier--.
Line 36, "urit L2" should read --unit L2--.
Line 44, "Example" should read --example--.

UNITED STATES PATENT AND TRADEMARK OFFICE
CERTIFICATE OF CORRECTION

PATENT NO. : 6,081,389
DATED : June 27, 2000
INVENTOR(S) : Hidemi TAKAYAMA, et al.

It is certified that error appears in the above-identified patent and that said Letters Patent is hereby corrected as shown below:

COLUMN 17:

Line 20, "members" should read --member--.
Line 33, "much" should be deleted.

COLUMN 20:

Line 20, "Lens" should read --lens--.
Line 28, "Then" should read --When--.

COLUMN 21:

Line 3, "one," should read --ones,--.

COLUMN 26:

Line 22, "daring" should read --during--.

COLUMN 27:

Line 9, "arrow." should read --arrows.--.
Line 37, "one," should read --ones,--.
Line 42, "preferred" should read --preferrable--.

UNITED STATES PATENT AND TRADEMARK OFFICE
CERTIFICATE OF CORRECTION

PATENT NO. : 6,081,389
DATED : June 27, 2000
INVENTOR(S) : Hidemi TAKAYAMA, et al.

It is certified that error appears in the above-identified patent and that said Letters Patent is hereby corrected as shown below:

COLUMN 28:

Line 1, "taken" should read --made--.
Line 2, "ratio go," should read --ratio. So, --.

COLUMN 29:

Line 31, "surface." should read --surfaces.--.

COLUMN 38:

Line 63, "refractive powers" should read --refractive power,--.

COLUMN 39:

Line 17, "$0.6 < |F1\sqrt{Fw \cdot Ft}| < 0.9.$" should read
-- $0.6 < |F1\sqrt{Fw \cdot Ft}| < 0.95.$ --.

UNITED STATES PATENT AND TRADEMARK OFFICE
CERTIFICATE OF CORRECTION

PATENT NO. : 6,081,389

DATED : June 27, 2000

INVENTOR(S) : Hidemi TAKAYAMA, et al.

It is certified that error appears in the above-identified patent and that said Letters Patent is hereby corrected as shown below:

COLUMN 39:

Line 46, "refractive powers" should read --refractive power,--.

Signed and Sealed this

Twenty-second Day of May, 2001

NICHOLAS P. GODICI

Attest:

Attesting Officer

Acting Director of the United States Patent and Trademark Office